US010877649B2

(12) United States Patent
Fujita et al.

(10) Patent No.: US 10,877,649 B2
(45) Date of Patent: Dec. 29, 2020

(54) BROWSING SYSTEM, BROWSING METHOD, AND INFORMATION PROCESSING APPARATUS

(71) Applicants: Yohei Fujita, Kanagawa (JP); Osamu Ogawara, Kanagawa (JP)

(72) Inventors: Yohei Fujita, Kanagawa (JP); Osamu Ogawara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 366 days.

(21) Appl. No.: 15/891,672

(22) Filed: Feb. 8, 2018

(65) Prior Publication Data

US 2018/0276722 A1    Sep. 27, 2018

(30) Foreign Application Priority Data

Mar. 21, 2017  (JP) .................................. 2017-055013
Jun. 27, 2017  (JP) .................................. 2017-125552

(51) Int. Cl.
*G06F 3/0484*    (2013.01)
*G06Q 30/02*    (2012.01)
(Continued)

(52) U.S. Cl.
CPC ........ *G06F 3/04845* (2013.01); *G06F 1/1694* (2013.01); *G06F 3/011* (2013.01);
(Continued)

(58) Field of Classification Search
None
See application file for complete search history.

(56) References Cited

U.S. PATENT DOCUMENTS

2009/0043649 A1*  2/2009  Wright ............... G06Q 30/0273
                                                            705/14.69
2010/0262501 A1   10/2010 Son
(Continued)

FOREIGN PATENT DOCUMENTS

| JP | 2008-192115 | 8/2008 | |
|----|---|---|---|
| JP | 2009-146235 | 7/2009 | |
| JP | 2014021677 A | * 2/2014 | ............. G06Q 30/02 |

OTHER PUBLICATIONS

Joshi, et al, "Looking at You: Fused Gyro Face Tracking for Viewing Large Imagery on Mobile Devices", CHI 2012, May 5-10, 2012, p. 2211-2220 (Year: 2012).*

*Primary Examiner* — Marie P Brady
(74) *Attorney, Agent, or Firm* — IPUSA, PLLC

(57) ABSTRACT

A browsing system includes an information processing apparatus that executes a process including transmitting first identification information of the information processing apparatus to an image distribution apparatus, upon acquiring screen information from a device; acquiring a wide-angle image, determined based on the first identification information, and a display state of the wide-angle image; and displaying the acquired wide-angle image in the display state, and an image distribution apparatus that executes a process including referring to a storage storing the first identification information, second identification information of the wide-angle image, and the display state; referring to a storage storing an attribute of a viewer of the first identification information; determining the display state of the wide-angle image according to the attribute of the viewer determined by the first identification information acquired from the information processing apparatus; and transmitting the wide-angle image and the display state to the information processing apparatus.

17 Claims, 42 Drawing Sheets

(51) Int. Cl.
*G06T 19/00* (2011.01)
*H04N 5/232* (2006.01)
*G06F 3/0481* (2013.01)
*G06F 1/16* (2006.01)
*G06F 3/01* (2006.01)
G02B 27/01 (2006.01)

(52) U.S. Cl.
CPC ..... G06F 3/04815 (2013.01); G06Q 30/0277 (2013.01); G06T 19/003 (2013.01); H04N 5/23238 (2013.01); *G02B 27/01* (2013.01); *G02B 27/017* (2013.01); *G02B 2027/014* (2013.01); *G02B 2027/0138* (2013.01); *G02B 2027/0141* (2013.01); *G02B 2027/0187* (2013.01)

(56) References Cited

U.S. PATENT DOCUMENTS

| | | | | |
|---|---|---|---|---|
| 2012/0162225 A1* | 6/2012 | Yang | ........................ | G06F 16/29 345/420 |
| 2013/0322844 A1* | 12/2013 | Suzuki | ..................... | H04N 9/87 386/230 |
| 2015/0015744 A1* | 1/2015 | Naka | ................ | H04N 5/232939 348/240.1 |
| 2016/0321779 A1* | 11/2016 | Fujita | ................... | H04N 21/845 |
| 2017/0048351 A1* | 2/2017 | Wakizaki | ................ | H04L 67/32 |
| 2017/0244946 A1* | 8/2017 | Matias | ................ | G06K 9/2081 |

* cited by examiner

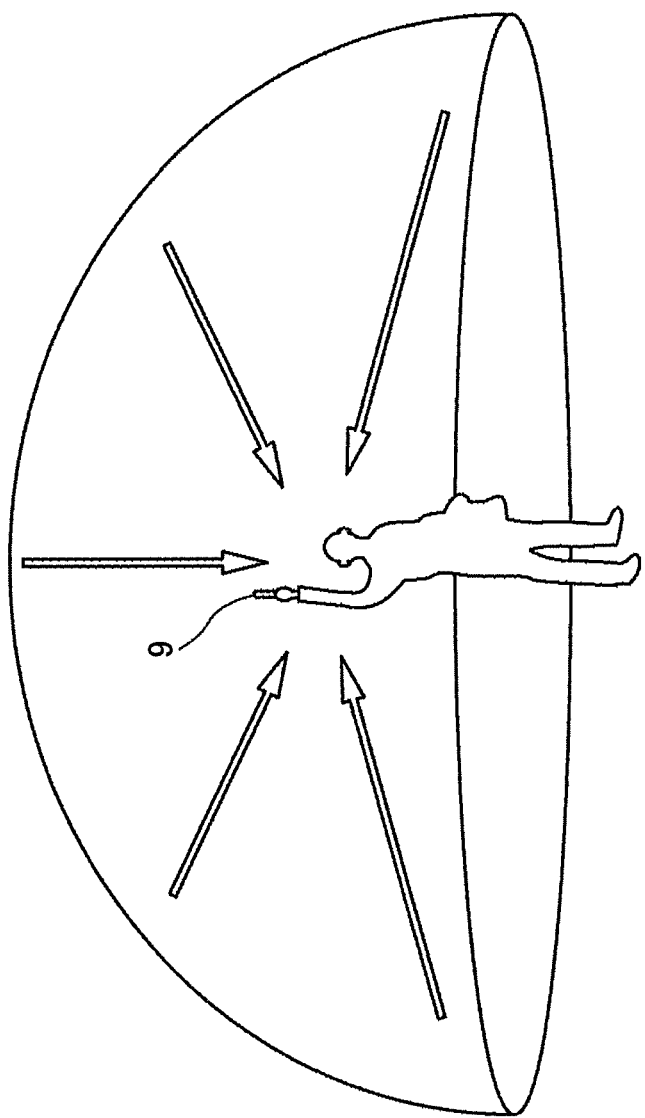

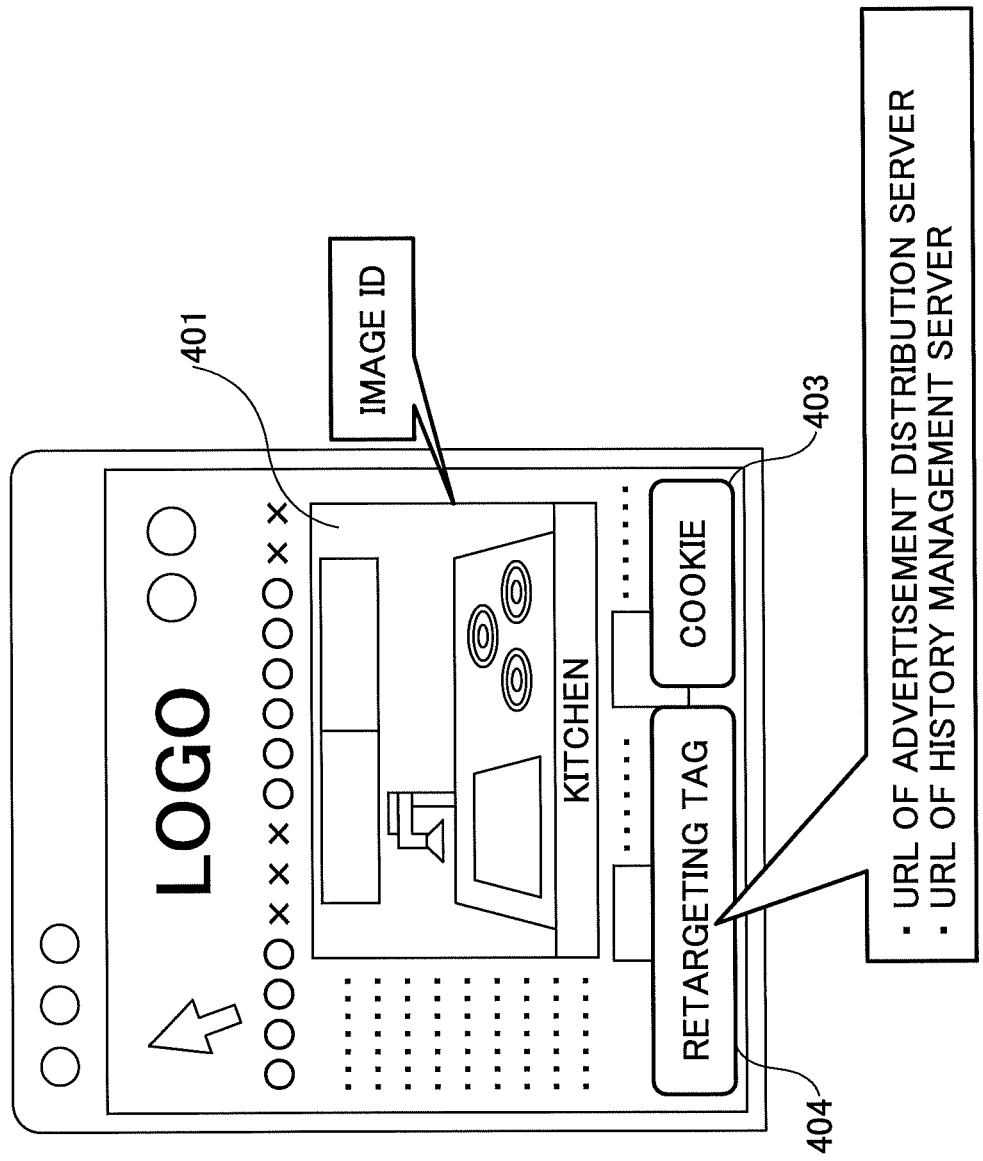

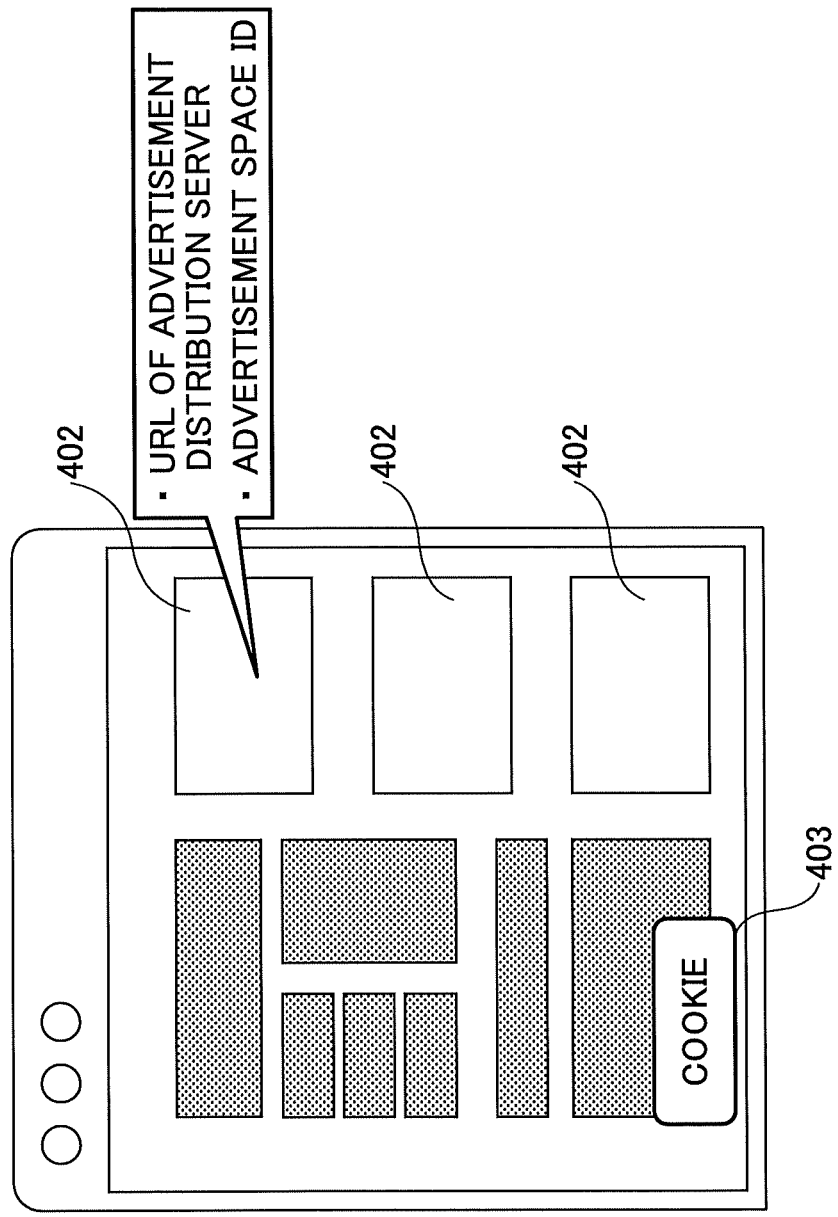

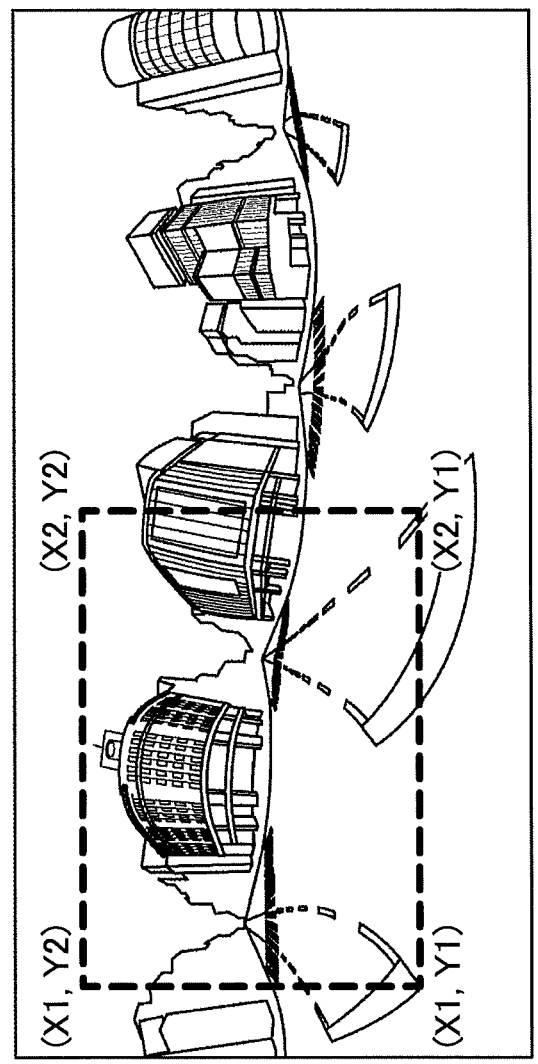

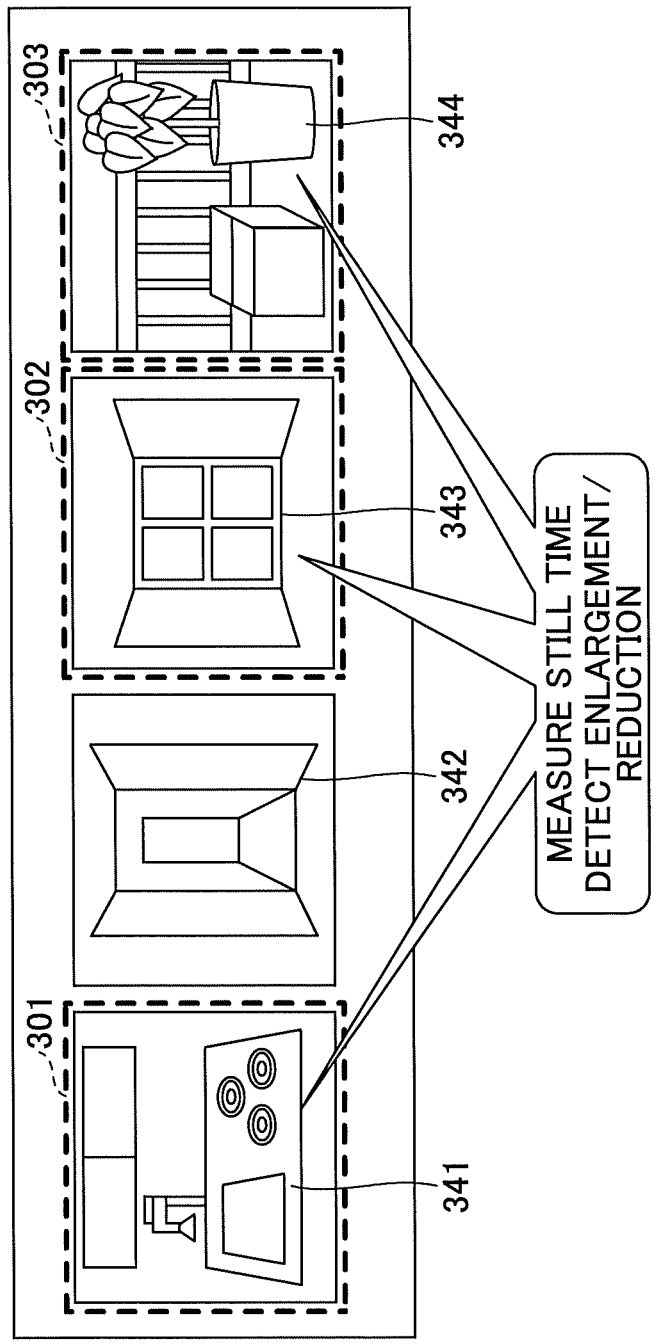

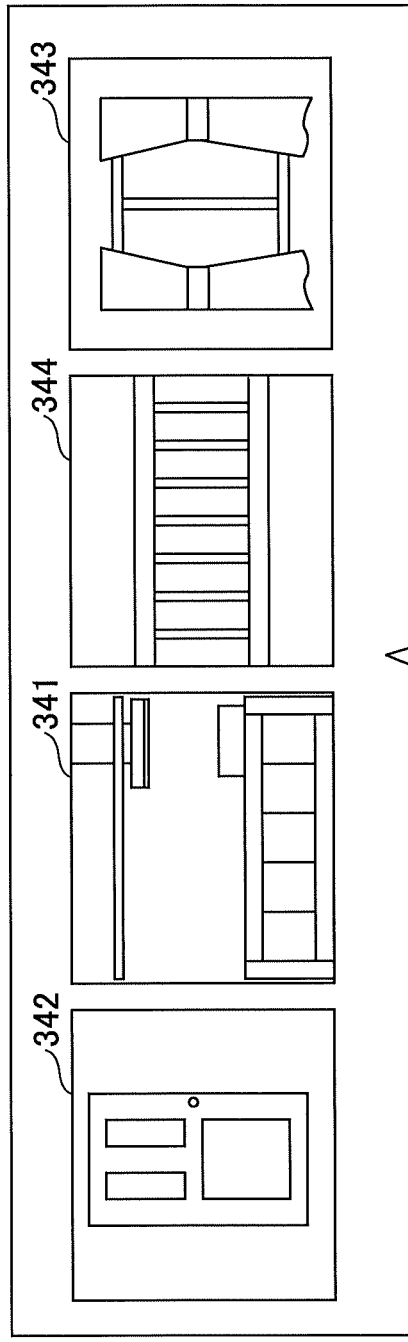

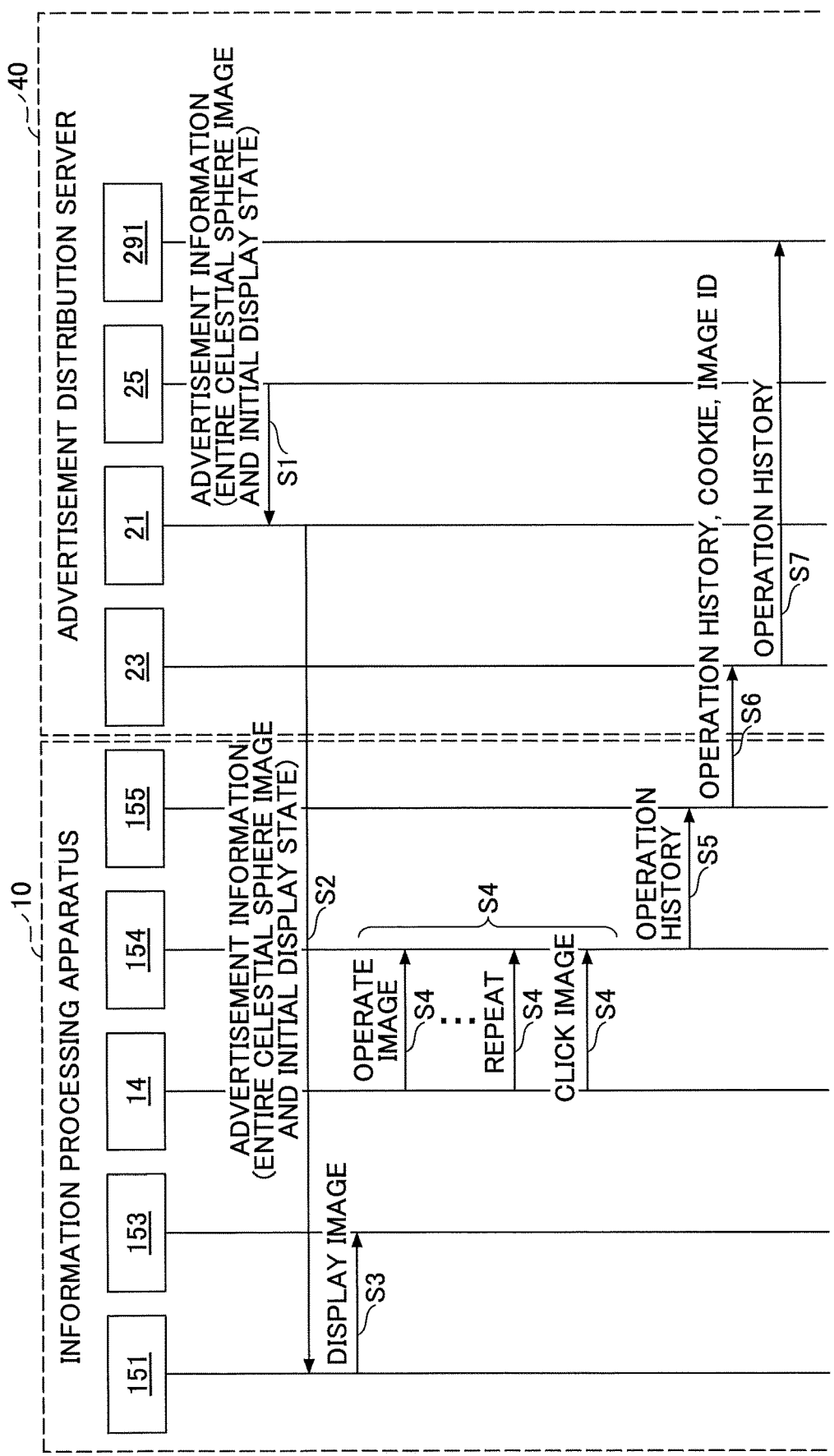

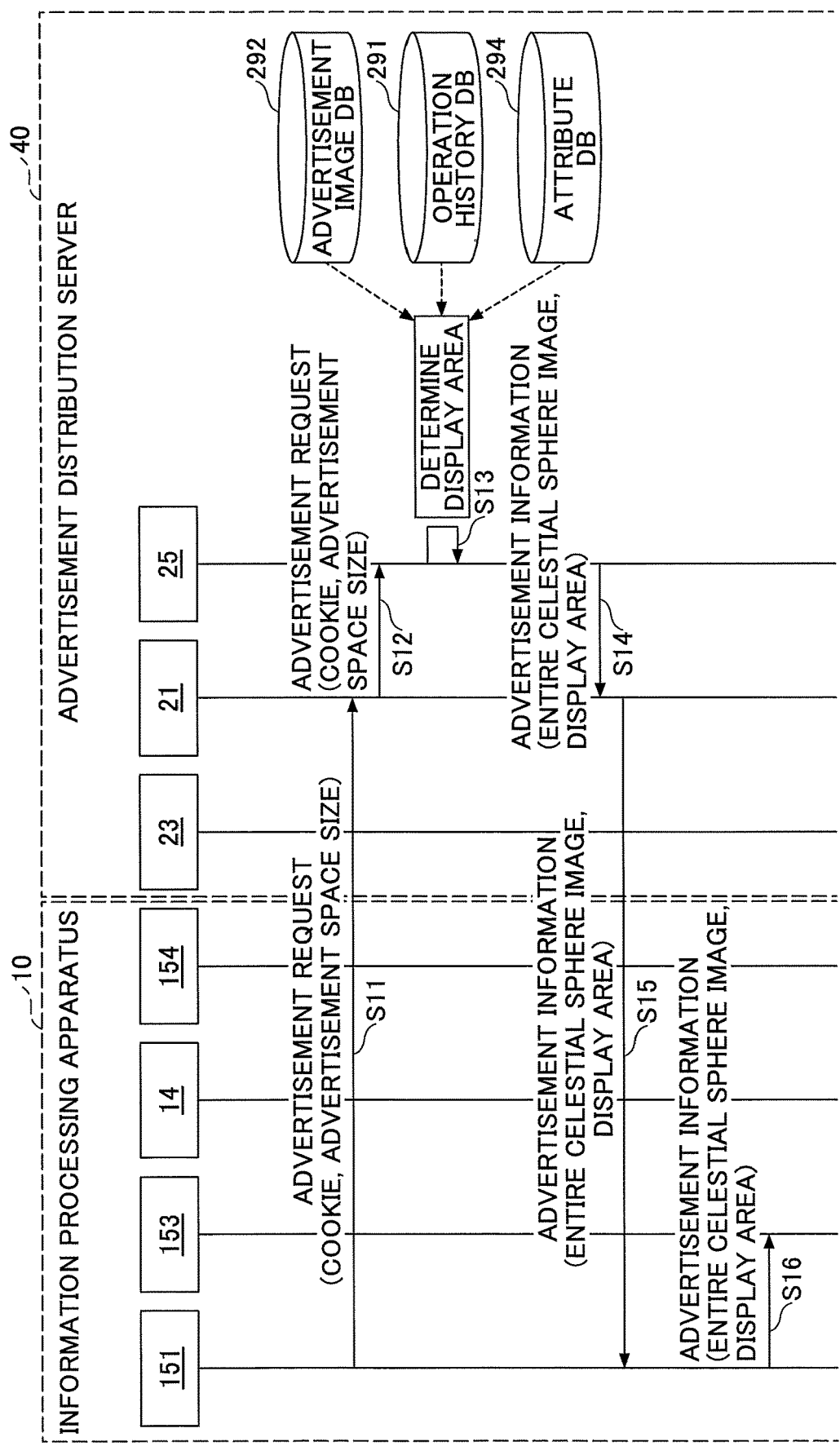

FIG.32

| IMAGE ID | DISPLAY FREQUENCY | CLICK RATE (%) | DISTRIBUTION |
|---|---|---|---|
| 001 | 10000 | 0.01 | EXCLUDE |
| 002 | 11000 | 0.1 | True |
| 003 | 12000 | 0.2 | True |
| 004 | 2000 | 0.005 | True |

FIG. 40

| HISTORY IDENTIFICATION INFORMATION | | | INITIAL DISPLAY STATE | | | | |
|---|---|---|---|---|---|---|---|
| IMAGE ID | DISPLAY DEVICE | COOKIE | ADVERTISEMENT SPACE SIZE | INITIAL ANGLE OF VIEW | INITIAL MAGNIFICATION RATIO | ROTATIONAL SPEED | LINK POSITION |
| 0001 | Mobile | Aaa | 300 × 250 | (X01, X02, Y01, Y02) | 1.0 | 0.1 rps | LOWER |
| 0002 | PC | Bbb | 728 × 90 | (X11, X12, Y11, Y12) | 1.5 | 0.2 rps | UPPER |
| 0003 | Tablet | Ccc | 300 × 600 | (X21, X22, Y21, Y22) | 0.5 | 0.3 rps | LEFT |
| 0001 | PC | Ddd | 210 × 100 | (X31, X32, Y31, Y32) | 2.0 | 0.4 rps | RIGHT |

| OPERATION HISTORY | | | | | | |
|---|---|---|---|---|---|---|
| START IMAGE (IN CASE OF A PLURALITY OF IMAGES) | CLICK RESULT | BROWSING ANGLE OF VIEW 1 | BROWSING ANGLE OF VIEW 2 | BROWSING ANGLE OF VIEW 3 | CLICK TIME ANGLE OF VIEW | CLICK TIME MAGNIFICATION RATIO |
| 1 | True | (Xs1, Ys1) (Xe1, Ye1) ENLARGEMENT: YES ANGLE OF VIEW AFTER ENLARGEMENT REDUCTION: NO STILL TIME: 10 SECONDS | (Xs2, Ys2) (Xe2, Ye2) ENLARGEMENT: NO REDUCTION: YES STILL TIME: 5 SECONDS | (Xs3, Ys3) (Xe3, Ye3) ENLARGEMENT: YES ANGLE OF VIEW AFTER ENLARGEMENT REDUCTION: NO STILL TIME: 3 SECONDS | (X41, Y41) (X42, Y42) | 1.5 |
| 2 | False | ... | ... | ... | (X51, Y51) (X52, Y52) | 2.0 |
| 1 | True | ... | ... | ... | (X61, Y61) (X62, Y62) | 1.0 |
| 3 | True | ... | ... | ... | (X71, Y71) (X72, Y72) | 1.0 |

BROWSING SYSTEM, BROWSING METHOD, AND INFORMATION PROCESSING APPARATUS

CROSS-REFERENCE TO RELATED APPLICATION

The present application claims priority under 35 U.S.C. § 119 to Japanese Patent Application No. 2017-055013, filed on Mar. 21, 2017 and Japanese Patent Application No. 2017-125552, filed on Jun. 27, 2017, the contents of which are incorporated herein by reference in their entirety.

BACKGROUND OF THE INVENTION

1. Field of the Invention

The present invention relates to a browsing system, a browsing method, and an information processing apparatus.

2. Description of the Related Art

A web server provides screen information including various kinds of images, and the viewer can browse the images by operating an information processing apparatus on which browser software is operating. Furthermore, imaging devices, which are capable of capturing a wide-angle image in a wider range than digital cameras of the related art, are becoming widespread.

Furthermore, images displayed by browser software are often used for advertisements. An advertisement space is provided in a web page distributed by the web server, and an image of the object of the advertisement is displayed in the advertisement space. When the viewer clicks the advertisement, etc., the information processing apparatus can display detailed information on the advertisement object by communicating with the web server of a link destination described in the advertisement.

As an advertiser, it is desirable to increase the frequency of viewers clicking an advertisement; however, the number of advertisements posted on a single web page tends to increase, and the advertiser is devising display methods for attracting the attention of viewers (see, for example, Patent Document 1). Patent Document 1 discloses a technique for increasing the effect (click rate) of an advertisement, by distributing a moving image advertisement.

Patent Document 1: Japanese Unexamined Patent Application Publication No. 2008-192115

SUMMARY OF THE INVENTION

An aspect of the present invention provides a browsing system, a browsing method, and an information processing apparatus in which one or more of the disadvantages of the related art are reduced.

According to one aspect of the present invention, there is provided a browsing system including an information processing apparatus configured to acquire screen information from a screen information providing device; and an image distribution apparatus configured to provide a wide-angle image to the information processing apparatus, the wide-angle image being an image including a portion that cannot be displayed in a space in which the wide-angle image is to be displayed, wherein the information processing apparatus includes a first processor, in communication with a first memory, executing a first process including transmitting first identification information of the information processing apparatus to the image distribution apparatus, upon acquiring the screen information from the screen information providing device; acquiring the wide-angle image, which is determined based on the first identification information of the information processing apparatus, and a display state specifying how to display the wide-angle image; and displaying, on a display device, the acquired wide-angle image in the display state, and wherein the image distribution apparatus includes a second processor, in communication with a second memory, executing a second process including referring to a first storage configured to store the first identification information of the information processing apparatus, second identification information of the wide-angle image, and the display state of the wide-angle image; referring to a second storage configured to store an attribute of a viewer for each piece of the first identification information of the information processing apparatus; determining the display state of the determined wide-angle image according to the attribute of the viewer determined based on the first identification information of the information processing apparatus acquired from the information processing apparatus; and transmitting the wide-angle image and the display state to the information processing apparatus.

BRIEF DESCRIPTION OF THE DRAWINGS

FIG. 6 is an image diagram of the use of an entire celestial sphere camera according to the first embodiment of the present invention;

FIGS. 11A and 11B are examples of diagrams for schematically describing information held by each web page according to the first embodiment of the present invention;

FIG. 12 is an example of a diagram for describing a browsing angle of view of the entire celestial sphere image according to the first embodiment of the present invention;

FIG. 13 is an example of a diagram for describing the recording of an operation history according to the first embodiment of the present invention;

FIGS. 18A and 18B schematically illustrate two entire celestial sphere images and the angles of view in which the objects appear according to the second embodiment of the present invention;

FIG. 23 is an example of a sequence diagram illustrating the operation of the browsing system in the accumulation phase according to the third embodiment of the present invention;

FIG. 24 is an example of a sequence diagram illustrating the operation of the browsing system in the history use phase according to the third embodiment of the present invention;

FIG. 32 illustrates an example of an operation history including a click rate according to the third embodiment of the present invention;

FIG. 40 is a table depicting a conceptual representation of the information stored in the operation history DB 291.

DETAILED DESCRIPTION OF THE PREFERRED EMBODIMENTS

In the technique for increasing the effect (click rate) of an advertisement of the related art, there is a possibility that moving pictures attract the attention of viewers; however, there is a problem that the image that the viewer is interested in is not necessarily displayed. That is, even if an image that the viewer is interested in is included in a part of the playback time of the moving image advertisement, in order for the viewer to browse the image, he/she must watch the moving image advertisement at the timing of playback corresponding to the part of the image that is interesting to the viewer. If the viewer does not watch the moving image advertisement at this timing, there is a possibility that the effect of the advertisement cannot be improved.

A problem to be solved by an embodiment of the present invention is to provide a browsing system capable of displaying images that are expected to attract the interest of viewers.

Embodiments of the present invention will be described by referring to the accompanying drawings.

Outline of Electronic Device System According to Present Embodiment

Figure 1A:
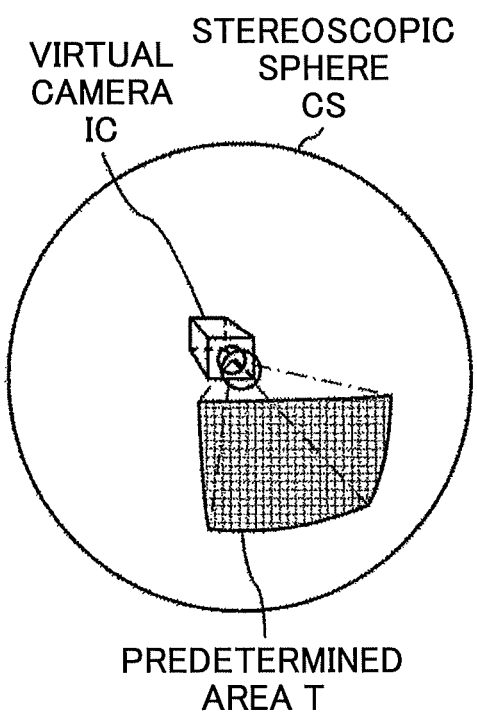
FIGS. 1A and 1B are examples of diagrams for describing an entire celestial sphere image as an example of a wide-angle image according to embodiments of the present invention.
Figure 1B:
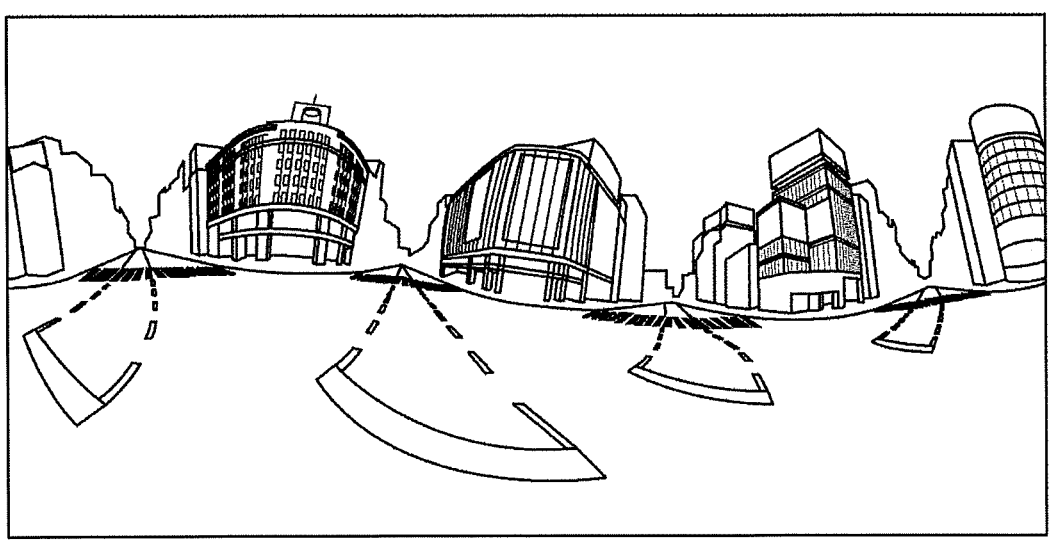

FIGS. 1A and 1B are examples of diagrams for describing an entire celestial sphere image as an example of a wide-angle image. FIG. 1A illustrates an entire celestial sphere image expressed by a three-dimensional stereoscopic sphere CS, and FIG. 1B illustrates an entire celestial sphere image expressed by equidistant cylindrical projection. The entire celestial sphere image generated by an entire celestial sphere camera has a three-dimensional structure in which an image as illustrated in FIG. 1B is adhered to the stereoscopic sphere CS. A virtual camera IC corresponds to the viewer's viewpoint, and in FIG. 1A, there is a viewpoint at the center of the entire celestial sphere image. The viewer can rotate three axes around the X axis, the Y axis, and the Z axis passing through the virtual camera IC, to display any predetermined area T of the entire celestial sphere image.

When an entire celestial sphere image is used for an advertisement, only a part of the entire celestial sphere image, that is, the predetermined area T is displayed. The user is able to rotate the entire celestial sphere image to browse the whole entire celestial sphere image; however, only the predetermined area T is displayed immediately after the web page is displayed.

On the other hand, it is known that the click rate has a high correlation with the image that is initially displayed. In order to increase the click rate, it is important to determine what kind of object is displayed in the predetermined area T of the entire celestial sphere image immediately after the web page is displayed. Therefore, a browsing system 100 according to the present embodiment accumulates the initial display states and operation history, and estimates the initial display state with a high click rate. After the accumulation, an advertisement that is an entire celestial sphere image is distributed in the initial display state for which the click rate is high, and therefore an increase in the click rate can be expected. The flow of a process will be described with reference to FIGS. 2 and 3.

Figure 2:
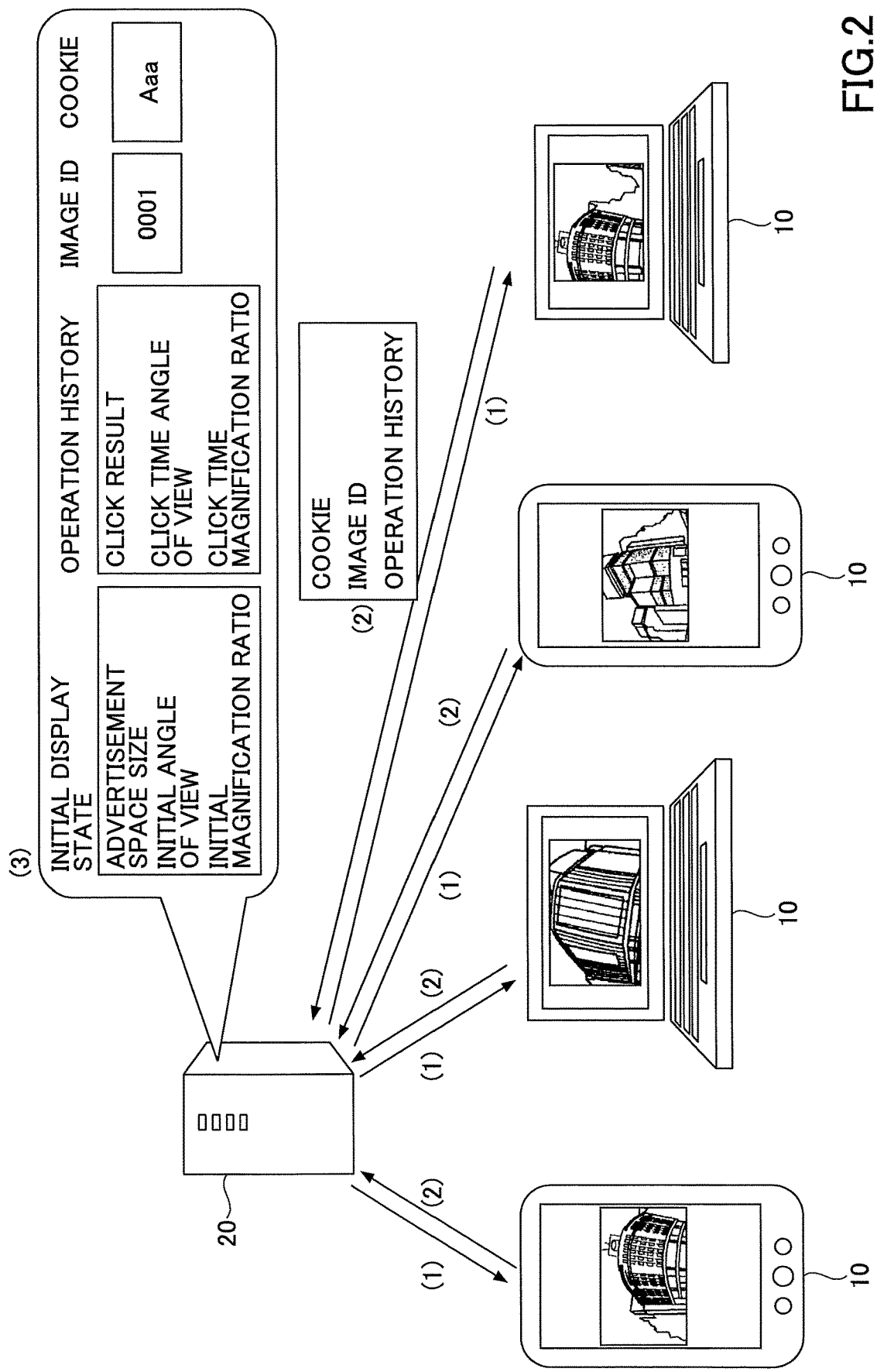
FIG. 2 is a diagram for schematically describing a browsing system according to embodiments of the present invention.
Figure 3:
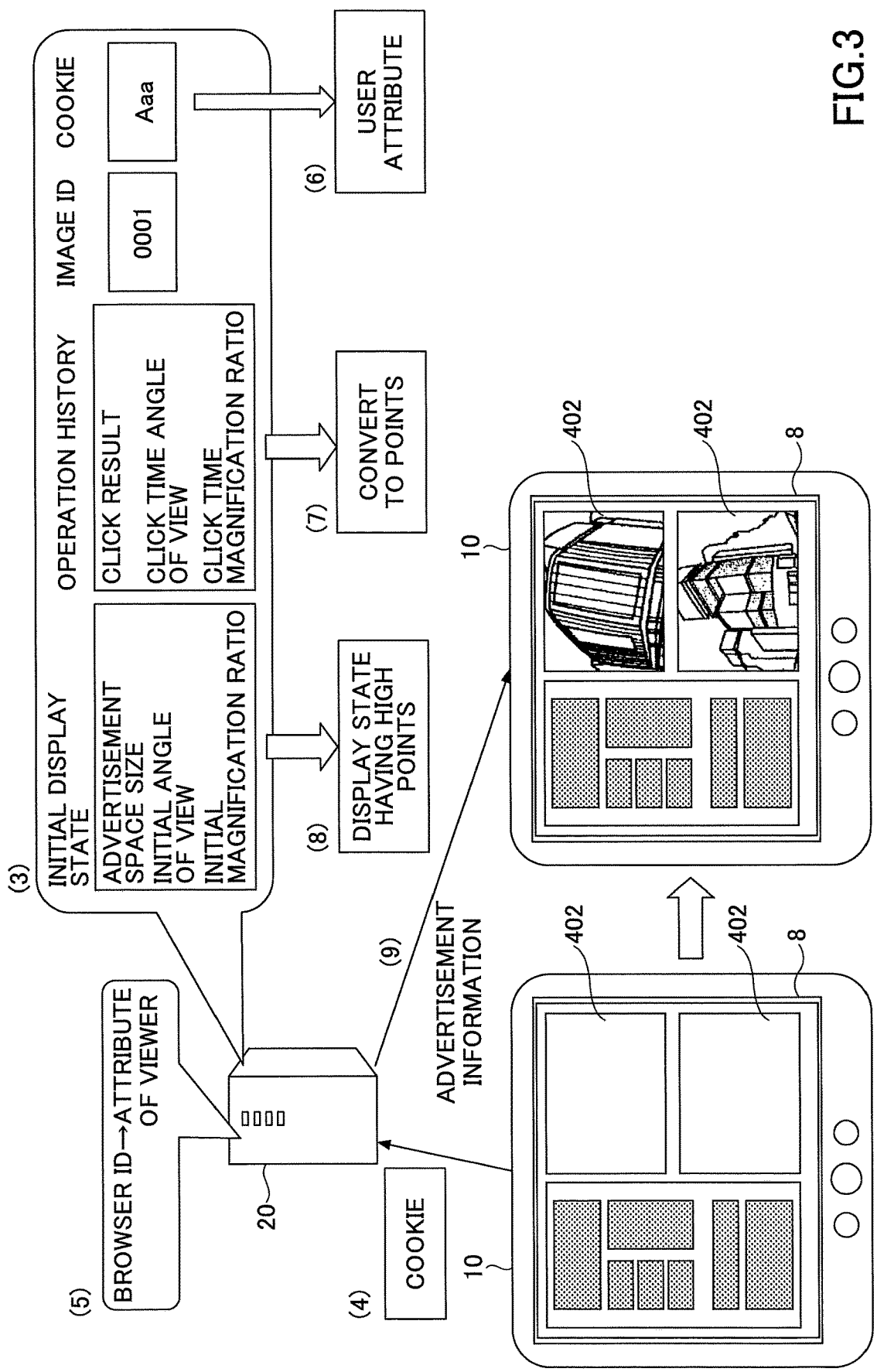
FIG. 3 is a diagram for schematically describing a browsing system according to embodiments of the present invention.

FIGS. 2 and 3 are diagrams for describing the outline of the browsing system 100 according to the present embodiment. FIG. 2 is a diagram for mainly describing an accumulation phase of operation histories, and FIG. 3 is a diagram for mainly describing a history use phase in which advertisements are distributed by using the accumulated operation histories.

(1) A history management server 20 distributes the entire celestial sphere image that is an advertisement to information processing apparatuses 10. At this time, the initial display state of the entire celestial sphere image is changed variously. The display state includes an advertisement space size, an initial angle of view, and an initial magnification ratio, etc.

(2) The user operates the information processing apparatus 10 to freely operate the entire celestial sphere image and browse the entire celestial sphere image. The operation history at this time is transmitted to the history management server 20 in association with a cookie and an image ID. The cookie is identification information for identifying the information processing apparatus 10.

(3) The history management server 20 stores the initial display state in association with the operation history, the image ID, and the cookie. Therefore, what kind of operation is performed in what kind of initial display state are recorded for each viewer and for each image.

(4) Any viewer (that may be different from the viewer in FIG. 2, or the same viewer) operates the information processing apparatus 10 to open a web page including an advertisement space, so that the cookie is transmitted to the history management server 20.

(5) Since the history management server 20 can use a database in which the cookie and the user attribute are associated with each other, the history management server 20 identifies the attribute of the viewer from the cookie. The attribute of the viewer is information indicating what type of person the viewer is. For example, user attributes are age range, gender, occupation, family composition, annual income, and location, etc. Furthermore, the history management server 20 determines the entire celestial sphere image to be used for the advertisement according to the attribute of the viewer.

(6) The history management server 20 extracts the operation history of a viewer whose attribute is similar to the attribute of the viewer who has transmitted the cookie, from the operation history accumulated for the determined entire celestial sphere image to be used for the advertisement.

(7) The history management server 20 converts the extracted operation history into points, so that higher points are given to the operation history indicating that the viewer has indicated interest in the entire celestial sphere image. For example, high points are given to an operation history indicating that the entire celestial sphere image has been clicked, and low points are given to an operation history indicating that the entire celestial sphere image has not been clicked.

(8) Then, an initial display state having high points is identified.

(9) The history management server 20 adjusts the display state of the entire celestial sphere image to be used for an advertisement, to be the initial display state having high points, and transmits the entire celestial sphere image to the information processing apparatus 10.

As described above, the browsing system 100 according to the present embodiment accumulates initial display states and operation histories, and distributes an advertisement that is an entire celestial sphere image in an initial display state for which click rate has been high, and therefore the viewer tends to be interested in the advertisement and the click rate can be increased.

Terms

The operation history means some kind of operation that has been performed on the image. Although "history" is included in this term, there may be cases where only a single operation is included in the history. The operation performed on an image includes, for example, displaying or rotating the image, and also enlarging/reducing the image, changing the brightness of the image, and changing the sharpness the image, etc. Furthermore, a selection of images and the browsing time of images, etc., may also be included in this operation history. The identification information of the information processing apparatus is information for identifying the information processing apparatus; however, in addition to the identification of the information processing apparatus, the browser or the viewer may also be identified in some cases. A viewer is a person who browses an advertisement, and the viewer may be referred to as a user or an operator, etc.

Determining the display area of the wide-angle image based on the operation history means to estimate and indicate a part, an area, a range, or a position in the entire celestial sphere image that the viewer is likely to be interested in.

First Embodiment

Retargeting Advertisement—First Embodiment

First, in the first and second embodiments, the browsing system 100 that determines the display area of the entire celestial sphere image displayed by a retargeting advertisement will be described. A retargeting advertisement is an example of an action targeting advertisement. The retargeting advertisement is one example of a behavioral targeting advertisement, which is an advertisement method of tracking the subsequent behaviors of the visitor who has visited any website, and displaying the advertisement to the same visitor again. In many cases, viewers take a behavior pattern of preliminarily observing products and services when visiting the website for the first time, and purchasing products and services at other occasions. A retargeting tag advertisement is a mechanism to prompt the viewer to browse products and services for the second time and onwards, and there is a possibility of increasing the rate of clicking advertisements (products and services) by the viewer.

However, many advertisements are displayed on a web page, and the click rate does not increase only by having the browsing system 100 display the products and services again in a website visited by the viewer in the past.

As described above, when an entire celestial sphere image is used as the advertisement image, only a part of the entire celestial sphere image, that is, the predetermined area T, is displayed. Although the viewer is able to rotate the entire celestial sphere image to browse the whole entire celestial sphere image, only the predetermined area T is displayed immediately after the web page is displayed. However, the click rate has a high correlation with the initially displayed image. In view of the above, the first and second embodiments describe a method of recording the area displayed when the viewer browsed the entire celestial sphere image at the time of the first visit to the website, and determining the predetermined area T of the entire celestial sphere image to be displayed when displaying the advertisement, by referring to the area displayed in the past.

System Configuration—First Embodiment

Figure 4:
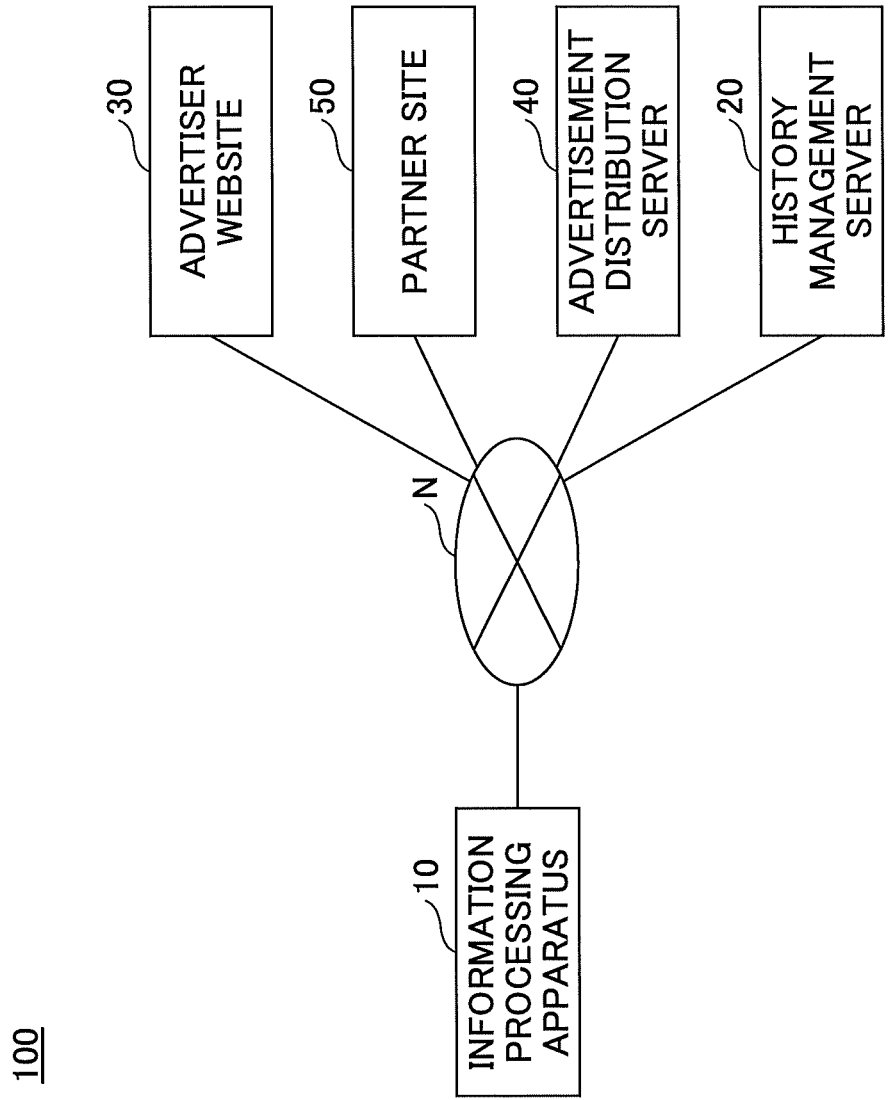
FIG. 4 is an example of a schematic configuration diagram of the browsing system according to a first embodiment of the present invention.

FIG. 4 is an example of a schematic configuration diagram of the browsing system 100. The browsing system 100 includes the information processing apparatus 10 capable of communicating via a network N, an advertiser website 30, a partner site 50, an advertisement distribution server 40, and the history management server 20.

The network N is constructed by a local area network (LAN) constructed in a facility where the information processing apparatus 10 is installed, a provider network of a provider connecting the LAN to the Internet, and a line provided by a line operator. When the network N includes a plurality of LANs, the network N is referred to as a wide area network (WAN) or the Internet. The network N may be constructed to be either wired or wireless, and wired and wireless networks may be combined. Furthermore, when the information processing apparatus 10 directly connects to the public line network, the information processing apparatus 10 can connect to the provider network without involving the LAN.

The information processing apparatus 10 operates as a client terminal in the present embodiment. In the information processing apparatus 10, a browser 8 (see FIG. 3) or application software having the same function as that of the browser 8 is operating, and a web page requested by the information processing apparatus 10 is received from the advertiser website 30 and the partner site 50, and displayed on a Liquid Crystal Display (LCD) to be described later.

The information processing apparatus 10 is, for example, a Personal Computer (PC), a tablet device, a smartphone, a Personal Digital Assistant (PDA), a game machine, a navigation terminal, and a wearable PC, etc., but may be any kind of device as long as the information processing apparatus 10 can display a web page. For example, when the printer has a function of displaying a web page or a display, a printer may be used as the information processing apparatus 10. Also, a digital signage may display the web page. A digital signage refers to a system or a display device or the displayed information. The digital signage transmits information by using an electronic display device such as a display at a location where a person may pass by or exist, such as outdoors, in front of a shop, a public space, and a transportation facility, etc.

The information processing apparatus 10 may be connected to the network N via an access point of a wired LAN or a wireless LAN, or may be connected to the network N by communicating according to a switched line type communication standard such as third generation (3G), fourth generation (4G), or Long Term Evolution (LTE).

Both the advertiser website 30 and the partner site 50 are servers (general information processing apparatuses) that provide, through a network, information and functions to a client computer (information processing apparatus 10 according to the present embodiment) used by a viewer. In the present embodiment, the roles of the advertiser website 30 and the partner site 50 are different. The advertiser website 30 is the side that issues the advertisement and the partner site 50 is the side that provides an advertisement space 402. The roles are not fixed; there are cases where the two sites are inversely related.

Since the advertiser website 30 requests distribution of the advertisement to the history management server 20, if the history management server 20 identifies the information processing apparatus 10 by the cookie, the same effects can be attained as in the case of the advertiser website 30 identifying the information processing apparatus 10. Since the history management server 20 is registered as a target for selling the advertisement in the advertisement distribution server 40, when the information processing apparatus 10 detects the advertisement space 402 and transmits the cookie, the advertisement distribution server 40 sends the cookie to the history management server 20. The history management server 20 can determine whether it is worth purchasing the advertisement space 402 based on the cookie.

The advertiser website 30, the partner site 50, and the information processing apparatus 10 communicate with each other according to HyperText Transport Protocol (HTTP) or HyperText Transport Protocol Secure (HTTP), to transmit screen information to the information processing apparatus 10 from the advertiser website 30 and the partner site 50, in response to a request from the information processing apparatus 10. The screen information is a program described in Hyper Text Markup Language (HTML), a script language, and cascading style sheet (CSS). The structure of the web page is identified mainly by HTML, the operations of the web page are defined by a script language, and the style of the web page is identified by CSS. In the present embodiment, the script language applies an operation with respect to the web page by the viewer, to the entire celestial sphere image. Specifically, a program language referred to as JavaScript (registered trademark) or ECMAScript is known as a script language.

Note that, in the present embodiment, when referring to a web page, a web application is included. Although the definition of the web application is uncertain, for example, a web application may indicate that the advertiser website 30 and the partner site 50 dynamically constructs a web page in response to a request from the viewer, or may indicate that the web page operates in a script language. The former case, for example, corresponds to a case is where the advertiser website 30 arranges a photography of a real estate property conforming to a search condition set by the viewer to construct a web page. The latter case, for example, corresponds to a case is where the viewer performs an operation to rotate the entire celestial sphere image, etc.

The advertisement distribution server 40 can be referred to as a server (general information processing apparatus) that sells opportunities of distributing advertisements to the advertisement space 402. The advertisement distribution server 40 and the information processing apparatus 10 communicate, for example, according to HTTP or HTTPs. When the information processing apparatus 10 displays the web page in which the advertisement space 402 of the partner site 50 is arranged, the information processing apparatus 10 transmits a cookie to the advertisement distribution server 40. At this time, the information processing apparatus 10 transmits all cookies related to the advertisement distribution server 40. Cookies are provided not only from real estate sites but also from various advertiser websites 30. The advertisement distribution server 40 presents all of the cookies to the history management server 20 (actually, there are a plurality of the history management servers 20), and accepts biddings for this advertisement space 402. The history management server 20 identifies the attribute of the viewer from the cookie, determines the bid price by considering the attribute and the product to be advertised, and bids the price. In the present embodiment, since it is known by the cookie that the operation history is recorded, the history management server 20 can purchase the advertisement space 402 as bidding with a higher amount (and quick response).

The advertisement distribution server 40 charges a fee to the history management server 20 according to the contract, and a fee is charged according to the contract between the history management server 20 and a real estate site (advertiser website). However, depending on the contract, a fee may or may not be charged only by displaying an advertisement.

The history management server 20 holds manuscript materials such as banners and text, and advertisement images (hereinafter referred to as advertisement information), and transmits advertisement information in response to a request from the information processing apparatus 10. The advertisement information may be simply a banner (an image formed of letters, photographs, and drawings), and in addition to images, a script language may be included in the advertisement information. In the present embodiment, a program described in a script language (the display program described above) is included, so as to apply the operation on the web page by the viewer to the display mode of the entire celestial sphere image.

When an advertisement is clicked, information such as "advertisement is clicked" is described in a cookie (different cookie from the above) of the browser 8 of the viewer, and the cookie is transmitted to the advertisement distribution server 40. Since the cookie includes information identifying the advertisement space, when the viewer accesses the advertiser website 30 by clicking on the advertisement, the advertisement distribution server 40 is able to recognize that the viewer has gone through the advertisement space of the partner site 50. The advertisement distribution server 40 pays a fee corresponding to the number of clicks, to the operator of the partner site 50. Furthermore, the advertiser website 30 detects that the advertisement has been clicked at the advertisement space 402 purchased by the history management server 20, based on the cookie indicating that "advertisement is clicked", and pays a predetermined fee to the history management server 20 based on the contract.

Hardware Configuration—First Embodiment

Figure 5:
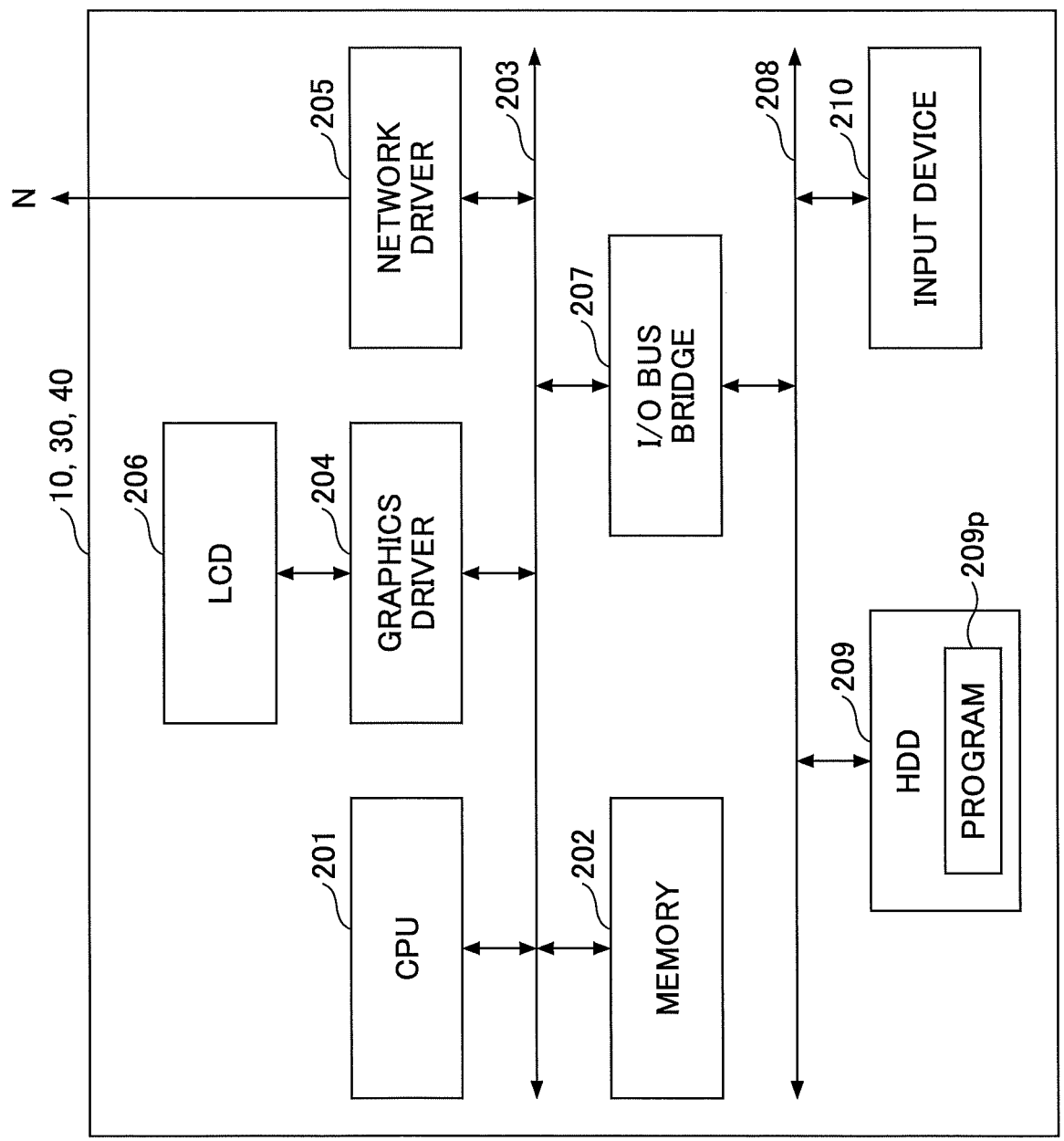
FIG. 5 is a hardware block diagram of an information processing apparatus according to the first embodiment of the present invention.

FIG. 5 is a hardware block diagram of the information processing apparatus 10. The information processing apparatus 10 can be implemented as a general personal computer, a workstation, or an appliance server. The information processing apparatus 10 includes a central processing unit (CPU) 201 and a memory 202 that enables high-speed access of data used by the CPU 201. The CPU 201 and the memory 202 are connected to other devices or drivers of the information processing apparatus 10, for example, a graphics driver 204 and a network driver (NIC) 205, via a system bus 203.

The graphics driver 204 is connected to a display device (LCD) 206 via a bus, and monitors the processing results of the CPU 201. A touch panel may be integrally arranged on the LCD 206. In this case, the viewer can operate the information processing apparatus 10 by using his/her finger as an operation means.

Furthermore, the network driver 205 connects the information processing apparatus 10 to the network N at the transport layer level and the physical layer level, and establishes a session with the advertiser website 30, etc.

An input output (I/O) bus bridge 207 is further connected to the system bus 203. At the downstream side of the I/O bus bridge 207, a storage device such as a hard disk drive (HDD) 209 is connected by Integrated Drive Electronics (IDE), Advanced Technology Attachment (ATA), AT Attachment Packet Interface (ATAPI), serial ATA, Small Computer System Interface (SCSI), and Universal Serial Bus (USB), etc., via an I/O bus 208 such as Peripheral Component Interconnect (PCI). Alternatively, a Solid State Drive (SSD) may be included instead of instead of the HDD 209, or together with the HDD 209.

The HDD 209 stores a program 209p for controlling the entire information processing apparatus 10. The program 209p includes screen information transmitted by the advertiser website 30, the partner site 50, and the advertisement distribution server 40, in addition to the browser 8. By executing the display program included in the browser 8 and the screen information, the information processing apparatus 10 applies an operation performed on a web page to an entire celestial sphere image. The program 209p may not only be distributed from the advertiser website 30, etc., but may also be distributed in a state of being stored in a portable storage medium such as a USB memory or an optical storage medium.

An input device 210 such as a keyboard and a mouse (referred to as a pointing device) is connected to the I/O bus 208 via a bus such as a USB, and accepts an input and an instruction by an operator such as a viewer.

The hardware block diagrams of the advertiser website 30, the partner site 50, the advertisement distribution server 40, and the history management server 20 are the same as that of FIG. 5; however, even if there is a difference from FIG. 5, there will be no problem in describing the present embodiment. It is preferable that the advertiser website 30, the partner site 50, the advertisement distribution server 40, and the history management server 20 support cloud computing. Cloud computing is a mode of usage in which resources on the network are used without being conscious of specific hardware resources. In this case, the hardware configuration illustrated in FIG. 5 does not need to be housed in a single casing or provided as a unitary device; the hardware configuration illustrated in FIG. 5 indicates hardware elements that are preferably included in the advertiser website 30, the partner site 50, the advertisement distribution server 40, and the history management server 20. Furthermore, in order to support cloud computing, the physical configurations of the advertiser website 30, the partner site 50, the advertisement distribution server 40, and the history management server 20 according to the present embodiment need not be fixed, and hardware resources may be dynamically connected/disconnected according to the load, etc.

Entire Celestial Sphere Image—First Embodiment

An entire celestial sphere image will be described with reference to FIGS. 6 to 9. FIG. 6 is an image diagram of the use of an entire celestial sphere camera 9. As illustrated in FIG. 6, the entire celestial sphere camera 9 is used by a user holding the entire celestial sphere camera 9 in his/her hand to capture an image of a subject around the user. The entire celestial sphere camera 9 has a structure in which the back faces of two imaging elements are opposed to each other, and each of the imaging elements captures an image of a subject around the user, thereby obtaining two hemispherical images.

Figure 7A:
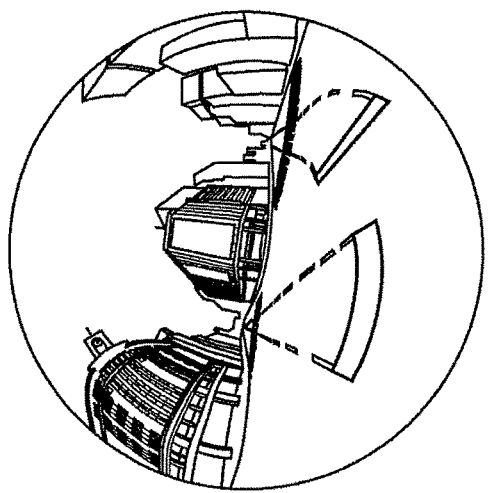
FIGS. 7A to 7C are diagrams for describing an outline of a process of creating an entire celestial sphere image from an image captured with an entire celestial sphere camera according to the first embodiment of the present invention.
Figure 7B:
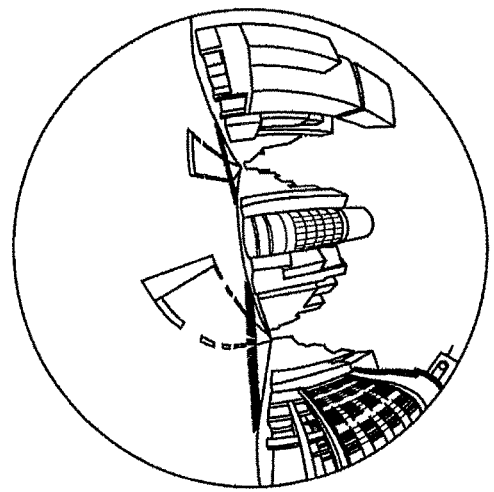
Figure 7C:
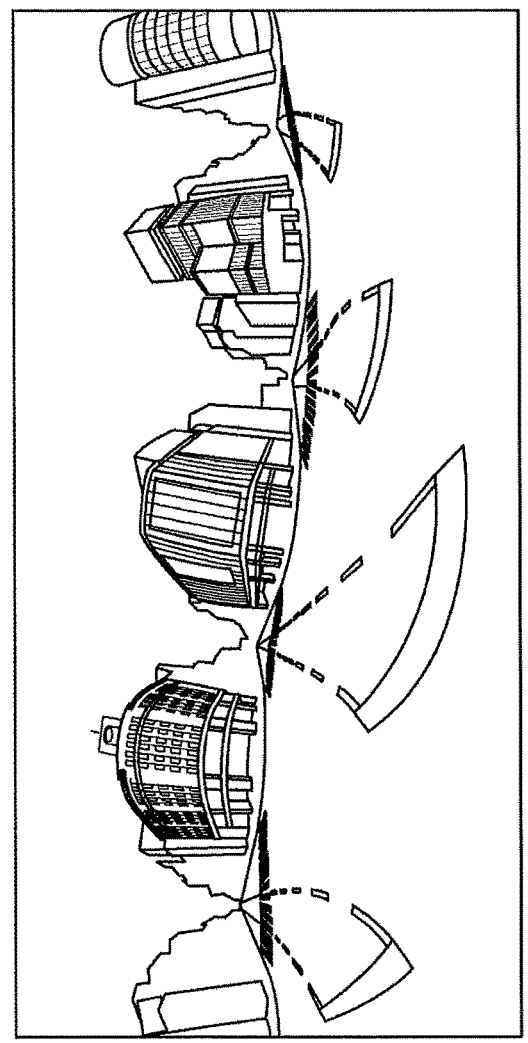

Next, with reference to FIG. 7A to FIG. 8B, an outline of a process of creating an entire celestial sphere image from an image captured with the entire celestial sphere camera 9 to will be described. FIG. 7A illustrates a hemispherical image (front side) captured by the entire celestial sphere camera 9, FIG. 7B illustrates a hemispherical image (rear side) captured by the entire celestial sphere camera 9, and FIG. 7C illustrates an image expressed by an equidistant cylinder method (hereinafter referred to as "equidistant cylindrical image"). FIG. 8A is a conceptual diagram illustrating a state of covering a sphere with the equidistant cylindrical image, and FIG. 8B is a diagram illustrating an entire celestial sphere image.

As illustrated in FIG. 7A, an image obtained by the entire celestial sphere camera 9 is a hemispherical image (front side) curved by a fisheye lens. Furthermore, as illustrated in FIG. 7B, an image obtained by the entire celestial sphere camera 9 is a hemispherical image (rear side) curved by a fisheye lens. Then, the hemispheric image (front side) and the hemispheric image (rear side) that is inverted by 180 degrees, are synthesized by the entire celestial sphere camera 9, and as illustrated in FIG. 7C, an equidistant cylindrical image is created.

Figure 8B:
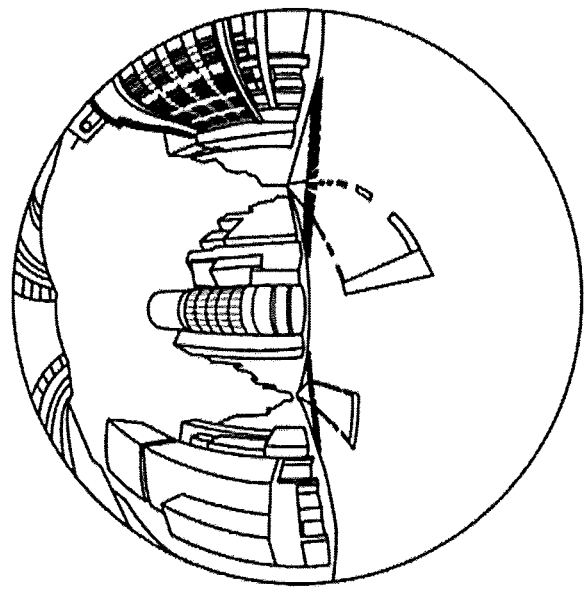
FIGS. 8A and 8B are diagrams for describing an outline of a process of creating an entire celestial sphere image from an image captured with an entire celestial sphere camera according to the first embodiment of the present invention.
Figure 8A:
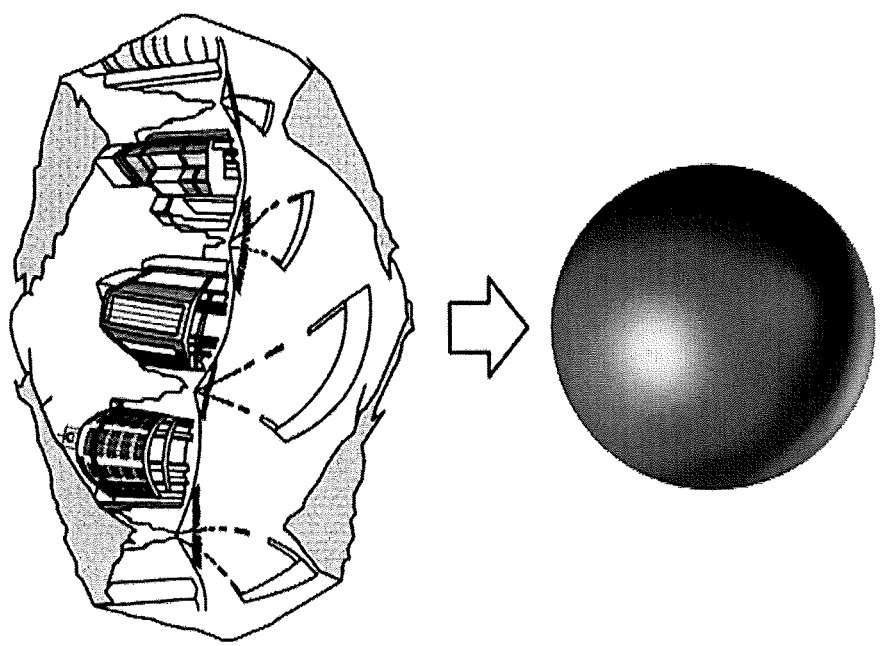

By using Open Graphics Library for Embedded Systems (OpenGL ES), as illustrated in FIG. 8A, the equidistant cylindrical image is adhered so as to cover a spherical surface, and as illustrated in FIG. 8B, an entire celestial sphere image is created. In this way, the entire celestial sphere image is expressed as an image in which the equidistant cylindrical image faces the center of the sphere. Note that OpenGL ES is a graphics library used for visualizing two-dimensional (2D) data and three-dimensional (3D) data. The entire celestial sphere image may be a still image or a moving image.

The advertisement information distributed by the advertisement distribution server 40 includes the above-described entire celestial sphere image. The entire celestial sphere image is curved because the entire celestial sphere image is an image adhered to cover a spherical surface, and human eyes will feel uncomfortable by browsing such an image. Therefore, the information processing apparatus 10 displays a predetermined area T that is a part of the entire celestial sphere image, as a planar image with little curvature, so as not to give a sense of discomfort to the human being. The predetermined area T is indicated by coordinates (X,Y,Z) in a three-dimensional virtual space. On the other hand, since the LCD 206 is a two-dimensional plane, it is impossible for the information processing apparatus 10 to display the predetermined area T without modification. Therefore, the information processing apparatus 10 obtains the predetermined area T by perspective projection transformation for projecting a three-dimensional object onto a two-dimensional plane by using the 3D computer graphic technique. As described above, as illustrated in FIG. 1, the predetermined area T of the entire celestial sphere image is displayed on the LCD 206 as a display area.

Figure 9:
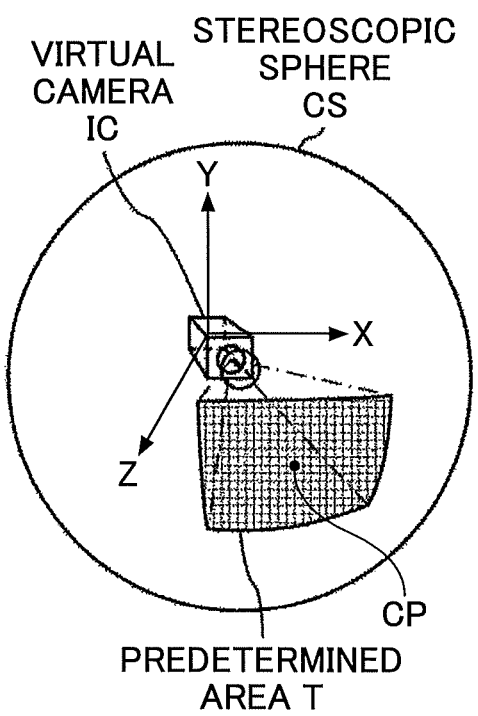
FIG. 9 is an example of a diagram for describing a visual line of the viewer according to the first embodiment of the present invention.

FIG. 9 is an example of a diagram for describing the visual line of the viewer. Since the entire celestial sphere image has three-dimensional coordinates, the visual line direction is identified by information identifying three-dimensional coordinates or coordinates of a sphere such as latitude and longitude. In the present embodiment, a center cp of the predetermined area T is set as the visual line direction.

Although the viewer can change the visual line direction by operations, assuming that the virtual camera IC does not shift in parallel, the virtual camera IC can rotate in three ways as a rigid body, that is, roll (rotation about the Z axis), yaw (rotation about the Y axis), and pitch (rotation about the X axis). When any of these three rotations occurs, the visual line direction will change. For example, when the viewer rotates the entire celestial sphere image in the horizontal direction, the yaw angle changes, and when the viewer rotates the entire celestial sphere image in a vertical direction, the pitch angle changes, and when the viewer rotates the entire celestial sphere image about the center axis of the LCD 206, the roll angle changes. In the present embodiment, the operation on the web page by the viewer is applied to the visual line direction (roll angle, yaw angle, and pitch angle), etc. It is assumed that how the operation is applied, is described in the display program in advance.

Functions—First Embodiment

Figure 10:
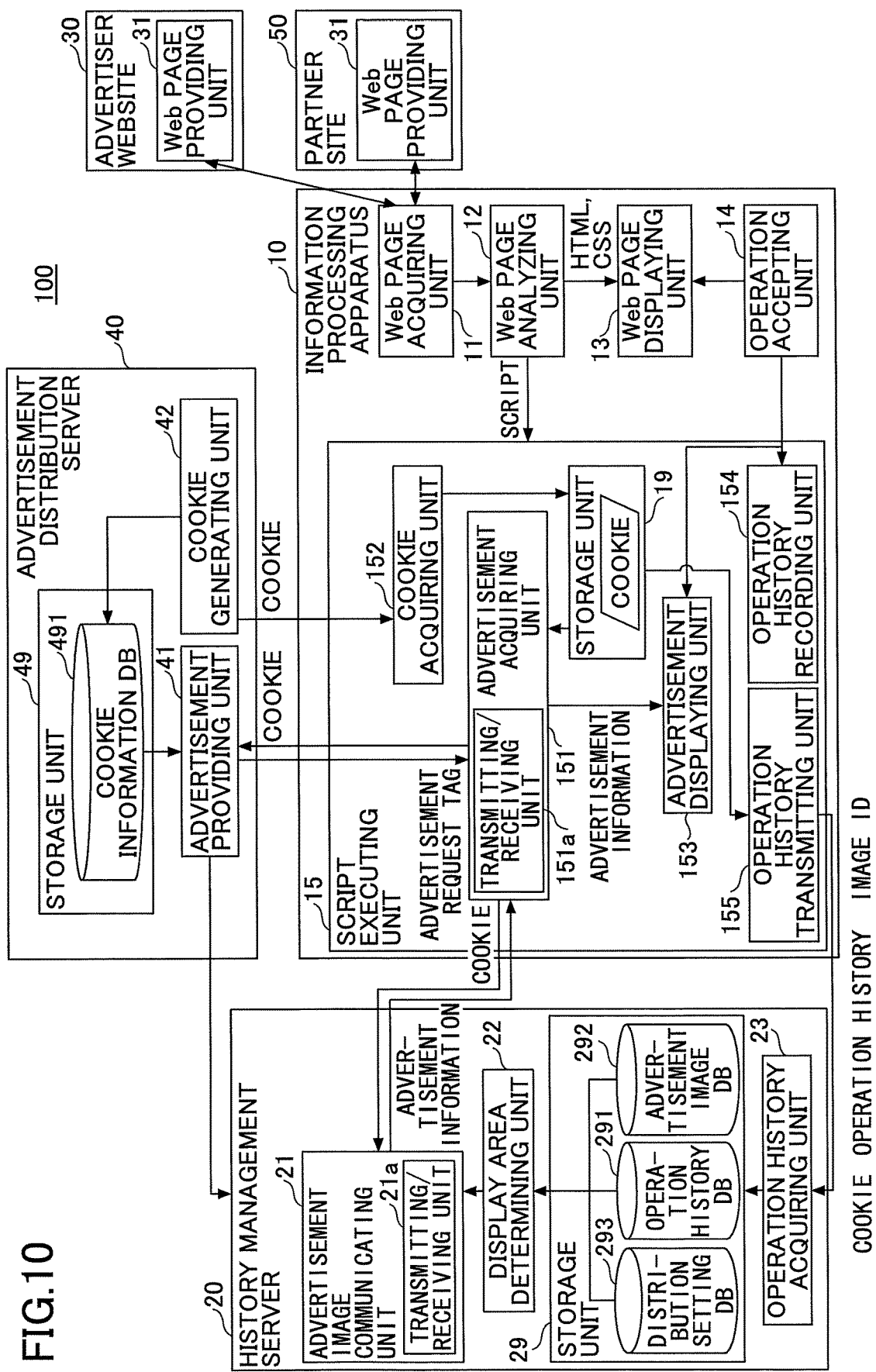
FIG. 10 is an example of a functional block diagram of the information processing apparatus according to the first embodiment of the present invention.

FIG. 10 is an example of a functional block diagram of the information processing apparatus 10, the advertiser website 30, the partner site 50, the history management server 20, and the advertisement distribution server 40.

Information Processing Apparatus 10—First Embodiment

The information processing apparatus 10 includes a web page acquiring unit 11, a web page analyzing unit 12, a web page displaying unit 13, an operation accepting unit 14, and a script executing unit 15. The functions of the information processing apparatus 10 are functions or means implemented by the CPU 201 executing the program 209p loaded in the memory 202 from the HDD 209.

The operation accepting unit 14 accepts various operations with respect to the information processing apparatus 10. Specifically, the operation accepting unit 14 accepts operations with respect to the browser 8 executed by the information processing apparatus 10. When the web page acquires a program described in the script language (the script described above), the script accepts the operation on the web page as a trigger of an action. Note that in the present embodiment, it is not strictly distinguished whether the operation target is the information processing apparatus 10, the browser 8, or the web page; an operation on the information processing apparatus 10, an operation on the browser 8, and an operation on the web page have equivalent meanings. The operation accepting unit 14 is implemented by the CPU 201 illustrated in FIG. 5 executing the program 209p to control the input device 210 and the touch panel, etc.

The web page acquiring unit 11 communicates with the advertiser website 30 and the partner site 50 by an operation by the viewer or by an action of the script, to acquire a web page from the advertiser website 30 and the partner site 50. The web page acquiring unit 11 is implemented by the CPU 201 illustrated in FIG. 5 executing the program 209p and controlling the network driver 205.

The web page analyzing unit 12 sequentially reads the HTML included in the screen information from the top, and analyzes the structure of sentences and image data included in the HTML. Furthermore, the web page analyzing unit 12 detects the linkage with sentences and image data of the HTML described in CSS, and associates sentences and image data styles included in HTML with each other. Furthermore, the web page analyzing unit 12 detects a script tag from the HTML and extracts a script described in a script language. The web page analyzing unit 12 sends HTML and CSS to the web page displaying unit 13, and sends the script to the script executing unit 15. The web page analyzing unit 12 is implemented by the CPU 201 illustrated in FIG. 5 executing the program 209p, etc.

The web page displaying unit 13 displays the web page on the LCD 206, in the order in which analysis is completed from the top of the HTML. Furthermore, the web page displaying unit 13 updates the web page according to the operation on the web page. The web page displaying unit 13 is implemented by the CPU 201 illustrated in FIG. 5 executing the program 209p, etc.

The script executing unit 15 executes the script extracted by the web page analyzing unit 12. The specific content of the script varies depending on the web page. In the present embodiment, as a script, a retargeting tag, a script associated with the advertisement space 402, and an advertisement request tag, etc., are detected. The script executing unit 15 is implemented by the CPU 201 illustrated in FIG. 5 executing the program 209p, etc. Furthermore, each function or means of the script executing unit 15 is implemented by the CPU 201 executing a script.

A cookie acquiring unit 152 is a function, in the script executing unit 15, implemented by the information processing apparatus 10 executing a retargeting tag included in the screen information acquired by the web page acquiring unit 11. The cookie acquiring unit 152 acquires a cookie from the advertisement distribution server 40.

The cookie acquired by the cookie acquiring unit 152 is stored in a storage unit 19. The storage unit 19 is implemented by the HDD 209 or the memory 202 illustrated in FIG. 5. The cookie in the storage unit 19 is referred to by an advertisement acquiring unit 151 and an operation history transmitting unit 155.

The advertisement acquiring unit 151 executes an advertisement request tag and transmits the cookie to the history management server 20. Since the history management server 20 generates the advertisement information based on the cookie, the advertisement acquiring unit 151 acquires the advertisement information. The advertisement information according to the present embodiment includes an entire celestial sphere image and a display area, and a display program for displaying the entire celestial sphere image. The display program applies the direct operation on the entire celestial sphere image, to the display mode of the entire celestial sphere image. The display program is also described in a script language and is executed by the script executing unit 15. The advertisement acquiring unit 151 includes a transmitting/receiving unit 151a. The transmitting/receiving unit 151a is in charge of processes relating to the communication of the advertisement acquiring unit 151. In the following description, the description of the process of communication by the transmitting/receiving unit 151a will be omitted.

An advertisement displaying unit 153 is a function, in the script executing unit 15, for displaying the advertisement information acquired from the history management server 20. The advertisement displaying unit 153 displays an advertisement including an entire celestial sphere image in the advertisement space 402. Furthermore, the advertisement displaying unit 153 changes the display mode of the entire celestial sphere image in accordance with a direct operation on the entire celestial sphere image.

An operation history recording unit 154 records the operation history indicated in Table 2 described later. As indicated in Table 2, the operation history includes an image ID, a browsing time, a cookie, and browsing angles of view 1 to 3. The image ID is information for identifying an entire celestial sphere image included in the web page of the advertiser website 30. ID is an abbreviation for Identification, which means an identifier or identification information. An ID is a name, a symbol, a character string, a numerical value, or a combination of one or more of these items, which are used for uniquely distinguishing a particular object from a plurality of objects. The same applies to the following IDs. The browsing time is the time at which the viewer has browsed the entire celestial sphere image of the advertiser website 30. The cookie will be described with reference to Table 1. The browsing angles of view 1 to 3 are angles of view at which the viewer has stopped the entire celestial sphere image without rotating the entire celestial sphere image, for more than a predetermined time (for example, one second). The operation history recording unit 154 records the top three angles of view in terms of the still time (the time during which the image is stopped at the angle of view). Only one angle of view or four or more angles of view may be recorded. Furthermore, the operation history recording unit 154 records whether the viewer has enlarged or reduced the image at the respective browsing angles of view 1 to 3.

The operation history transmitting unit 155 is a function, in the script executing unit 15, implemented by executing a retargeting tag included in the screen information acquired by the web page acquiring unit 11. The operation history transmitting unit 155 transmits, to the history management server 20, the operation history of the entire celestial sphere image displayed on the advertiser website 30, together with the cookie.

Advertiser Website 30 and Partner Site 50—First Embodiment

The advertiser website 30 and the partner site 50 include a web page providing unit 31. The functions of the advertiser website 30 and the partner site 50 are functions or means implemented by the CPU 201 executing the program 209p loaded in the memory 202 from the HDD 209.

The web page providing unit 31 interprets a HTTP request from the information processing apparatus 10, constructs a web page, and transmits the web page to the information processing apparatus 10 as an HTTP response. If necessary for processing, the web page providing unit 31 requests the application server to perform the process, arranges the processing result on the web page, and transmits the web page. The web page providing unit 31 is implemented by the CPU 201 illustrated in FIG. 5 executing the program 209p, etc.

Advertisement Distribution Server 40—First Embodiment

The advertisement distribution server 40 includes an advertisement providing unit 41 and a cookie generating unit 42. The functions of the advertisement distribution server 40 are functions or means implemented by the CPU 201 executing the program 209p loaded in the memory 202 from the HDD 209.

In a storage unit 49, a cookie information database (DB) 491 is constructed. The storage unit 49 is implemented by the HDD 209 or the memory 202 illustrated in FIG. 5.

the cookie in the cookie information DB 491 in the storage unit 49. The cookie generating unit 42 is implemented by the CPU 201 illustrated in FIG. 5 executing the program 209p, etc.

The advertisement providing unit 41 interprets the HTTP request transmitted together with the cookie from the information processing apparatus 10, determines the history management server 20 to purchase the advertisement space 402, and transmits the advertisement request tag to the information processing apparatus 10 as an HTTP response. The advertisement providing unit 41 is implemented by the CPU 201 illustrated in FIG. 5 executing the program 209p, etc.

History Management Server 20—First Embodiment

The history management server 20 includes an advertisement image communicating unit 21, a display area deter-

TABLE 1

| COOKIE NAME | COOKIE VALUE | GENERATION TIME | EXPIRATION DATE | DOMAIN NAME |
|---|---|---|---|---|
| COOCLE-001 | 1234 | 2017/01/16 15:15 | 2017/01/23 15:15 | www.fudousan.com |
| COOCLE-001 | 9876 | 2017/01/16 19:28 | 2017/01/23 19:28 | www.fudousan.com |
| ... | ... | ... | ... | ... |

Table 1 schematically indicates the information stored in the cookie information DB 491. The cookie information DB 491 records information on each cookie. In the cookie information DB 491, items such as a cookie name, a cookie value, a generation time, an expiration date, and a domain name are recorded for each cookie. The cookie name is any name that the advertisement distribution server 40 applies to the cookie. The advertisement distribution server 40 applies the name according to a predetermined rule. The cookie value is identification information that does not overlap any other cookie value. The generation time is the last time the viewer visited the site. The expiration date is a deadline until mining unit 22, and an operation history acquiring unit 23. The functions of the history management server 20 are functions or means implemented by the CPU 201 executing the program 209p loaded in the memory 202 from the HDD 209.

Furthermore, the history management server 20 includes a storage unit 29 implemented by the HDD 209 or the memory 202 illustrated in FIG. 5. In the storage unit 29, an operation history DB 291, an advertisement image DB 292, and a distribution setting DB 293 are constructed.

TABLE 2

| IMAGE ID | BROWSING TIME | COOKIE | BROWSING ANGLE OF VIEW 1 | BROWSING ANGLE OF VIEW 2 | BROWSING ANGLE OF VIEW 3 |
|---|---|---|---|---|---|
| 0001-1 | 2017/01/10 12:20 | COOKIE NAME COOKIE VALUE EXPIRATION DATE DOMAIN | (Xs1, Ys1) (Xe1, Ye1) ENLARGEMENT: YES ANGLE OF VIEW AFTER ENLARGEMENT REDUCTION: NO STILL TIME: 10 SECONDS | (Xs2, Ys2) (Xe2, Ye2) ENLARGEMENT: NO REDUCTION: YES STILL TIME: 5 SECONDS | (Xs3, Ys3) (Xe3, Ye3) ENLARGEMENT: YES ANGLE OF VIEW AFTER ENLARGEMENT REDUCTION: NO STILL TIME: 3 SECONDS |
| ... | ... | ... | ... | ... | ... | the cookie is valid (available). The domain name is the domain of the advertiser website 30. The browser 8 (viewer) that has browsed the advertiser website 30 is identified by the cookie.

Functions of Advertisement Delivery Server—First Embodiment

The cookie generating unit 42 generates a cookie for identifying the browser 8 that has been used for browsing the advertiser website 30. The cookie generating unit 42 stores Table 2 schematically indicates the information stored in the operation history DB 291. In the operation history DB 291, a history of what operation each viewer has performed on the entire celestial sphere image, is recorded. In the operation history DB 291, items of an image ID, a browsing time, a cookie, and browsing angles of view 1 to 3 are recorded. The image ID is information for identifying the entire celestial sphere image. The cookie is as described as above. The browsing angles of view 1 to 3 are angles of view at which the viewer has browsed the entire celestial sphere image. Each of the browsing angles of view 1 to 3 stores the still time, an indication of whether the image has been enlarged, the angle of view after enlargement in the case where the image has been enlarged, and an indication of whether the image has been reduced. Thus, for each image, the angle of view in which the user has seemed to be interested in is recorded. The history management server 20 refers to the browsing angles of view 1 to 3 and determines the display area of the entire celestial sphere image at the time of the advertisement.

TABLE 3

| DOMAIN | IMAGE ID | IMAGE | IMAGE CONTENT |
|---|---|---|---|
| www.fudousan.com | 0001-1 | 0001-1.jpg | INDOORS |
| | 0001-2 | 0001-2.jpg | OUTDOORS |
| | ... | ... | ... |

Table 3 schematically indicates the information stored in the advertisement image DB 292. In the advertisement image DB 292, information on the entire celestial sphere image displayed on the advertiser website 30, is registered. In the advertisement image DB 292, the image ID, the image, and the image content are stored in association with the domain. The domain name is information for identifying the advertiser website 30. The image ID is information for identifying the entire celestial sphere image displayed in the advertisement space 402. That is, the image ID is the image ID of the entire celestial sphere image displayed on the advertiser website 30. The image is image data of the entire celestial sphere image. The image content is information for the advertiser to determine the content of the image. In the case of real estate, a plurality of entire celestial sphere images indicating different imaging positions of one object, are registered.

TABLE 4

| DOMAIN NAME | ADVERTISEMENT TARGET | NON-ADVERTISEMENT TARGET | ADVERTISEMENT CONTENT |
|---|---|---|---|
| www.fudousan.com | SINGLE WOMEN | UNDERAGE | SAME PRODUCT |
| www.tochi.com | SINGLE WOMEN | UNDERAGE | SIMILAR PRODUCT |

Table 4 schematically indicates the information stored in the distribution setting DB 293. In the distribution setting DB 293, the kind of rule by which the history management server 20 distributes the advertisement, is set. In the distribution setting DB 293, items such as a domain name, an advertisement target, a non-advertisement target, and advertisement content are recorded. The domain name is information for linking the cookie and advertisement distribution, and the domain of the advertiser website 30 is set. The advertisement target is an attribute of a viewer that is desired to intensively browse the advertisement. The non-advertisement target is an attribute of a viewer that is not desired to browse the advertisement. In the advertisement content, the content of advertisement is to be browsed is set. For example, when the advertisement content indicates same product, the same product as the product browsed by the viewer on the advertiser website 30, is advertised. When the advertisement content indicates similar product, a product similar to the product browsed by the viewer on the advertiser website 30, is advertised. In Table 4, as a matter of convenience of the description, the distribution setting is associated with the domain; however, the distribution setting may be associated with each image ID. The method of distributing the advertisement can be determined in detail for each image.

Functions of the History Management Server—First Embodiment

The advertisement image communicating unit 21 acquires the cookie from the information processing apparatus 10 and causes the display area determining unit 22 to determine the entire celestial sphere image to be displayed as an advertisement, and the display area. Furthermore, the advertisement image communicating unit 21 transmits the advertisement information (entire celestial sphere image and display area) to the advertisement distribution server 40. The advertisement image communicating unit 21 includes a transmitting/receiving unit 21a. The transmitting/receiving unit 21a is in charge of processing relating to communication of the advertisement image communicating unit 21. In the following description, the description of the process of communication by the transmitting/receiving unit 21a will be omitted.

The display area determining unit 22 identifies the image ID that the viewer has been browsing from the operation history DB 291, based on the cookie. Also, the display area determining unit 22 searches the advertisement image DB 292 with the domain included in the cookie, and identifies the advertiser website 30. The display area determining unit 22 identifies the entire celestial sphere image of the identified advertiser website 30, by the image ID. Then, the display area of the entire celestial sphere image is determined by the browsing angles of view 1 to 3 in the operation history DB 291.

First, it is considered that the angle of view that the viewer is interested in, will be displayed for a long time. Therefore, first, the browsing angle of view corresponding to the longest still time is determined to be the display area.

Furthermore, enlargement and reduction may be considered. When the image is enlarged, it is considered that the viewer is interested in the displayed image. When the image is reduced, it is considered that the viewer is interested in a wider range that the image being displayed. The display area determining unit 22 converts the still time, the enlargement, and the reduction into points, and determines the angle of view having the highest points, to be the display area.

Points of browsing angle of view 1=10 seconds×1.5 (enlarged)=15

Points of browsing angle of view 2=5 seconds×0.8 (reduced)=4.8

Points of browsing angle of view 3=3 seconds× 1.5=4.5

The operation history acquiring unit 23 acquires the operation history together with the cookie from the information processing apparatus 10, and sets this information in the operation history DB 291. The operation history acquiring unit 23 is implemented by the CPU 201 illustrated in FIG. 5 executing the program 209p to control the network driver 205, etc.

Note that the history management server 20 may include the operation history recording unit 154 of the information processing apparatus 10. However, since the operation history recording unit 154 requires time-series operation contents, there is a possibility that it may be difficult for the history management server 20 to acquire the operation content, depending on the communication band, etc. On the other hand, the operation history recording unit 154 of the information processing apparatus 10 only needs to transmit the final operation history to the history management server 20, and therefore the communication load can be reduced.

Information Held by Each Web Page—First Embodiment

FIGS. 11A and 11B are examples of diagrams for schematically describing information held by each web page. FIG. 11A illustrates a web page provided by the advertiser website 30, and FIG. 11B illustrates a web page provided by the partner site 50.

The web page provided by the advertiser website 30 includes an entire celestial sphere image 401, and the entire celestial sphere image has an image ID. Furthermore, a retargeting tag 404 is attached to the web page provided by the advertiser website 30, and the web page is transmitted to the information processing apparatus 10. In the retargeting tag 404, the Uniform Resource Locater (URL) of the advertisement distribution server 40 is described, and the browser 8 executes the retargeting tag 404 to acquire a cookie 403 from the advertisement distribution server 40. Furthermore, the URL of the history management server 20 is described in the retargeting tag 404, and the browser 8 executes the retargeting tag 404 to transmit the cookie 403, the image ID, and the operation history to the history management server 20.

The web page provided by the partner site 50 includes an advertisement space 402. In the advertisement space 402, a script such as an ad tag and the advertisement space ID are associated with each other, and the URL of the advertisement distribution server 40 is described in the script. The browser 8 executes the script and transmits the cookie 403 to the advertisement distribution server 40.

Angle of View—First Embodiment

FIG. 12 is an example of a diagram for describing a browsing angle of view of the entire celestial sphere image. The entire celestial sphere image in FIG. 12 is expressed by equidistant cylindrical projection. When the viewer operates the entire celestial sphere image, the predetermined area T is displayed as an entire celestial sphere as illustrated in FIG. 1A. In this case, the browsing angle of view of the entire celestial sphere image is expressed by the coordinates of four points clipped from the entire celestial sphere image. Since the predetermined region T is a rectangle, in the present embodiment, the browsing angle of view is indicated only by diagonal vertices.

Operation History—First Embodiment

FIG. 13 is an example of a diagram for describing the recording of an operation history. The viewer operates the entire celestial sphere image on the web page provided by the advertiser website 30. In FIG. 13, the entire celestial sphere image of the web page is displayed in a simplified manner by equidistant cylindrical projection. Since this entire celestial sphere image is of real estate property, a kitchen 341, an entrance 342, a window 343, and a veranda 344 (the ceiling and the floor are included but are omitted) are appearing in the entire celestial sphere image.

The viewer rotates the entire celestial sphere image and browses an object (location) in which the viewer is interested. The image is not still while rotating, but when the still time becomes greater than or equal to a predetermined time, the operation history recording unit 154 records browsing angles of view 301 to 303 and the still times. Also, an indication of whether the image has been enlarged or reduced, and the browsing angle of view after enlargement and after reduction, are recorded.

Operation Procedure—First Embodiment

Figure 14:
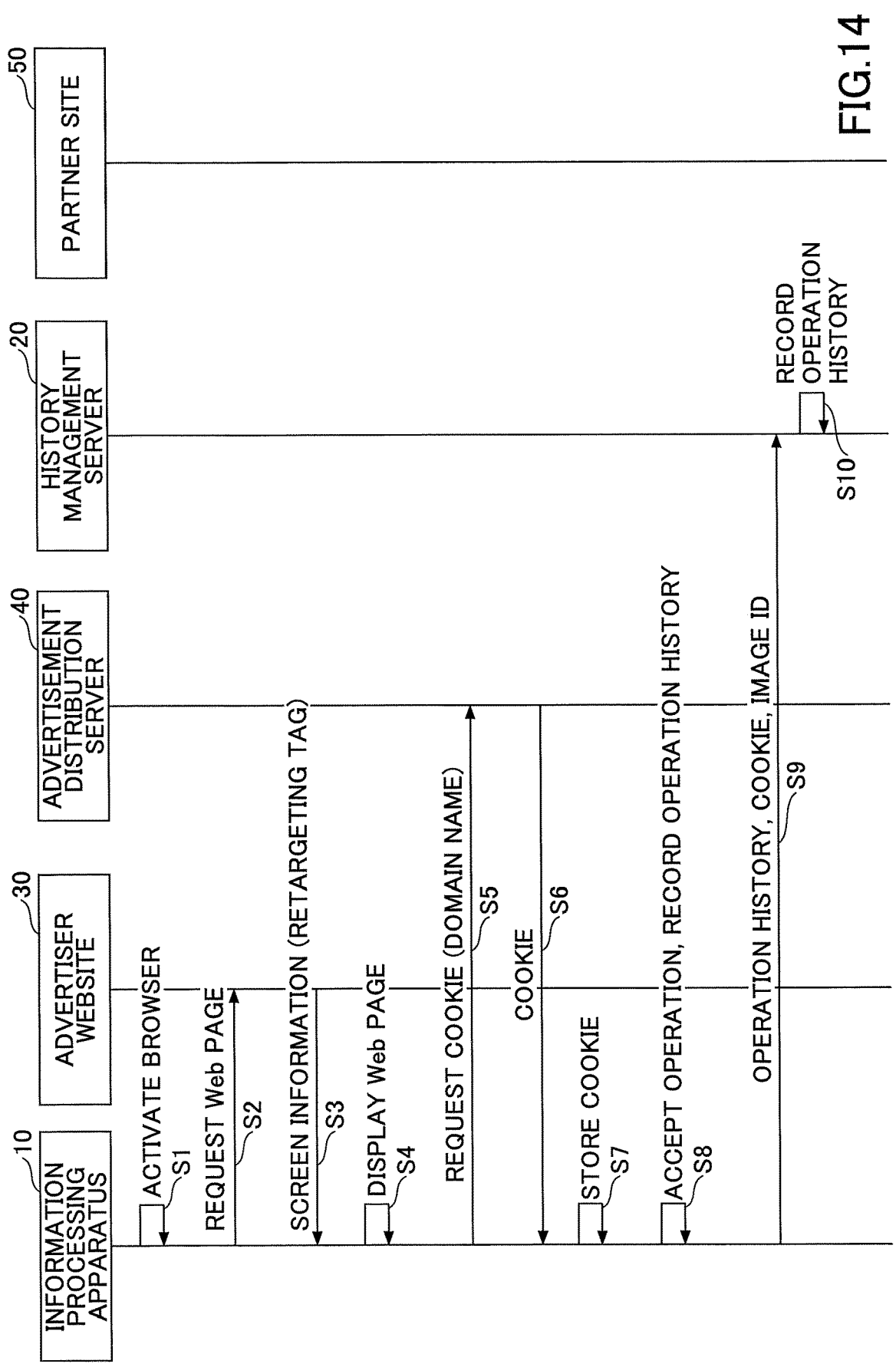
FIG. 14 is a sequence diagram until a history management server records the operation history according to the first embodiment of the present invention.
Figure 15:
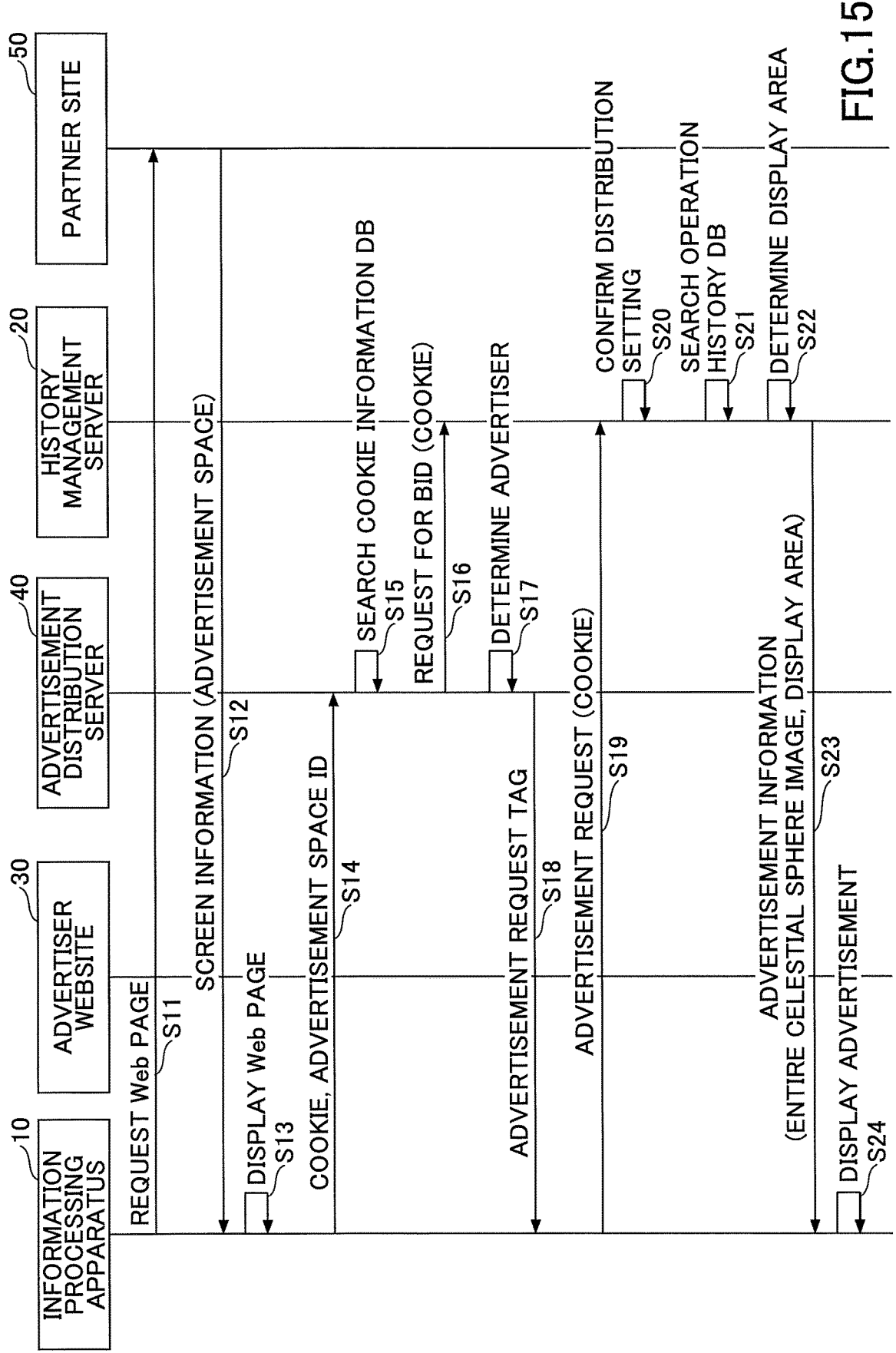
FIG. 15 is a sequence diagram until the information processing apparatus displays the advertisement according to the first embodiment of the present invention.

The operations by the browsing system 100 will be described with reference to FIGS. 14 and 15. FIG. 14 is a sequence diagram until the history management server 20 records the operation history, and FIG. 15 is a sequence diagram until the information processing apparatus 10 displays the advertisement.

Step S1: The viewer first performs an operation to activate the browser 8. The information processing apparatus 10 activates the browser 8. Step S2: The viewer performs an operation to display the advertiser website 30, and the operation accepting unit 14 of the information processing apparatus 10 accepts the URL and the IP address of the advertiser website 30. The web page acquiring unit 11 of the information processing apparatus 10 sends a request for the web page to the advertiser website 30.

Step S3: The web page providing unit 31 of the advertiser website 30 transmits the screen information including the retargeting tag, to the information processing apparatus 10. The transmission of the retargeting tag need not be simultaneous with the transmission of the screen information.

Step S4: The web page analyzing unit 12 analyzes the web page, detects the script (retargeting tag), and sends HTML and CSS to the web page displaying unit 13. As a result, the web page of the advertiser website 30 is displayed.

Step S5: By executing the retargeting tag, the cookie acquiring unit 152 sends a request for a cookie to the URL of the advertisement distribution server 40 described in the retargeting tag. At this time, in order to identify the advertiser website 30, the domain name of the web page is transmitted.

Step S6: The cookie generating unit 42 of the advertisement distribution server 40 generates a cookie including the cookie name, the cookie value, the generation time, the expiration date, and the domain name, and transmits the cookie to the information processing apparatus 10.

Step S7: The cookie acquiring unit 152 of the information processing apparatus 10 receives the cookie and stores the cookie in the storage unit 19. Step S8: The operation accepting unit 14 of the information processing apparatus 10 accepts an operation on the entire celestial sphere image by the viewer, and notifies the operation history recording unit 154 of the operation. The operation history recording unit 154 records the operation history.

When the viewer browses a plurality of entire celestial sphere images, the operation history is recorded for all of the entire celestial sphere images.

Step S9: The operation history transmitting unit 155 of the information processing apparatus 10 transmits the operation history and cookie together with the image ID, to the URL of the history management server 20 described in the retargeting tag. Note that the timing of transmitting the operation history may be when the viewer has finished browsing the advertiser website 30, or when the viewer has finished browsing one entire celestial sphere image and has shifted to browsing the next entire celestial sphere image. Alternatively, the operation history may be transmitted according to an explicit operation by the viewer.

Step S10: The operation history acquiring unit 23 of the history management server 20 receives the image ID, the operation history, and the cookie, and stores this information in the operation history DB 291.

Step S11: Next, the viewer performs an operation for displaying the partner site 50, and the operation accepting unit 14 of the information processing apparatus 10 accepts a URL or IP address of the partner site 50. The web page acquiring unit 11 of the information processing apparatus 10 sends a request for the web page to the partner site 50. Step S12: The web page providing unit 31 of the partner site 50 transmits the screen information including the advertisement space, to the information processing apparatus 10. The transmission of the advertisement space does not have to be simultaneous with the transmission of the screen information.

Step S13: The web page analyzing unit 12 analyzes the web page, detects the script associated with the advertisement space, and sends the HTML and CSS to the web page displaying unit 13. Accordingly, the web page of the partner site 50 is displayed.

Step S14: As the script of the advertisement space is executed, the advertisement acquiring unit 151 transmits the cookie and the advertisement space ID, to the URL of the advertisement distribution server 40 described in the advertisement space.

Step S15: The advertisement providing unit 41 of the advertisement distribution server 40 receives the cookie and the advertisement space ID. The advertisement providing unit 41 of the advertisement distribution server 40 searches the cookie information DB 491 with the received cookie. When the cookie is registered in the cookie information DB 491, the advertisement distribution server 40 detects that a viewer who is a target of retargeting, has visited the partner site 50.

Step S16: In many cases, the browser 8 of the information processing apparatus 10 stores a plurality of cookies. In this case, the advertisement acquiring unit 151 transmits all of the cookies related to the advertisement distribution server 40, to the advertisement distribution server 40. The advertisement providing unit 41 calls for a bid based on the domains of the cookies. When the cookie is transmitted to the history management server 20, the history management server 20 makes a bid based on the cookie value of the cookie, the generation time, and the attribute of the viewer.

Step S17: The advertisement providing unit 41 sells the advertisement space to the history management server 20 satisfying the bidding criterion such as a bid price. In the present embodiment, it is assumed that the history management server 20 has identified a viewer of the advertiser website 30 having an operation history based on the cookie value, and has purchased the advertisement space.

Step S18: The advertisement providing unit 41 of the advertisement distribution server 40 transmits the advertisement request tag (program) and the advertisement space ID to the information processing apparatus 10. The advertisement request tag includes a URL of the history management server 20 that has purchased the advertisement space, etc., and the advertisement request tag is a program for the information processing apparatus 10 to request an advertisement to be distributed to the advertisement space purchased by the history management server 20.

Step S19: The advertisement acquiring unit 151 of the information processing apparatus 10 acquires the advertisement request tag, and executes the advertisement request tag, thereby transmitting the advertisement request and the cookie to the history management server 20.

Step S20: The advertisement image communicating unit 21 of the history management server 20 receives the advertisement request and sends a cookie to the display area determining unit 22. The display area determining unit 22 refers to the distribution setting DB 293 and confirms the distribution setting. The display area determining unit 22 confirms the attribute of the viewer, to confirm that the viewer is an advertisement target and not a non-advertisement target. Attributes of the viewer are age range, gender, occupation, family composition, annual income, and location, etc. The history management server 20 stores the attributes of the viewers in association with the cookies. Note that the attributes of the viewer may be the attributes accumulated by the advertisement distribution server 40, or may be acquired from a server that specializes in accumulating attributes of viewers. The display area determining unit 22 of the history management server 20 refers to the distribution setting DB 293 and determines the advertisement content. Here, it is assumed that the same product is specified.

Step S21: The display area determining unit 22 searches the operation history DB 291 with a cookie. Accordingly, the image ID and the browsing angles of view 1 to 3 are determined. There are cases where a plurality of image IDs are associated with a cookie. This is a case when the viewer has browsed a plurality of entire celestial sphere images. In this case, all of the plurality of entire celestial sphere images may be transmitted. Alternatively, an entire celestial sphere image including the browsing angle of view having the highest points may be determined, or an entire celestial sphere image having the earliest or the latest browsing time may be determined.

Step S22: The display area determining unit 22 converts the browsing angles of view 1 to 3 into points, and determines the browsing angle of view with the highest points to be the display area. Since the advertisement content is "the same image", the display area determining unit 22 reads the entire celestial sphere image identified by the domain and the image ID, from the advertisement image DB 292.

Step S23: The advertisement image communication unit 21 transmits the advertisement information (the entire celestial sphere image and display area) to the information processing apparatus 10.

Step S24: The advertisement acquiring unit 151 of the information processing apparatus 10 receives the advertisement information. The advertisement displaying unit 153 displays the entire celestial sphere image at the angle of view determined by the display area, in the advertisement space for which an advertisement has been requested by the advertisement request tag.

As described above, the browsing system 100 according to the present embodiment can trace the viewer with the cookie and display the entire celestial sphere image at the angle of view in which the viewer has been interested. The information processing apparatus 10 can display the display area of the entire celestial sphere image in which the viewer has been interested, immediately after displaying the website (initial state), and therefore the click rate can be improved.

Note that in the present embodiment, although the advertisement distribution server 40 transmits the advertisement request tag to the information processing apparatus 10, the history management server 20 may acquire the advertisement information from the advertisement distribution server 40, and directly transmit the advertisement information to the information processing apparatus 10.

Furthermore, the information processing apparatus 10 is configured to acquire the screen information including the retargeting tag from the advertiser website 30, and to acquire the screen information including the advertisement space from the partner site 50; however, for example, the information processing apparatus 10 may acquire, from the advertiser website 30, screen information including a retargeting tag and screen information and an advertisement space. Furthermore, the information processing apparatus 10 may acquire, from the partner site 50, screen information including a retargeting tag and screen information including the advertisement space.

Furthermore, in step S9, the information processing apparatus 10 transmits the operation history, the cookie, and the image ID to the history management server 20; however, the information processing apparatus 10 does not have to transmit the operation history in step S9, when the history management server 20 acquires the image ID operated at the information processing apparatus 10 by a different method (for example, a case where an image to be displayed is notified from the advertiser website 30 to the history management server 20, and the history management server 20 transmits the image to the information processing apparatus 10, so that the history management server 20 can identify the image to be displayed on the information processing apparatus 10; or a case where the information processing apparatus 10 analyzes the screen information and separately acquires an image to be operated from the history management server 20 and displays the acquired image, so that the history management server 20 can identify the image to be displayed on the information processing apparatus 10, etc.).

Second Embodiment

In the present embodiment, the browsing system 100 that can record the operation history even when the viewer is browsing an image other than an entire celestial sphere image, will be described. Furthermore, the browsing system 100 that can display different entire celestial sphere images at the advertiser website 30 and the partner site 50, will be described.

Since the system configuration, the hardware configuration, and the functional block diagram are the same as those of the first embodiment, the differences will mainly be described.

When a Planar Image is Browsed on the Advertiser Website—Second Embodiment

Figure 16:
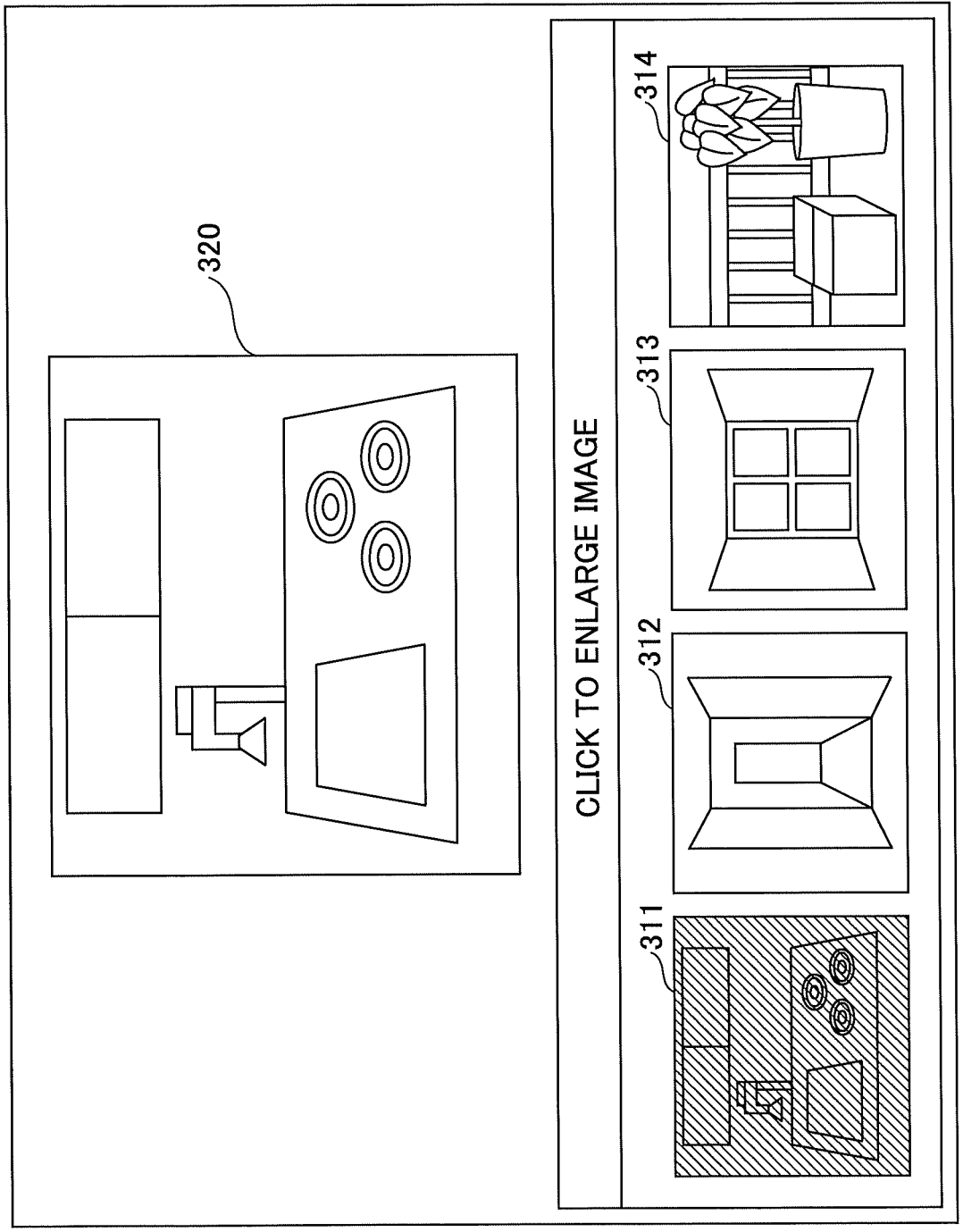
FIG. 16 is an example of a diagram for describing an image displayed on an advertiser website according to a second embodiment of the present invention.

FIG. 16 is an example of a diagram for describing an image displayed on the advertiser website 30. On the advertiser website 30, four planar images 311 to 314 of a certain real estate property are prepared. When the viewer clicks any of the planar images 311 to 314, the clicked planar image is displayed in an enlarged state in a display field 320. Since the angle of view is fixed in the planar images 311 to 314, the operation history recording unit 154 cannot record the browsing angle of view. However, the advertiser wants to know the object that the viewer is interested in, and therefore as long as the advertiser can recognize what is displayed in the planar images 311 to 314, the advertiser can use the clicked planar image to provide an appropriate advertisement.

In the case of the planar images 311 to 314, for example, imaging objects are recorded in metadata (data in which information relating to the planar images is recorded) of the planar images 311 to 314. The imaging object of the planar image 311 is a kitchen, the imaging object of the planar image 312 is an entrance, the imaging object of the planar image 313 is a window, and the imaging object of the planar image 314 is a veranda. The operation history recording unit 154 records the imaging object of the planar image displayed in an enlarged state in the display field 320, as the operation history.

Figure 17:
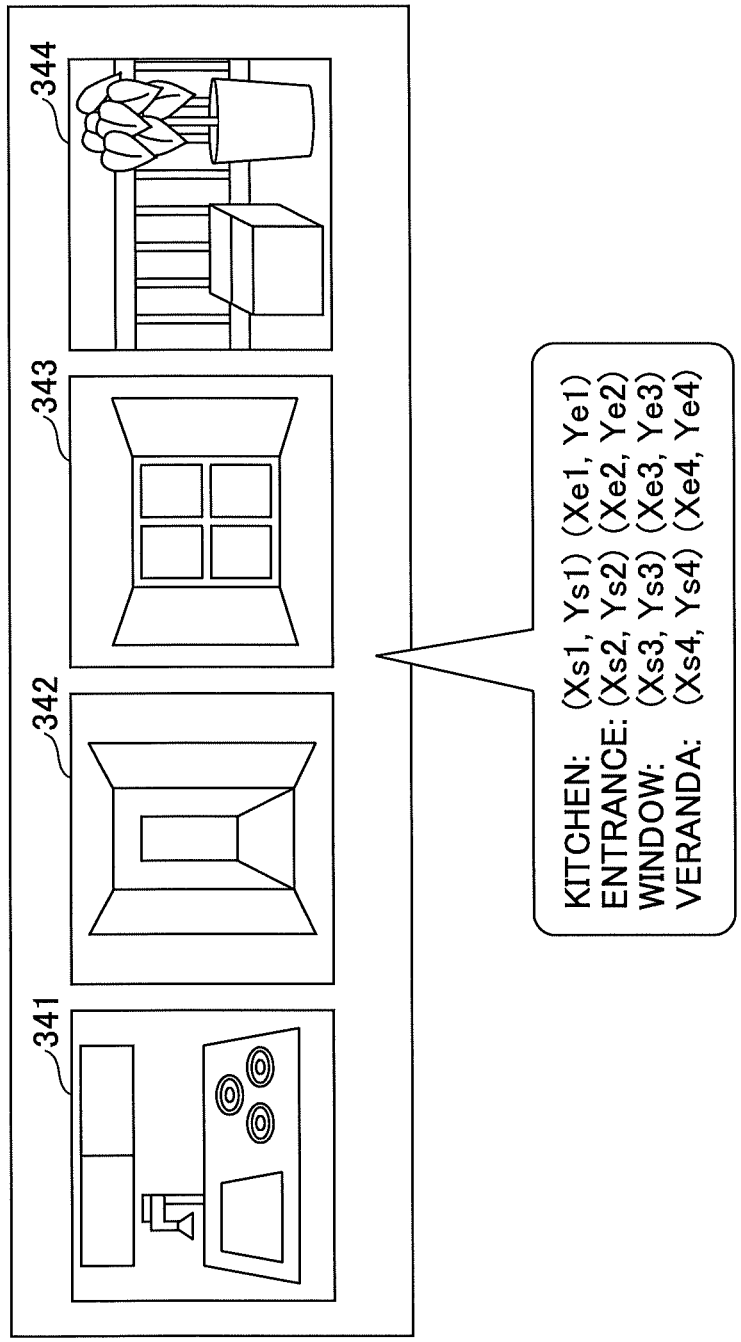
FIG. 17 is a diagram schematically illustrating information included in an advertisement image DB according to the second embodiment of the present invention.

On the other hand, as illustrated in FIG. 17, the history management server 20 holds the angle of view of the entire celestial sphere image and the imaging object in association with each other, in the advertisement image DB 292. FIG. 17 is a diagram schematically illustrating information included in the advertisement image DB 292. In FIG. 17, the kitchen, the entrance, the window, and the veranda appear in the one entire celestial sphere image. In the advertisement image DB 292, the angles of view of the kitchen 341, the entrance 342, the window 343, and the veranda 344 are registered.

Therefore, if there is a record in the operation history DB 291 indicating that the display time of the planar image 311 (kitchen) is the longest, the display area determining unit 22 can determine the angle of view at which the kitchen appears in the entire celestial sphere image, as the initial display area to be displayed in the advertisement.

Thus, even when the viewer is browsing an image other than an entire celestial sphere image, the operation history can be recorded and the display area of the advertisement can be determined. Note that the four planar images 311 to 314 and the entire celestial sphere image may be images obtained by capturing the same property, or images obtained by capturing different properties.

When Displaying Different Entire Celestial Sphere Images on Advertiser Website and Partner Site—Second Embodiment By adopting the same mechanism of recording the operation history, the browsing system 100 can display different entire celestial sphere images on the advertiser website 30 and the partner site 50.

Figure 18A:
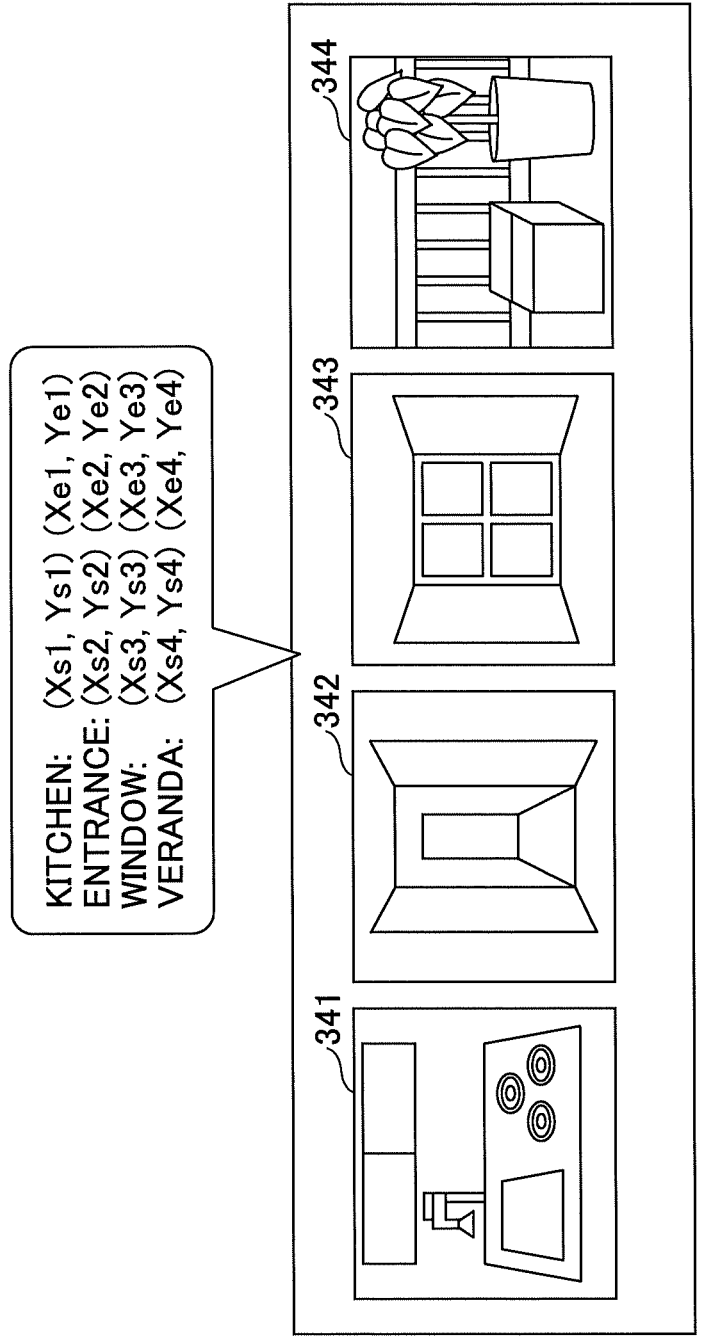

FIGS. 18A and 18B schematically illustrate two entire celestial sphere images and the angles of view in which the objects appear. Since the two entire celestial sphere images are of different properties, the objects appearing in the respective angles of view are not the same. However, as illustrated in FIG. 17, if the objects appearing in the respective angles of view of the entire celestial images are set in the advertisement image DB 292, the operation history recording unit 154 can record the display angle of view, so that the display area determining unit 22 can determine the object appearing in the recorded display angle of view. For example, it is assumed that the entire celestial sphere image in FIG. 18A is displayed on the advertiser website 30, and (Xs1, Ys1) (Xe1, Ye1) is recorded as the browsing angle of view. It is set in the advertisement image DB 292 that this browsing angle of view corresponds to a kitchen. Therefore, in the case where the entire celestial sphere image in FIG. 18B is displayed on the partner site 50, the angle of view of the kitchen (Xs2, Ys2) (Xe2, Ye2) becomes the display area.

Advertisement Image DB—Second Embodiment

TABLE 5A

| DOMAIN | IMAGE ID | PLANAR IMAGE | IMAGE CONTENT | OBJECT |
|---|---|---|---|---|
| www.fudousan.com | 0001-1 | 0001-1.jpg | INDOORS | KITCHEN |
| | 0001-2 | 0001-2.jpg | INDOORS | ENTRANCE |
| | 0001-3 | 0001-3.jpg | INDOORS | WINDOW |
| | 0001-4 | 0001-4.jpg | INDOORS | VERANDA |

TABLE 5B

| DOMAIN | IMAGE ID | IMAGE | IMAGE CONTENT | OBJECT AND OBJECT ANGLE OF VIEW |
|---|---|---|---|---|
| www.fudousan.com | 0001-1 | 0001-1.jpg | INDOORS | KITCHEN: $(Xs1, Ys1)$ $(Xe1, Ye1)$ ENTRANCE: $(Xs2, Ys2)$ $(Xe2, Ye2)$ WINDOW: $(Xs3, Ys3)$ $(Xe3, Ye3)$ VERANDA: $(Xs4, Ys4)$ $(Xe4, Ye4)$ |
| | 0001-2 | 0001-2.jpg | OUTDOORS | ... |
| | 0002-1 | 0002-1.jpg | INDOORS | ENTRANCE: $(Xs1, Ys1)$ $(Xe1, Ye1)$ KITCHEN: $(Xs2, Ys2)$ $(Xe2, Ye2)$ VERANDA: $(Xs3, Ys3)$ $(Xe3, Ye3)$ WINDOW: $(Xs4, Ys4)$ $(Xe4, Ye4)$ |

The advertisement image DB 292 of the present embodiment will be described by using Tables 5A and 5B. Note that with reference to Tables 5A and 5B, the differences from Table 3 will be mainly described. Table 5A indicates the advertisement image DB 292 in which planar images are registered. An image ID and an object are registered for each planar image. Table 5B indicates the advertisement image DB 292 in which the entire celestial sphere image is registered. The advertisement image DB 292 of Table 5B includes an item of "object and object angle of view". The "object and object angle of view" is information in which the object being imaged and the angle of view are associated with each other. When the planar image is browsed at the advertiser website 30, the display area determining unit 22 identifies the object associated with the browsed planar image browsed in Table 5A, and identifies the angle of view of the entire celestial sphere image at which the identified object is appearing, in Table 5B. Furthermore, when the entire celestial sphere image is browsed, the display area determining unit 22 can identify the object associated with the display angle of view (having highest points) of the browsed entire celestial sphere image, in Table 5B, and identify the angle of view of another entire celestial sphere image at which the same object as the identified object is appearing, in Table 5B.

Operation Procedure—Second Embodiment

Figure 19:
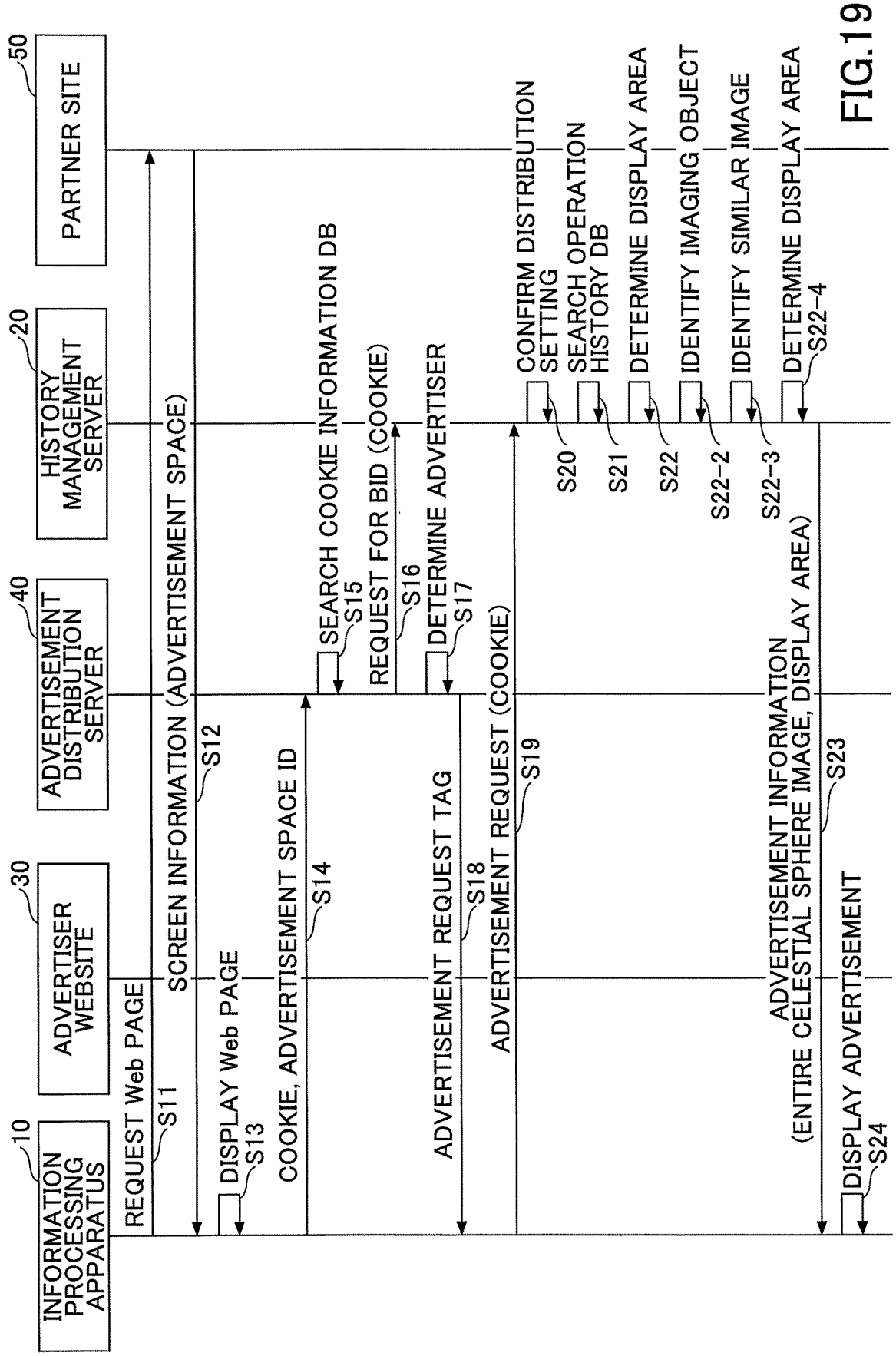
FIG. 19 is an example of a sequence diagram of a procedure for determining the display area based on the operation history according to the second embodiment of the present invention.

The recording of the operation history, among the operations by the browsing system 100 according to the present embodiment, may be the same as that of the first embodiment. FIG. 19 is an example of a sequence diagram of a procedure for determining the display area based on the operation history. In the description of FIG. 19, differences from FIG. 15 will mainly be described. The processes of steps S10 to S22 are the same as those of FIG. 15. However, it is assumed that the advertisement content is determined to be "similar product" in step S20.

Step S22-2: The display area determining unit 22 refers to the "object and object angle of view" in the advertisement image DB 292 identified by the domain and the image ID included in the cookie, and determines the object angle of view closest to the display area determined in step S22. The distance between the center of the display area and the center of the object angle of view are to be compared. Then, the object associated with this object angle of view is identified.

Step S22-3: Furthermore, since the advertisement content is "similar product", the display area determining unit 22 reads the entire celestial sphere image identified by the domain and the image ID included in the cookie, from the advertisement image DB 292. Then, the display area determining unit 22 identifies, from the advertisement image DB 292, an image similar to this entire celestial sphere image. There are several methods of identifying a similar image.

- Identify a similar entire celestial sphere image by an image recognition process such as pattern matching.
- Compare the attributes of the respective entire celestial sphere images (properties) (detached house, apartment, number of rooms, environment, and distance to the station, etc.) to identify a similar entire celestial sphere image.
- Determine, as a similar entire celestial sphere image, an entire celestial sphere image browsed by another viewer, who has browsed the same entire celestial sphere image as the entire celestial sphere image browsed by the viewer.

Determine, as a similar entire celestial sphere image, an entire celestial sphere image browsed by a viewer having similar attributes as the attributes (age, gender, occupation, family composition, annual income, and location) of the viewer.

Step S22-4: The display area determining unit 22 determines the angle of view in the similar entire celestial sphere image, at which the object determined in step S22-2 is appearing, by referring to the "object and object angle of view" in the advertisement image DB 292. Then, the determined object angle of view is determined as the display area. The subsequent processes may be the same as those of in FIG. 15.

As described above, the browsing system 100 according to the present embodiment can determine the display area of an entire celestial sphere image based on an object that is estimated attract interest according to the operation history. Therefore, the image at the time of recording the operation history, is not limited to an entire celestial sphere image. Furthermore, when an entire celestial sphere image, which is similar to the entire celestial sphere image displayed on the advertiser website 30, is displayed on the partner site 50, the optimum display area can be displayed to the viewer.

Note that in the present embodiment, the "object and object angle of view" are registered in the advertisement image DB 292. However, the display area determining unit 22 may determine the display area by image processing. When the display area is determined by the points, the display area determining unit 22 identifies the object (for example, a kitchen) appearing in the display area, by pattern matching using machine learning, etc. By identifying the object angle of view in which the same object is appearing in the similar entire celestial sphere image by similar pattern matching, the display area determining unit 22 can determine the display area in which the object is appearing in the similar entire celestial sphere image.

Third Embodiment

According to the retargeting advertisements of the first and second embodiments, when the viewer displays an advertisement, the browsing system 100 can determine the predetermined area T in the entire celestial sphere image by referring to the browsing angle of view that the viewer has displayed in the past.

However, when the partner site 50 displays the same entire celestial sphere image as the entire celestial sphere image browsed by the viewer on the advertiser website 30, the entire celestial sphere image can only be displayed at the recorded browsing angle of view. Furthermore, when the partner site 50 displays a similar entire celestial sphere image, only the same object is displayed. In this manner, there is a possibility that the display area of the entire celestial sphere image displayed by the partner site 50 is fixed.

Therefore, in the present embodiment, as described with reference to FIGS. 2 and 3, the browsing system 100 that determines the display area of the advertisement space 402 by using a statistical method will be described.

System Configuration—Third Embodiment

In the present embodiment, since the elements denoted by the same reference numerals in the first and second embodiments fulfill the same functions, only the main elements of the present embodiment may be described.

The system configuration diagram of the present embodiment is the same as FIG. 4. The contents described in the present embodiment mainly concern the stages after the information processing apparatus 10 has displayed the web page of the partner site 50. Since the advertisement space 402 exists on the web page, the cookie is transmitted to the advertisement distribution server 40. However, in the present embodiment, it is not required that the viewer has visited the advertiser website 30 in the past. Even if the viewer has visited the advertiser website 30 in the past, the history management server 20 will prioritize the display area that has been determined statistically, over the display area determined based on the past visit. When the history management server 20 purchases the advertisement space 402, the history management server 20 transmits the advertisement information to the information processing apparatus 10, and there are two phases of transmitting the advertisement information.

Accumulation phase . . . Accumulate viewer's operation history

Figure 20:
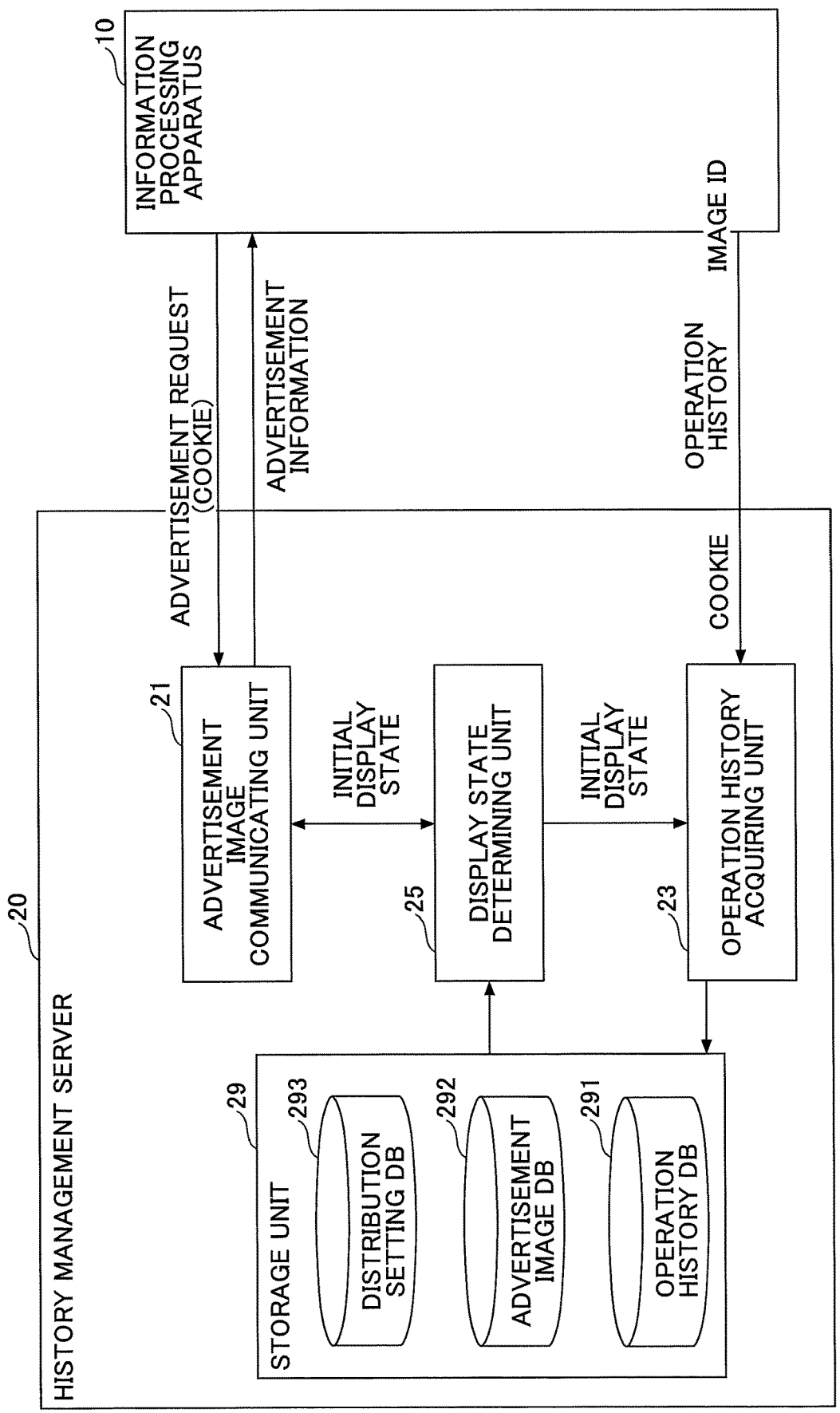
FIG. 20 is an example of a functional block diagram of the history management server according to a third embodiment of the present invention.

History use phase . . . Determine the initial display state by using operation history Functions—Third Embodiment FIG. 20 is an example of a functional block diagram of the history management server 20. The functional block diagrams of the advertiser website 30, the partner site 50, the advertisement distribution server 40, and the information processing apparatus 10 are assumed to be the same as those in FIG. 10. Furthermore, if there is any difference, the difference will be described according to need.

The functions of FIG. 20 relate to the accumulation phase. Therefore, the information processing apparatus 10 receives the advertisement request tag from the history management server 20 and executes the advertisement request tag.

The history management server 20 includes the advertisement image communicating unit 21, a display state determining unit 25, and the operation history acquiring unit 23. The functions of the advertisement image communicating unit 21 and the operation history acquiring unit 23 are the same as those of the first and second embodiments. In the storage unit 29, the distribution setting DB 293, the advertisement image DB 292, and the operation history DB 291 are stored. The distribution setting DB 293 and the advertisement image DB 292 may be the same as those of the first and second embodiments. In the present embodiment, since the information of the operation history DB 291 is different, this information will be described with reference to FIG. 40.

The display state determining unit 25 determines the initial display state. The cookie included in the advertisement request is used for retargeting in the first and second embodiments. In the present embodiment, the cookie is used for determining the entire celestial sphere image to be used for the advertisement. In order for the display state determining unit 25 to determine the entire celestial sphere image to be used for the advertisement, for example, the following modes are conceivable.

Determine any entire celestial sphere image of a product, etc., that the advertiser wishes to advertise.

Furthermore, estimate the attribute of the viewer with the cookie, and determine the entire celestial sphere image prepared for the viewer of the estimated attribute (for example, an entire celestial sphere image on a website distributed for single men in their thirties, is identified). To determine the attribute from the cookie, an attribute DB 294 of Table 7 is used.

Identify the entire celestial sphere image displayed on the advertiser website (first embodiment).

Identify an entire celestial sphere image similar to the entire celestial sphere image displayed on the advertiser website (second embodiment).

Determine the entire celestial sphere image prepared for an advertisement of a website of the same kind of the industry type as the industry type of the advertiser website (for example, if the advertiser website is real estate, identify an entire celestial sphere image of another real estate company).

The display state determining unit 25 determines the entire celestial sphere image as described above, and distributes the entire celestial sphere image to each information processing apparatus 10 so that the initial display state changes variously. The factors that determine the initial display state are as follows. These factors are referred to as image factors.

Initial angle of view

Initial magnification ratio

Link position (a position where there is a link to the advertiser website, as will be described later)

Rotational speed (when the entire celestial sphere image is rotated automatically)

Furthermore, the factor that determines the initial display state automatically determined by the advertisement space 402 of the web page of the partner site 50, is as follows. This factor is referred to as an advertisement space factor.

Advertisement space size

The display state determining unit 25 determines the initial display state of various combinations of image factors (four) and the advertisement space factor (one). For example, if each of these factors may vary in five stages, the number of combinations will be a fifth power of 5, since there is a total of 5 factors.

Among the initial display states determined by the display state determining unit 25, the initial angle of view corresponds to the display area of the first and second embodiments. Thus, in the present embodiment, the same display area as that of the browsing angle of view of the advertiser website 30, will not always be displayed. However, the same display area as that of the browsing angle of view of the advertiser website 30, may be set as the initial angle of view, to be accumulated in the operation history. In this case, it can be statistically known whether the click rate will increase by setting the same display area as that of the browsing angle of view of the advertiser website 30, as the initial angle of view.

When the advertisement image communication unit 21 transmits the advertisement information to the information processing apparatus 10, the advertisement displaying unit 153 of the information processing apparatus 10 displays the advertisement. The viewer operates the advertisement (or may not operate the advertisement in some cases). The operation history recording unit 154 records the operation history, and the operation history transmitting unit 155 transmits the operation history.

The operation history acquiring unit 23 of the history management server 20 acquires the cookie, the operation history, and the image ID of the entire celestial sphere image to be used for the advertisement, and stores the acquired information in the operation history DB 291 in association with the initial display state. As described above, the operation history DB 291 according to the present embodiment stores the operation history with respect to the advertisement when the advertisement of the partner site 50 has been displayed, but the operation history with respect to the entire celestial sphere image of the advertiser website 30 is not necessarily recorded (but is preferably recorded).

FIG. 40 schematically indicates the information stored in the operation history DB 291. The operation history DB 291 is roughly classified into three types of information, that is, history identification information, initial display state, and operation history.

The history identification information includes an image ID, a display device, and a cookie. These pieces of information are transmitted from the information processing apparatus 10. To give a supplementary explanation, the display device can be identified from the OS or the type of the browser, and the information processing apparatus 10 notifies the history management server 20 of the display device.

The initial display state includes the advertisement space size, the initial angle of view, the initial magnification ratio, the rotational speed, and the link position. These items have been described above. To give a supplementary explanation, the advertisement space size is the size (the number of pixels) of the advertisement space 402 on the web page of the partner site 50, and is predetermined by the partner site 50. The initial magnification ratio refers to the degree of magnification with respect to the predetermined region T as a reference.

Specifically, the initial magnification ratio is increased when the predetermined region T is enlarged, and decreased when the predetermined region T reduced. It is conceivable that the click rate, etc., may differ between the cases of enlarging and reducing the same entire celestial sphere image, and these click rates are recorded as the initial display history. The rotational speed is the rotational speed when the advertisement displaying unit 153 automatically rotates the entire celestial sphere image displayed as an advertisement. It is conceivable that the click rate, etc., may differ between the case where the rotation is fast and the case where the rotation is slow, and these click rates are recorded as the initial display history. Note that the rotational speed in the case where the viewer has rotated the entire celestial sphere image may be recorded as the operation history. The link position will be described with reference to FIG. 22.

The operation history includes the start image, the click result, the browsing angles of view 1 to 3, the angle of view at the time of clicking (hereinafter, "click time angle of view"), and the magnification ratio at the time of clicking (hereinafter, "click time magnification ratio"). The start image is the entire celestial sphere image that the viewer has first operated when a plurality of entire celestial sphere images have been distributed as advertisements. The click result indicates whether the viewer has clicked the image. The browsing angles of view 1 to 3 are the same as in the first and second embodiments. The click time angle of view is the angle of view when the viewer has clicked the entire celestial sphere image. The click time magnification ratio is the magnification ratio when the viewer has clicked the entire celestial sphere image.

The angle of view and magnification ratio are not determined independently, and the magnification ratio is determined when the angle of view is determined. This is because reducing the angle of view corresponds to enlarging, and increasing the angle of view corresponds to reducing. However, since the process or operation of magnification can be performed separately from the changing of the angle of view, the history management server 20 can record the magnification separately from the angle of view. It is also expected that whether there is a change in the magnification is related to the click rate.

Functions of History Use Phase—Third Embodiment

Figure 21:
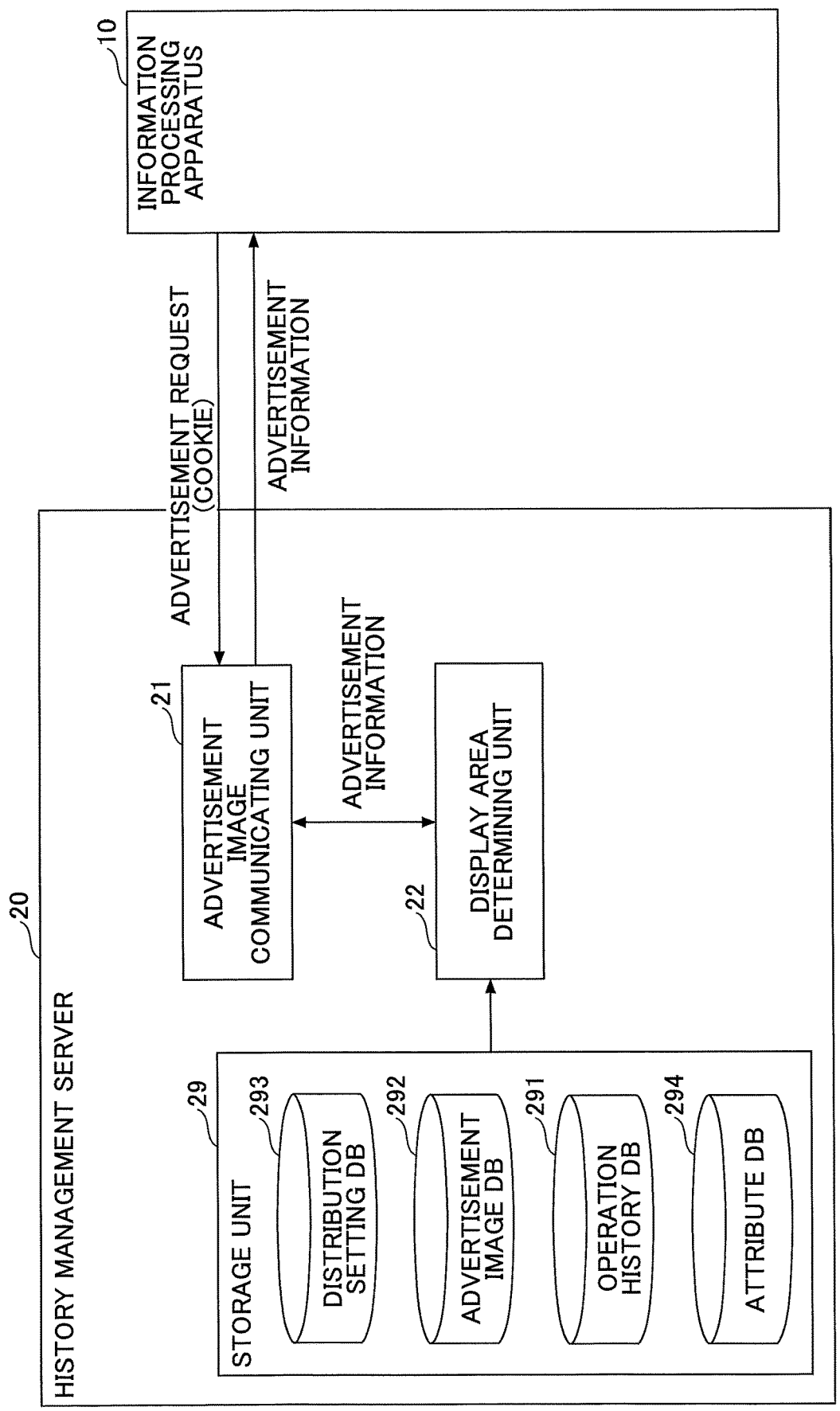
FIG. 21 is an example of a functional block diagram of the history management server according to the third embodiment of the present invention.
Figure 22A:
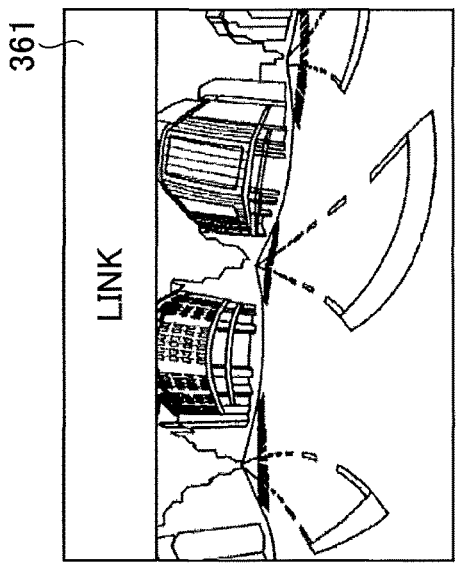
FIGS. 22A through 22D are examples of diagrams for describing a link position according to the third embodiment of the present invention.
Figure 22B:
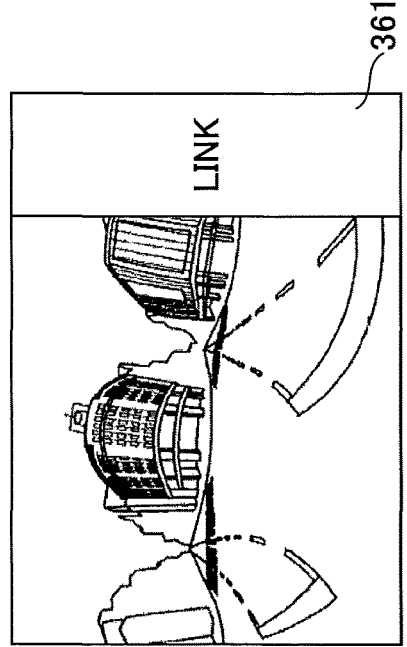
Figure 22C:
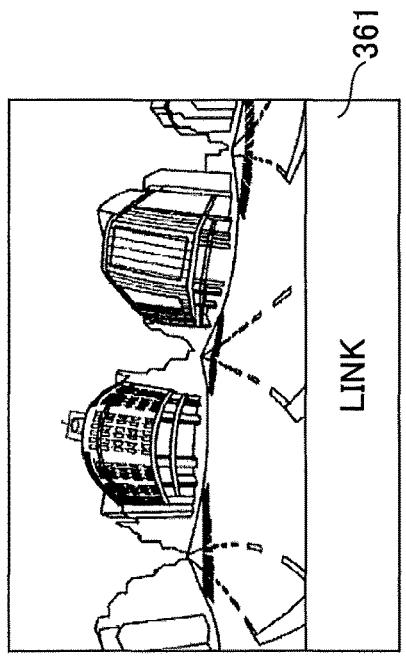
Figure 22D:
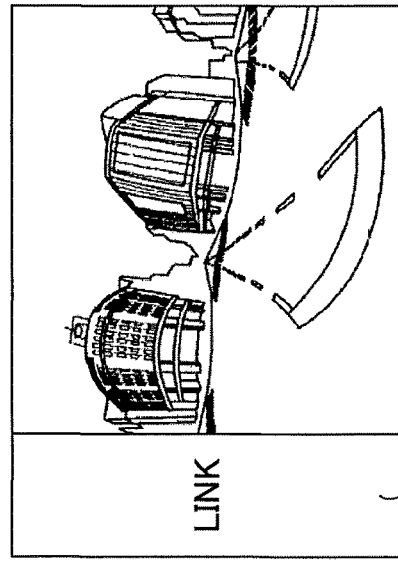

FIG. 21 is an example of a functional block diagram of the history management server 20. The functions of FIG. 21 relate to the history use phase. Similar to the accumulation phase, the information processing apparatus 10 receives the advertisement request tag from the history management server 20 and executes the advertisement request tag.

The history management server 20 includes the advertisement image communicating unit 21 and the display area determining unit 22. Although the history management server 20 does not include the operation history acquiring unit 23, the operation history can also be recorded in the history use phase. By recording the operation history in the history use phase, even more operation history can be accumulated. The recording function is merely omitted in FIG. 21 as a matter of convenience in descriptions.

Furthermore, the attribute DB 294 is newly stored in the storage unit 29. The attribute DB 294 will be described with reference to Table 7.

The display area determining unit 22 determines the entire celestial sphere image by referring to the cookie. The method of determining the entire celestial sphere image may be the same as in FIG. 20. Then, the display area determining unit 22 refers to the operation history DB 291 and the attribute DB 294, and determines the display area of the entire celestial sphere image to be used for the advertisement. First, the attribute DB 294 will be described.

TABLE 7

| COOKIE | AGE RANGE | GENDER |
|---|---|---|
| Aaa | 20~34 | FEMALE |
| Bbb | 35~49 | MALE |
| Ccc | GREATER THAN OR EQUAL TO 50 | MALE |
| Ddd | 20~34 | FEMALE |

Table 7 schematically indicates the information in the attribute DB 294. In the attribute DB 294, the cookie, the age range, and the gender are registered. That is, the attributes of the viewer are recorded. In addition to these items, information referred to as attributes such as occupation, family composition, annual income, location, and preference (favorite sports, food, news field, and entertainer) etc., may be registered. The attribute DB 294 may be provided not only in the history management server but also on a network accessible by the history management server.

The display area determining unit 22 refers to the attribute DB 294 to determine the attribute of the viewer associated with the cookie, and determines, as the display area of the entire celestial sphere image to be used for the advertisement, an initial display state having high points with respect to the operation history of other viewers having the same attributes. Details will be described later.

Link Position—Third Embodiment

FIGS. 22A through 22D are examples of diagrams for describing a link position. A link 361 is arranged at the lower part (FIG. 22A), the upper part (FIG. 22B), the left end (FIG. 22C), and the right end (FIG. 22D) of the entire celestial sphere image displayed as an advertisement. For example, the display area determining unit 22 determines the link position. The link 361 is associated with the URL of the advertiser website as the link destination. Furthermore, on the link 361, a message such as "Please click now!" etc., prompting the viewer to click on the advertisement, is displayed.

When the viewer clicks (or taps) the link 361, the information processing apparatus 10 connects to the URL of the link destination. The image portion of the entire celestial sphere image can be rotated and enlarged/reduced, etc., by an operation other than clicking (or tapping), and therefore even if the viewer mistakenly clicks (or taps) the entire celestial sphere image, the information processing apparatus 10 does not connect to the link destination.

It is known that the click rate of a viewer varies depending on the link position, and by including the link position in the initial display state, it is possible to distribute the advertisement including a link position with high points.

Note that the user can rotate the entire celestial sphere image by an operation such as mouse dragging (flicking in case of a touch panel), and the user can enlarge or reduce the entire celestial sphere image by operating an enlargement button/reduction button (pinch in/pinch out in case of a touch panel).

Operation Procedure of Accumulation Phase—Third Embodiment

FIG. 23 is an example of a sequence diagram illustrating the operation of the browsing system in the accumulation phase. FIG. 23 illustrates the processes after the information processing apparatus 10 transmits the advertisement request.

Step S1: The display state determining unit 25 of the history management server 20 determines the entire celestial sphere image and the initial display state, and transmits the advertisement information (the entire celestial sphere image and the initial display state) to the advertisement image communicating unit 21.

Step S2: The advertisement image communicating unit 21 transmits the advertisement information (the entire celestial sphere image and the initial display state) to the advertisement acquiring unit 151 of the information processing apparatus 10.

Step S3: The advertisement acquiring unit 151 of the information processing apparatus 10 receives the advertisement information (the entire celestial sphere image and the initial display state), and transmits the advertisement information to the advertisement displaying unit 153. The advertisement displaying unit 153 displays the advertisement on the LCD 206 of the information processing apparatus 10.

Step S4: When an advertisement is displayed, the viewer may operate the advertisement in some cases. The operation accepting unit 14 accepts the operation and notifies the operation history recording unit 154 of the operation content. Accordingly, the operation history recording unit 154 accumulates the operation history.

Step S5: The operation history recording unit 154 transmits the operation history to the operation history transmitting unit 155. This timing is, for example, when the viewer finishes operating the web page of the partner site 50, or when the viewer starts operating another advertisement.

Step S6: The operation history transmitting unit 155 transmits the operation history, the cookie and the image ID to the history management server 20. Step S7: The operation history acquiring unit 23 of the history management server 20 receives the operation history, the cookie, and the image ID, and registers the received information in the operation history DB 291 in association with the initial display state. Note that, in order to associate the initial display state with operation history, in step S1, the history management server 20 transmits the ID, etc., of the initial display state, and in step S6, the information processing apparatus 10 returns the ID of the initial display state. Alternatively, in step S1, the history management server 20 may transmit the initial display state or the information processing apparatus 10 may analyze the initial display state, and in step S6, the information processing apparatus 10 may return the initial display state.

Operation Procedure of History Use Phase—Third Embodiment

FIG. 24 is an example of a sequence diagram illustrating the operation of the browsing system 100 in the history use phase.

Step S11: The information processing apparatus 10 executes the advertisement request tag, and transmits the advertisement request including the advertisement space size and the cookie to the history management server 20. The reason why the advertisement space size is transmitted, is that the history management server 20 determines a display area optimal for the advertisement space size of the advertisement space to be displayed by the information processing apparatus 10.

Step S12: The advertisement image communicating unit 21 receives the advertisement request and transmits the advertisement request to the display area determining unit 22.

Step S13: The display area determining unit 22 determines the display area by referring to the advertisement image DB 292, the operation history DB 291, and the attribute DB 294. Details will be described with reference to FIG. 25.

Step S14: The display area determining unit 22 transmits the advertisement information including the entire celestial sphere image and the display area, to the advertisement image communicating unit 21.

Step S15: The advertisement image communicating unit 21 transmits the advertisement information to the information processing apparatus 10.

Step S16: The advertisement acquiring unit 151 of the information processing apparatus 10 receives the advertisement information and transmits the advertisement information to the advertisement displaying unit 153. Accordingly, the entire celestial sphere image is displayed at the display area that is highly likely to be clicked by the viewer.

Determination of Display Area—Third Embodiment

Figure 25:
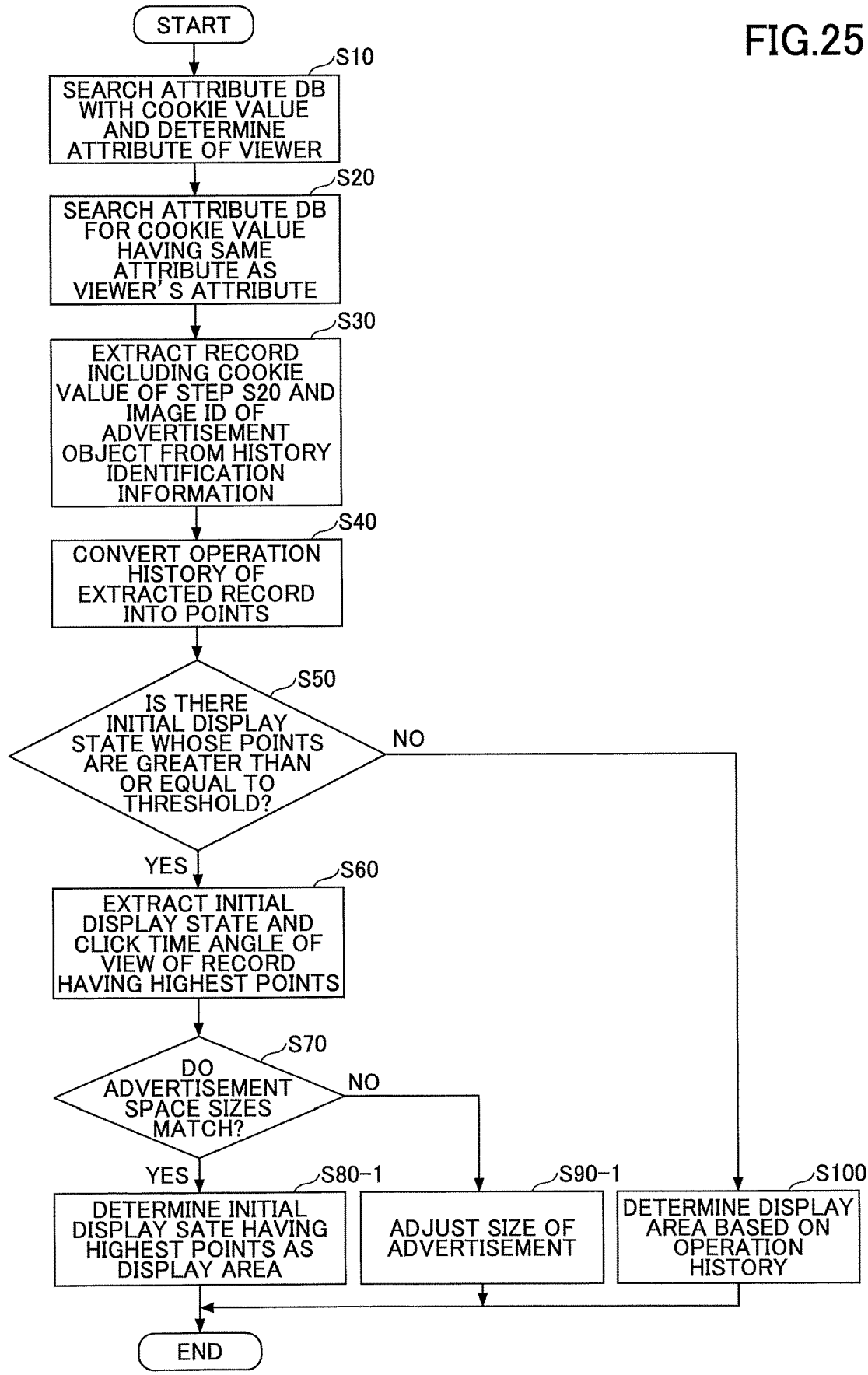
FIG. 25 is an example of a flowchart illustrating a procedure in which the display area determining unit determines the display area according to the third embodiment of the present invention.

FIG. 25 is an example of a flowchart illustrating a procedure in which the display area determining unit 22 determines the display area.

First, the display area determining unit 22 searches the attribute DB 294 based on the cookie value of the cookie transmitted from the information processing apparatus 10, to determine the attribute of the viewer (step S10).

Next, the display area determining unit 22 searches the attribute DB 294 for a cookie value having the same attribute as the attribute of the viewer (step S20). Since there are several parameters in the attribute, not all parameters may match. For this reason, it is sufficient if the attributes are highly similar, even if the attributes do not match. For example, a parameter having a strong influence is given a higher weight, and the similarity is calculated according to matching parameters. For example, a weight of 10 is given to parameters of other viewers whose age range and gender match those of the viewer, and a weight of 5 is given to other parameters even if the other parameters match those of the viewer. The sum of weights corresponds to the similarity of the attribute of other viewers. The display area determining unit 22 extracts a cookie value whose similarity is greater than or equal to a threshold.

Next, the display area determining unit 22 refers to the operation history DB 291, and extracts an operation history (record) that is associated with the cookie value extracted in step S20 and that has the image ID of the entire celestial sphere image to be used for the advertisement (step S30). That is, among the operation histories of other viewers having the same attribute as the viewer, the operation history of the entire celestial sphere image to be used for the advertisement is extracted. This is because the relationships between the angle of view and the object appearing in the image would vary, unless the image is the same.

Next, the display area determining unit 22 calculates the points of the extracted operation history (step S40). The operation history is, for example, the browsing angles of view 1 to 3, the start image, the click result, the click time angle of view, and the click time magnification ratio. The display area is determined to increase the click rate of the viewer, in other words, to display a display area of that would attract interest among the display areas in the entire celestial sphere image.

Accordingly, the operation history, which indicates a True click result has the highest points; the operation history, which indicates that the link has not been clicked but the entire celestial sphere image has been operated, has the next highest points; and the operation history, which indicates that the link has not been clicked and the entire celestial sphere image has not been operated, has the lowest points. For example, the points are given to the operation history as follows.

(i) Click result is True . . . 10 points
(ii) The click result is False and there is a record in the browsing angles of view 1 to 3 or the click time magnification ratio is different from the initial magnification ratio . . . 3 points
(iii) The click result is False and there is no record in the browsing angles of view 1 to 3 or the click time magnification ratio is the same as the initial magnification ratio . . . 0 point (or minus 3 points)

Accordingly, higher points are given to the initial display state that is considered to attract interest, in the operation history DB 291.

Incidentally, the points of (i) and (ii) above may be increased according to the still time of the browsing angles of view 1 to 3.

Next, the display area determining unit 22 determines whether there is an initial display state having points that are greater than or equal to a threshold (step S50).

When the determination in step S50 is YES, since at least one initial display state, which is considered to attract the interest of the viewer, is identified, the display area determining unit 22 extracts the initial display state with the highest points from the operation history DB 291 (step S60). However, as described below, the initial display state, which has the highest points, is not necessarily determined to be the display area.

Next, the display area determining unit 22 determines whether the advertisement space size of the web page of the partner site 50 browsed by the viewer, matches the advertisement space size of the initial display state having the highest points (step S70). When there are a plurality of initial display states to which the highest points are given, it would suffice if at least one of these initial display states has a matching advertisement space size.

When the determination in step S70 is YES, the initial display state with the highest points can be directly applied, and therefore the display area determining unit 22 determines the initial display state having the highest points as the display area, etc. (step S80-1).

When the determination in step S70 is NO, since the advertisement space sizes are different, the initial display state with the highest points cannot be directly applied to the advertisement space of the partner site 50, and therefore the display area determining unit 22 appropriately adjusts the entire celestial sphere image to be used for the advertisement (step S90-1). In this case, several methods are conceivable.
(i) When there are initial display states that have points greater than or equal to a threshold and that have the same advertisement space, the initial display state the highest points among these initial display states, is adopted. Although the points are not the highest, it is possible to display the entire celestial sphere image in an initial display state considered to attract the interest of the viewer.
(ii) Enlarge or reduce the entire celestial sphere image so as to match the advertisement space size of the initial display state with the highest points. By doing so, even if the advertisement space size for displaying the entire celestial sphere image to be used for the advertisement, is different from the advertisement space size of the initial display state, the information processing apparatus 10 can make adjustments to the display area considered to attract the interest of the viewer.

Also, when the determination is NO in step S50, the initial display state considered to attract the interest of the viewer cannot be found, and therefore the display area determining unit 22 determines the display area based on the operation history (step S100). As in the first and second embodiments, when there is a past operation history of the viewer, the browsing angle of view displayed in the past is determined to be the display area. When there is no past operation history of the viewer, various display areas may be determined as in the accumulation phase.

As described above, the browsing system 100 according to the present embodiment can distribute the entire celestial sphere image in an initial display state for which the click rate is high, by using the operation history of other viewers having similar attributes as those of the viewer.

Figure 26:
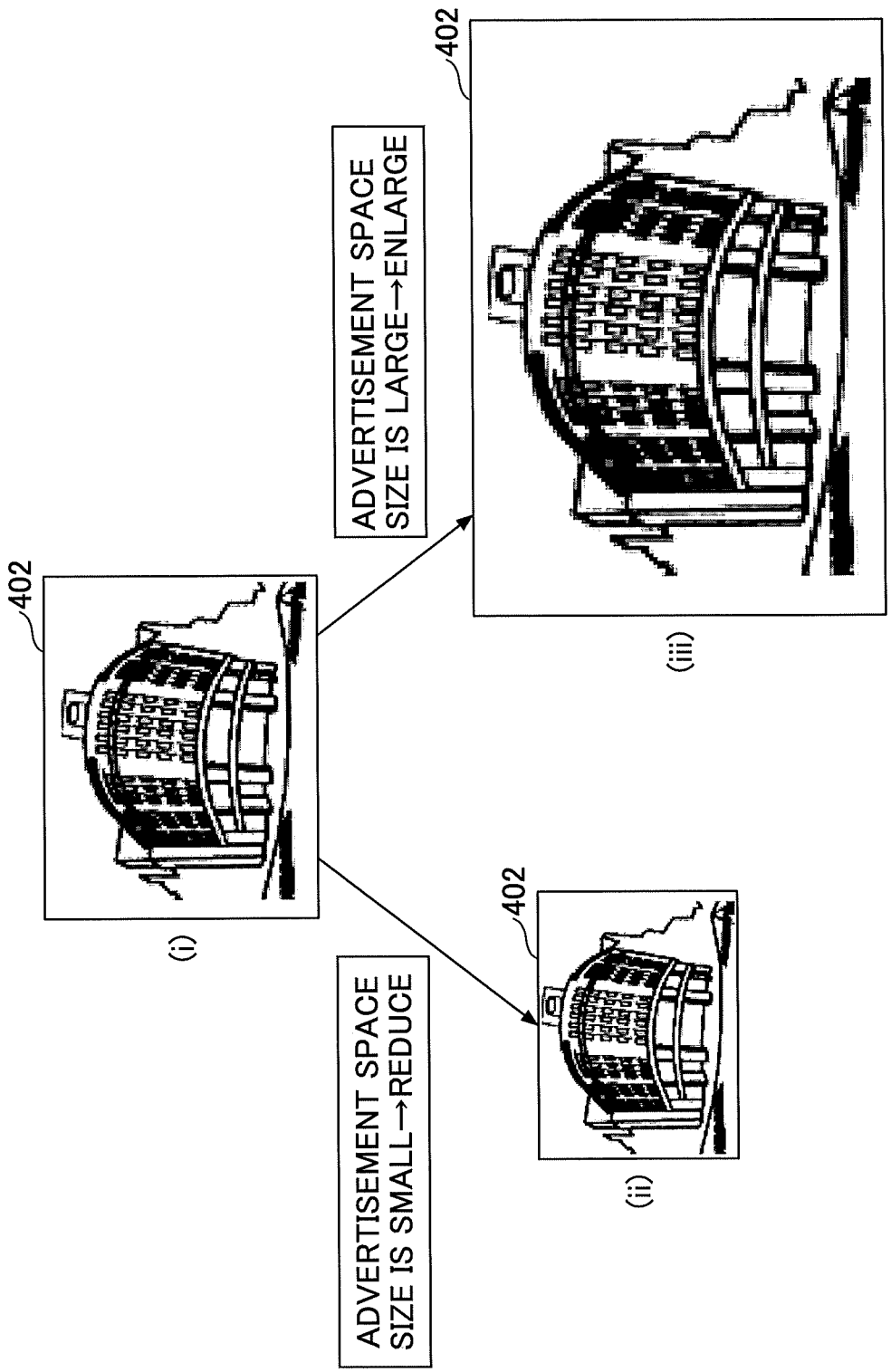
FIG. 26 is an example of a diagram for describing a method for adjusting the entire celestial sphere image to be used for the advertisement according to the third embodiment of the present invention.

Adjustment of Entire Celestial Sphere Image to be Used for the Advertisement—Third Embodiment FIG. 26 is an example of a diagram for describing a method for adjusting the entire celestial sphere image to be used for the advertisement. FIG. 26 (*i*) illustrates the advertisement space size of the initial display state with the highest points. As illustrated in FIG. 26 (*ii*), when the advertisement space size of the web page of the partner site 50 is smaller, the display area determining unit 22 reduces the entire celestial sphere image to be used for the advertisement according to the ratio of the advertisement space size. This makes it possible to display the entire celestial sphere image in the same display area as the initial display state with the highest points, in the advertisement space.

As illustrated in FIG. 26 (*iii*), when the advertisement space size of the web page of the partner site 50 is larger, the display area determining unit 22 enlarges the entire celestial sphere image to be used for the advertisement according to the ratio of the advertisement space size. This makes it possible to display the entire celestial sphere image in the same display area as the initial display state with the highest points, in the advertisement space.

When the aspect ratio of the advertisement space 402 of the web page of the partner site is different from the advertisement space of the initial display state with the highest points, the display area determining unit 22 reduces or enlarges the entire advertisement space in the initial display state so as to fit in the advertisement space of the partner site 50.

Figure 27:
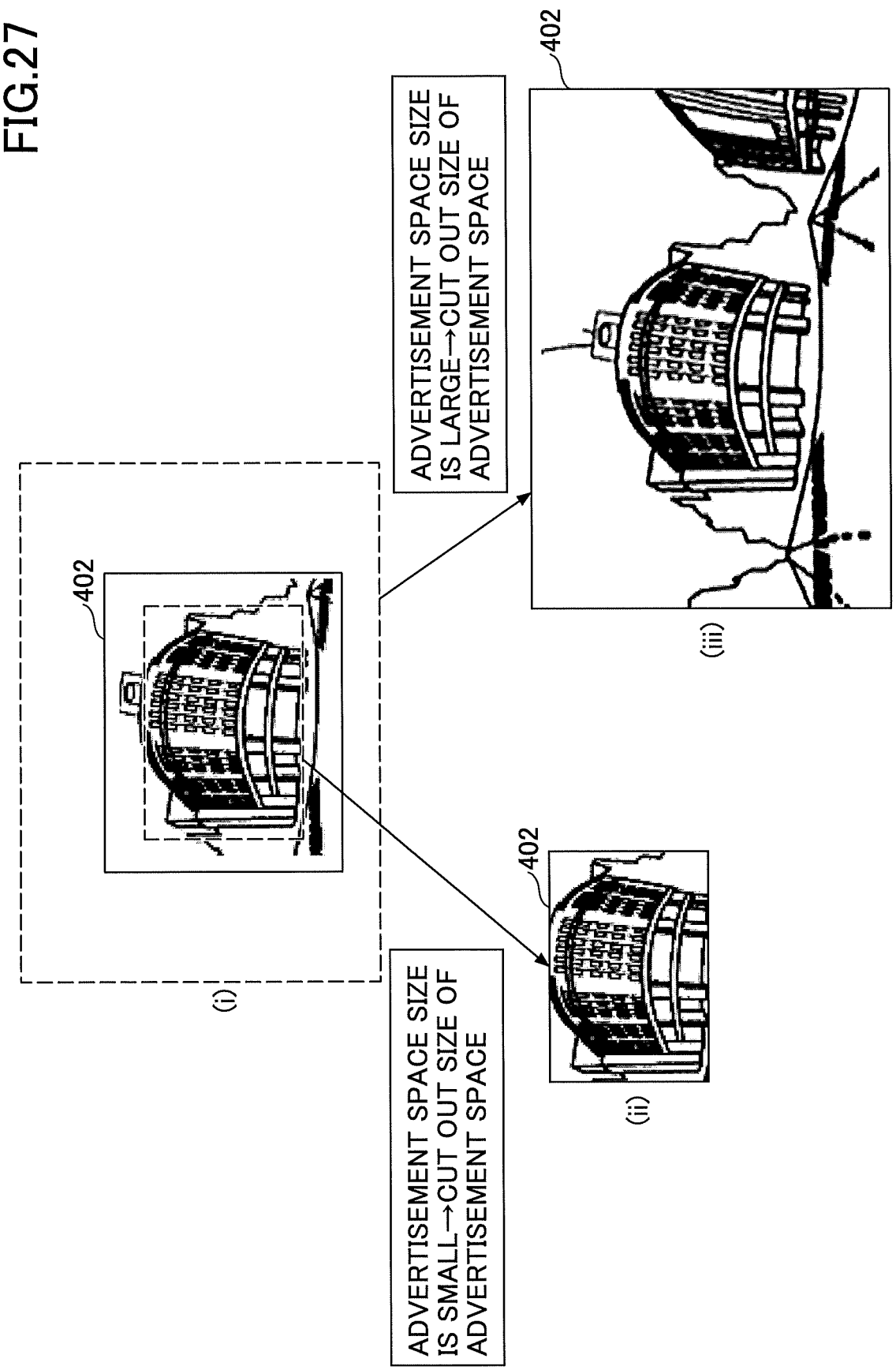
FIG. 27 is an example of a diagram for describing a method for adjusting the entire celestial sphere image to be used for the advertisement according to the third embodiment of the present invention.

Furthermore, when adjusting the entire celestial sphere image to be used for the advertisement, the display area determining unit 22 may change the angle of view as illustrated in FIG. 27. The advertisement space sizes in FIGS. 27 and 26 are the same. FIG. 27 (*i*) illustrates the advertisement space size in the initial display state with the highest points. As illustrated in FIG. 27 (*ii*), when the advertisement space size of the web page of the partner site 50 is smaller, the advertisement space size of the advertisement space 402 of the web page of the partner site 50 is directly used as the display area. For example, the display area determining unit 22 identifies the center of the initial angle of view of the initial display state with the highest points, in the entire celestial sphere image to be used for the advertisement, and cuts out the same size as the advertisement space 402 of the web page of the partner site 50. Accordingly, an angle of view close to the center can be displayed in the advertisement space 402 with the same magnification ratio as the entire celestial sphere image in the initial display state with the highest points.

As illustrated in FIG. 27 (*iii*), when the advertisement space size of the web page of the partner site 50 is larger, the advertisement space size of the advertisement space 402 of the web page of the partner site 50 is directly used as the display area. For example, the display area determining unit 22 identifies the center of the initial angle of view of the initial display state with the highest points, in the entire celestial sphere image to be used for the advertisement, and cuts out the same size as the advertisement space 402 of the web page of the partner site 50 from the center. Accordingly, it is possible to display a wider angle of view with the same magnification ratio as that of the entire celestial sphere image in the initial display state with the highest points.

Accumulation of Operation History in History Use Phase—Third Embodiment

As described above, the advertisement is distributed in the history use phase; and the information processing apparatus 10 can store, in the history management server 20, the operation history with respect to the advertisement distributed in the history use phase. In this case, the display area of the advertisement delivered in the history use phase is in the initial display state. Therefore, the operation history can also be accumulated in the history use phase, and the display area determining unit 22 can determine the display area such that the click rate becomes even higher.

Case of Determining Click Time Angle of View as Browsing Area—Third Embodiment

It cannot be completely determined as to whether the viewer has been interested in the initial angle of view of the entire celestial sphere image, or viewer has been interested in the display area of the entire celestial sphere image at the time of clicking; since this depends on the impression of the viewer. However, in many cases, the viewer becomes interested in a browsing angle of view displayed by rotating the entire celestial sphere image, and clicks the displayed browsing angle of view. Therefore, in the process of FIG. 25, the display area determining unit 22 may determine the click time angle of view, as the display area.

Figure 28:
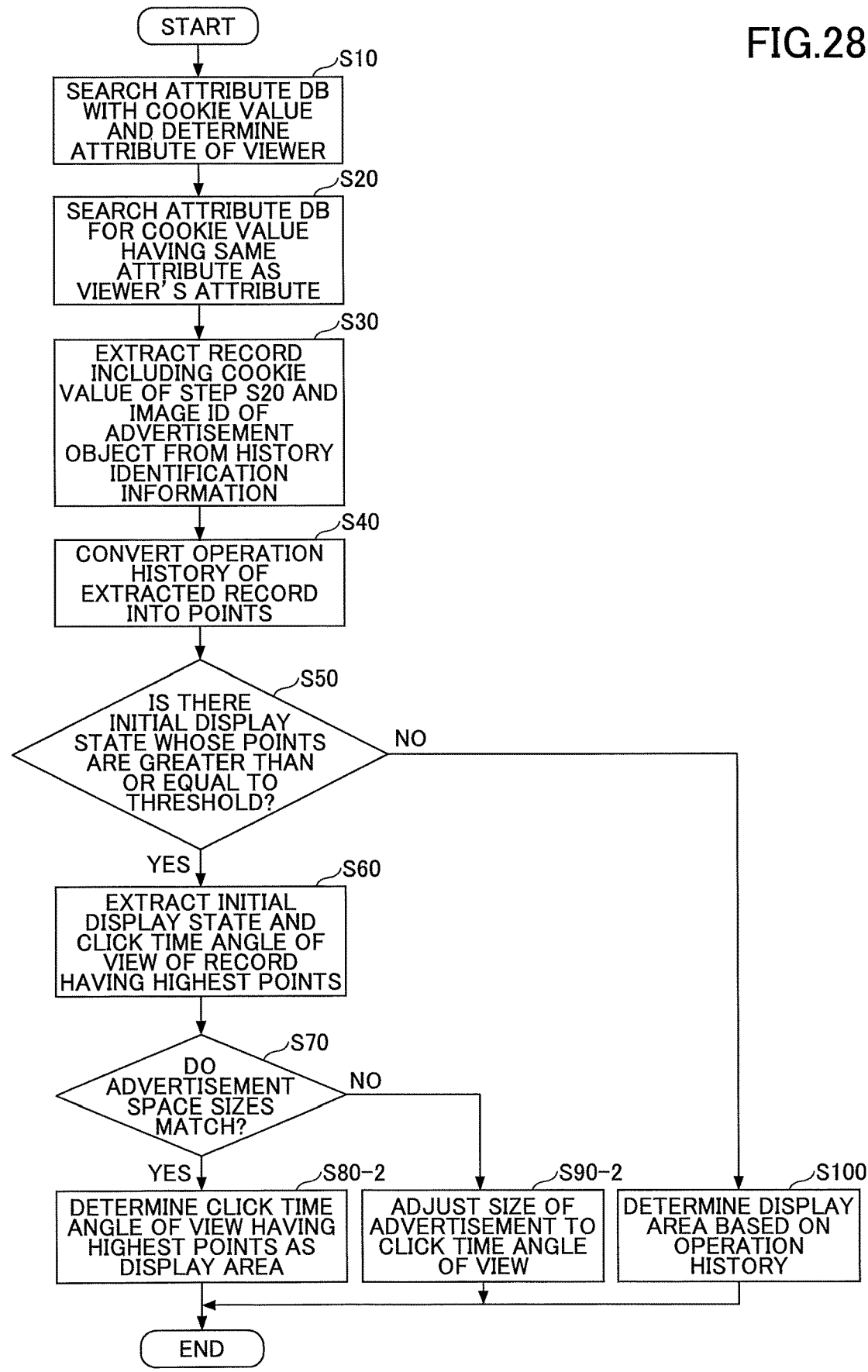
FIG. 28 is an example of a flowchart illustrating a procedure in which the display area determining unit determines the display area according to the third embodiment of the present invention.

FIG. 28 is an example of a flowchart illustrating a procedure in which the display area determining unit 22 determines the display area. In the description of FIG. 28, differences from FIG. 25 will mainly be described. The processes of steps S10 to S70 and S100 may be the same as in FIG. 25.

In step S80-2, the display area determining unit 22 determines the click time angle of view having the highest points, as the display area (step S80-2).

In step S90-2, the display area determining unit 22 appropriately adjusts the entire celestial sphere image to be used for the advertisement, according to the click time angle of view (step S90-2). The adjustment method in this case may be the same as (i) and (ii) of step S90-1.

Note that the administrator of the browsing system 100 may set, in the history management server 20, either one of the initial angle of view or the click time angle of view, as the angle of view to be to be selected.

Furthermore, when the operation history is recorded in the history use phase, it is possible to record which one of the initial angle of view or the click time angle of view has been selected by the display area determining unit 22 when distributing the image in the history use phase, the operation history can be accumulated, and the angle of view having the higher points between the initial angle of view and the click time angle of view, may be selected.

When Initial Angle of View or Click Time Angle of View is Selected—Third Embodiment Furthermore, the display area determining unit 22 may select either one of the initial angle of view or the click time angle of view, based on the content of the entire celestial sphere image.

Figure 29:
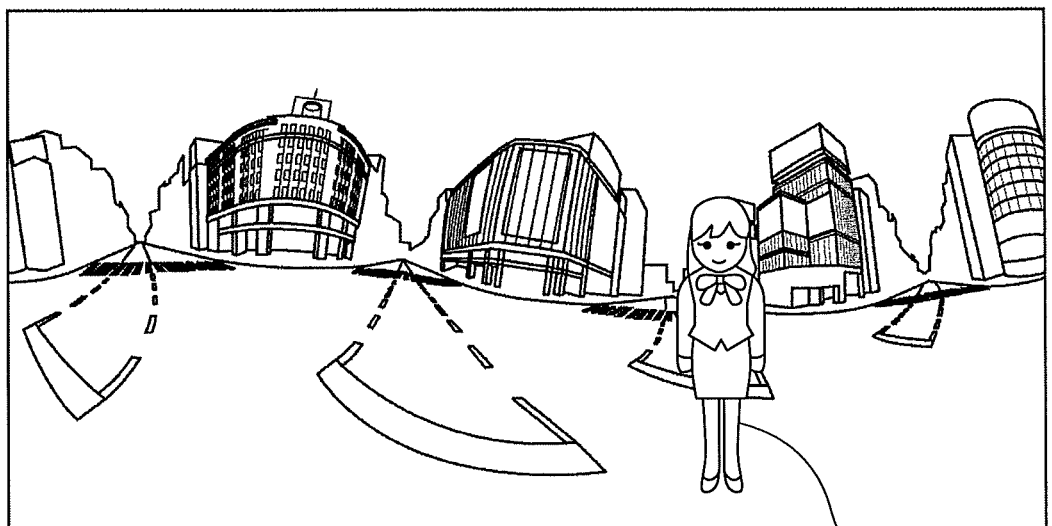
FIG. 29 illustrates an example of an entire celestial sphere image in which a particular object is appearing according to the third embodiment of the present invention.

FIG. 29 illustrates an example of an entire celestial sphere image in which a particular object is appearing. A woman 371 appears in the entire celestial sphere image of FIG. 29. In the advertising industry, it is known that when the attribute of the viewer is male, the click rate increases for an image in which the woman 371 appears. Therefore, it is considered effective to include women in the display area to make viewers become interested in advertisements. For example, when a woman appears in either the initial angle of view or the click time angle of view, the display area determining unit 22 determines the angle of view in which the woman appears, as the display area. In determining whether the woman 371 appears, the advertisement image DB 292 according to the second embodiment may be used.

Figure 30:
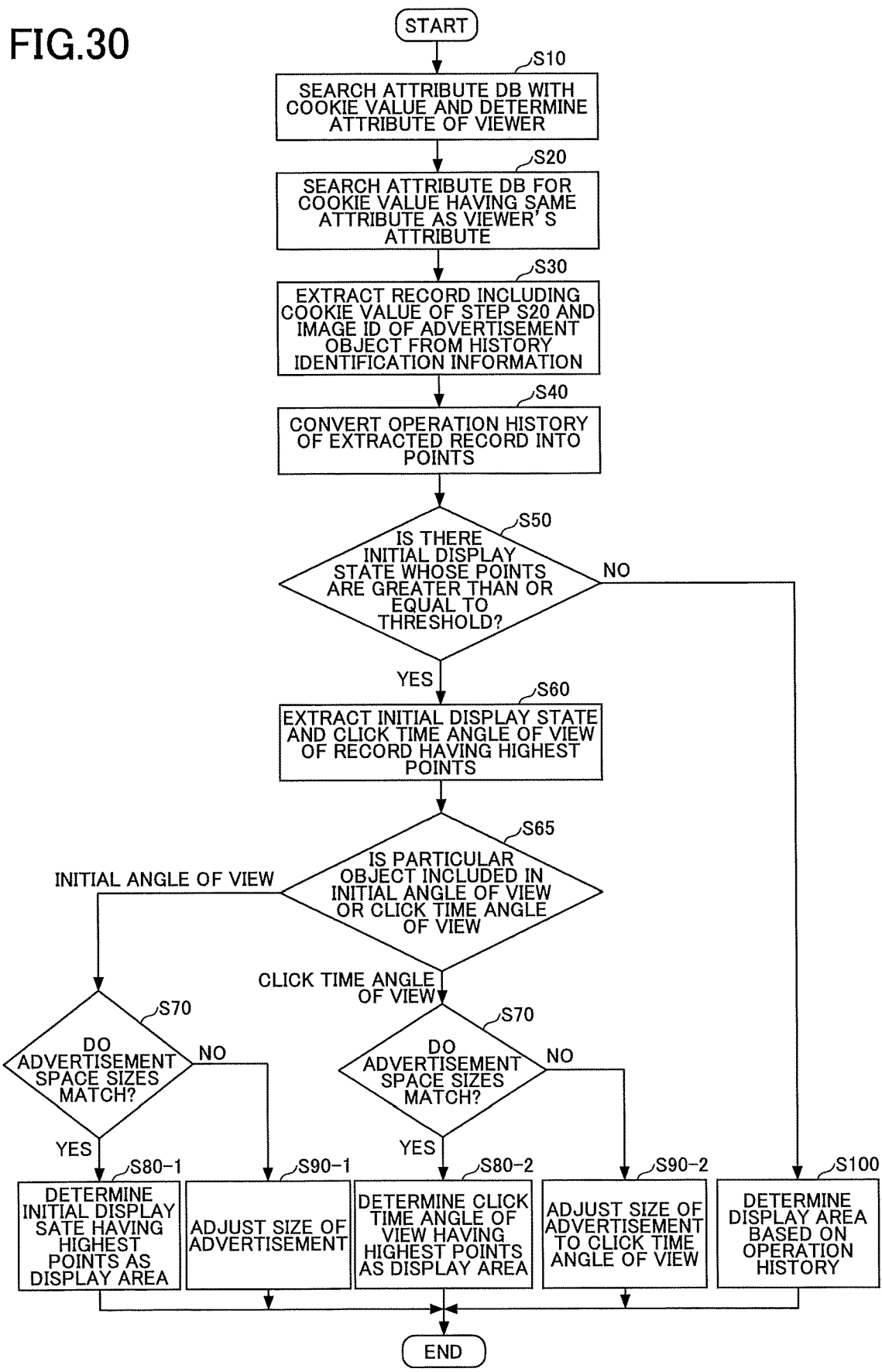
FIG. 30 is an example of a flowchart illustrating a procedure in which the display area determining unit determines the display area according to the third embodiment of the present invention.

FIG. 30 is an example of a flowchart illustrating a procedure in which the display area determining unit 22 determines the display area. In the description of FIG. 30, differences from FIG. 25 and FIG. 28 will mainly be described. The processes in steps S10 to S60 and S100 may be the same as in FIGS. 25 and 28.

In step S65, the display area determining unit 22 determines whether a particular object is included in the initial angle of view or the click time angle of view (step S65).

When the particular object is included in the initial angle of view, steps S80-1 and 90-1 are executed, and when the particular object is included in the click time angle of view, steps S80-2 and 90-2 are executed.

Accordingly, the browsing system 100 can determine the initial angle of view or the click time angle of view including an object in which the viewer is interested, as the display area immediately after the web page of the partner site 50 is displayed.

When the particular object does not appear in either the initial angle of view or the click time angle of view, an angle of view is selected according to a setting made by the administrator of the browsing system 100.

Incidentally, the woman is merely an example of an object, and various bodies and landscapes may be the object. For example, the initial angle of view or the click time angle of view may be selected according to objects such as a location in a building, a sightseeing spot, a scenery, a man, a child, and an animal, etc., which may be sales points for real estate properties.

Case in which the Angle of View, in which a Particular Object Appears, is Determined as the Display Area—Third Embodiment The display area determining unit 22 may determine the angle of view in which the particular object appears, as the display area, instead of limiting to either the initial angle of view or the click time angle of view.

First, it is assumed that the cookie of the viewer and the particular object preferred by the viewer, are registered as information relating to preference, in the attribute DB 294. The display area determining unit 22 selects a particular object associated with the viewer, from the attribute DB 294. Since the relationship between the particular object and the angle of view is preliminarily registered as in the advertisement history DB of the second embodiment, the display area determining unit 22 can determine the object angle of view in which the object that is interesting to the viewer appears, as the display area.

Figure 31:
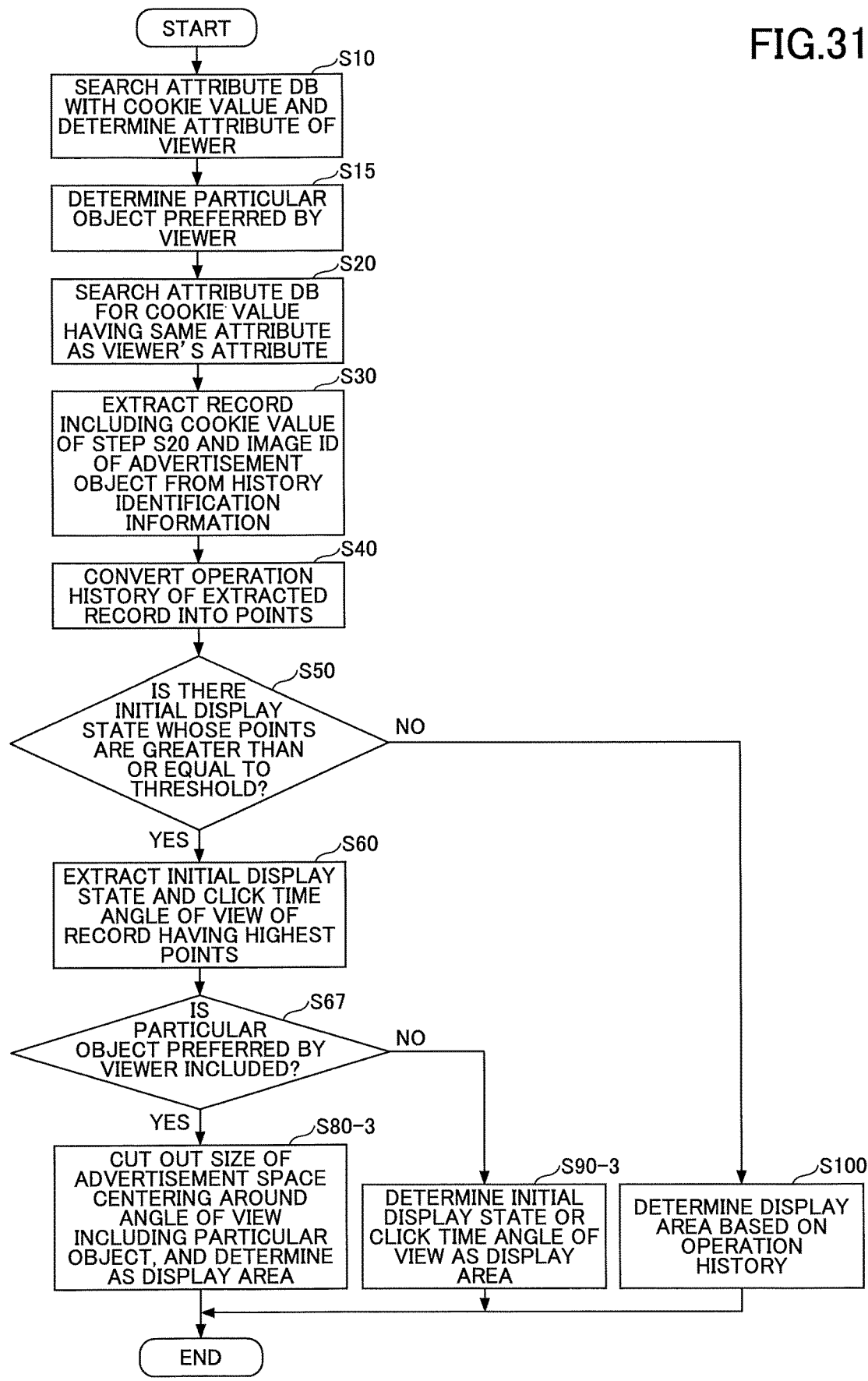
FIG. 31 is an example of a flowchart illustrating a procedure in which the display area determining unit determines the display area according to the third embodiment of the present invention.

FIG. 31 is an example of a flowchart illustrating a procedure in which the display area determining unit 22 determines the display area. In the description of FIG. 31, differences from FIG. 25 and FIG. 28 will mainly be described. The processes of steps S10 and S100 may be the same as in FIGS. 25 and 28.

In step S15, the display area determining unit 22 reads out the particular object preferred by the viewer, associated with the viewer, from the attribute DB 194 (step S15). The processes in steps S20 to S60 may be the same as in FIG. 25 and FIG. 28.

In step S67, the display area determining unit 22 determines whether the particular object preferred by the viewer is included in the entire celestial sphere image to be used for the advertisement (step S67). The particular object preferred by the viewer is a particular object associated with the viewer in the attribute DB 294.

When the determination in step S67 is YES, the display area determining unit 22 cuts out the size of the advertisement space, centering around the angle of view including the particular object, from the entire celestial sphere image, and determines the cut out image as the display area (step S80-3). Regardless of the size of the advertisement space in the initial display state, the particular object is optimally cut out according to the advertisement space size of the partner site 50. Note that the image may be appropriately enlarged or reduced so as to fit in the advertisement space.

When the determination in step S67 is NO, the display area determining unit 22 determines the initial display state or the click time angle of view as the display area (step S90-3). It is assumed that the administrator, etc., has set which one of the initial display state or the click time angle of view is to be selected.

According to the process of FIG. 31, it is possible to determine, as the display area, the angle of view in which the object having a high possibility of being preferred by the viewer, without limiting the display area to either the initial angle of view or the click time angle of view.

Note that in FIG. 31, it is determined whether the particular object preferred by the viewer is included in the entire celestial sphere image to be used for the advertisement. However, the determination may be made based on a particular object preferred by another viewer having attributes similar to those of the viewer. For example, when the particular object preferred by the viewer is not included in the entire celestial sphere image to be used for the advertisement, the next best display area may be determined by determining whether there is a particular object preferred by another viewer having attributes similar to those of the viewer.

Exclusion of Entire Celestial Sphere Image—Third Embodiment

In the present embodiment, since the click result is included in the operation history, the display area determining unit 22 can calculate the click rate for each image.

FIG. 32 illustrates an example of an operation history including a click rate. In FIG. 32, the items of a display frequency, a click rate, and distribution are registered in association with the image ID. The display frequency is the number of times the entire celestial sphere image has been displayed at various initial angles of view, etc., at the partner site 50. The click rate is the ratio of the number of clicks with respect to the number of times the entire celestial sphere image has been distributed as an advertisement. Distribution indicates whether to distribute the entire celestial sphere image. The display area determining unit 22 calculates the click rate, and excludes the entire celestial sphere image whose click rate is less than a threshold value, from images to be used for advertisements, even if the display frequency of the entire celestial sphere image exceeds a certain value.

When an entire celestial sphere image, in which a display area of has been determined such that the click rate increases, has been displayed for more than a sufficient number of times, but the click rate is less than a threshold, it is highly likely that the product in this entire celestial sphere image does not attract attention. By excluding such an entire celestial sphere image from images to be used for advertisements, it is possible to eliminate wasteful distribution of an entire celestial sphere image having a low click rate, and to increase opportunities of distributing entire celestial sphere images that are expected to be clicked.

Overview—Third Embodiment

As described above, since the browsing system 100 according to the present embodiment accumulates the initial display states and operation histories, and distributes the advertisement that is an entire celestial sphere image at the angle of view with a high click rate, the viewer will likely be interested in the advertisement and the click rate can be increased.

Fourth Embodiment

In the present embodiment, a description will be given of an entire celestial sphere image displayed by the advertiser website 30 when the advertisement is clicked (or tapped) at the information processing apparatus 10.

The background of the present embodiment will be described. For example, it is assumed that the advertiser website 30 provides a web page introducing real estate, and the partner site 50 provides a web page enabling browsing of entire celestial sphere images of real estate properties. However, as the object appearing in the entire celestial sphere image changes when the display area changes, and therefore it will be difficult to determine whether the entire celestial sphere image of the partner site 50 and the entire celestial sphere image of the advertiser website 30 are the same. Furthermore, in order for the viewer to display the entire celestial sphere image at the same display area as the browsing angle of view of the partner site 50, the viewer needs to rotate or enlarge/reduce the entire celestial sphere image of the advertiser website 30.

Therefore, the browsing system 100 of the present embodiment operates as follows.

Schematic Operation—Fourth Embodiment

Figure 33:
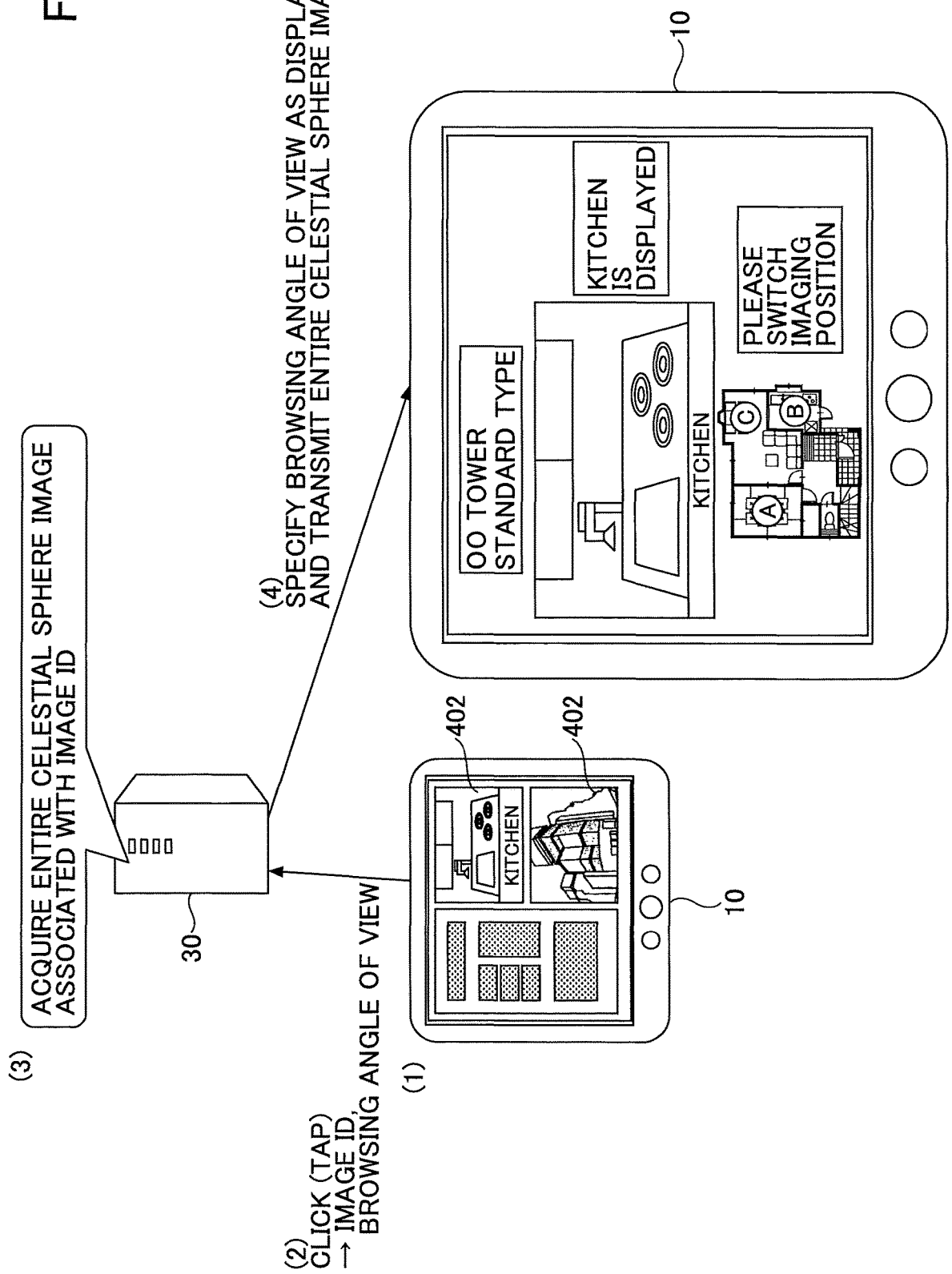
FIG. 33 is an example of a diagram for describing a schematic operation of the browsing system according to a fourth embodiment of the present invention.

FIG. 33 is an example of a diagram for describing a schematic operation of the browsing system 100 according to the present embodiment.

(1) The information processing apparatus 10 operated by the viewer displays a web page by accessing the web page provided by the partner site 50. As described in the first to third embodiments, in the advertisement space 402 of the web page, the advertisement that is an entire celestial sphere image is displayed at the display area determined by the history management server 20. The viewer can freely change the browsing angle of view by rotating or enlarging/reducing the entire celestial sphere image of the advertisement space.

(2) When the viewer clicks (or taps) the advertisement space 402, the information processing apparatus 10 transmits the image ID of the entire celestial sphere image and the browsing angle of view at the time of the clicking (click time angle of view), to the advertiser website 30. The URL of the advertiser website 30 is associated with the advertisement space 402.

(3) The advertiser website 30 acquires the entire celestial sphere image associated with the image ID.

(4) The advertiser website 30 transmits, to the information processing apparatus 10, a web page including the entire celestial sphere image, in which the browsing angle of view received from the information processing apparatus 10 is specified as a display area. The information processing apparatus 10 displays this web page.

Accordingly, immediately after the information processing apparatus 10 receives the web page of the advertiser website 30, the same entire celestial sphere image can be displayed at the browsing angle of view, in the advertisement space 402 where the viewer has been browsing the web page of the partner site 50. For example, when the information processing apparatus 10 accesses a web page with the URL associated with the advertisement space 402, in a state where the kitchen of a certain property is displayed, the advertiser website 30 provides a web page of an entire celestial sphere image in which the display area includes the same kitchen of the same property.

Furthermore, the web page may include other entire celestial sphere images related to the property that the viewer has been browsing. In FIG. 33, the imaging positions of A to C are indicated in the sketch of the property browsed by the viewer, and when the viewer selects an imaging position, it is possible to switch the display area in the entire celestial sphere image.

As described above, in the browsing system 100 according to the present embodiment, the viewer can immediately recognize that the entire celestial sphere image, which is the same as the entire celestial sphere image of the partner site 50, is displayed on the advertiser website 30. Furthermore, it is possible to make it unnecessary for the viewer to perform an operation to display the entire celestial sphere image at the browsing angle of view of the partner site 50.

Functions—Fourth Embodiment

Figure 34:
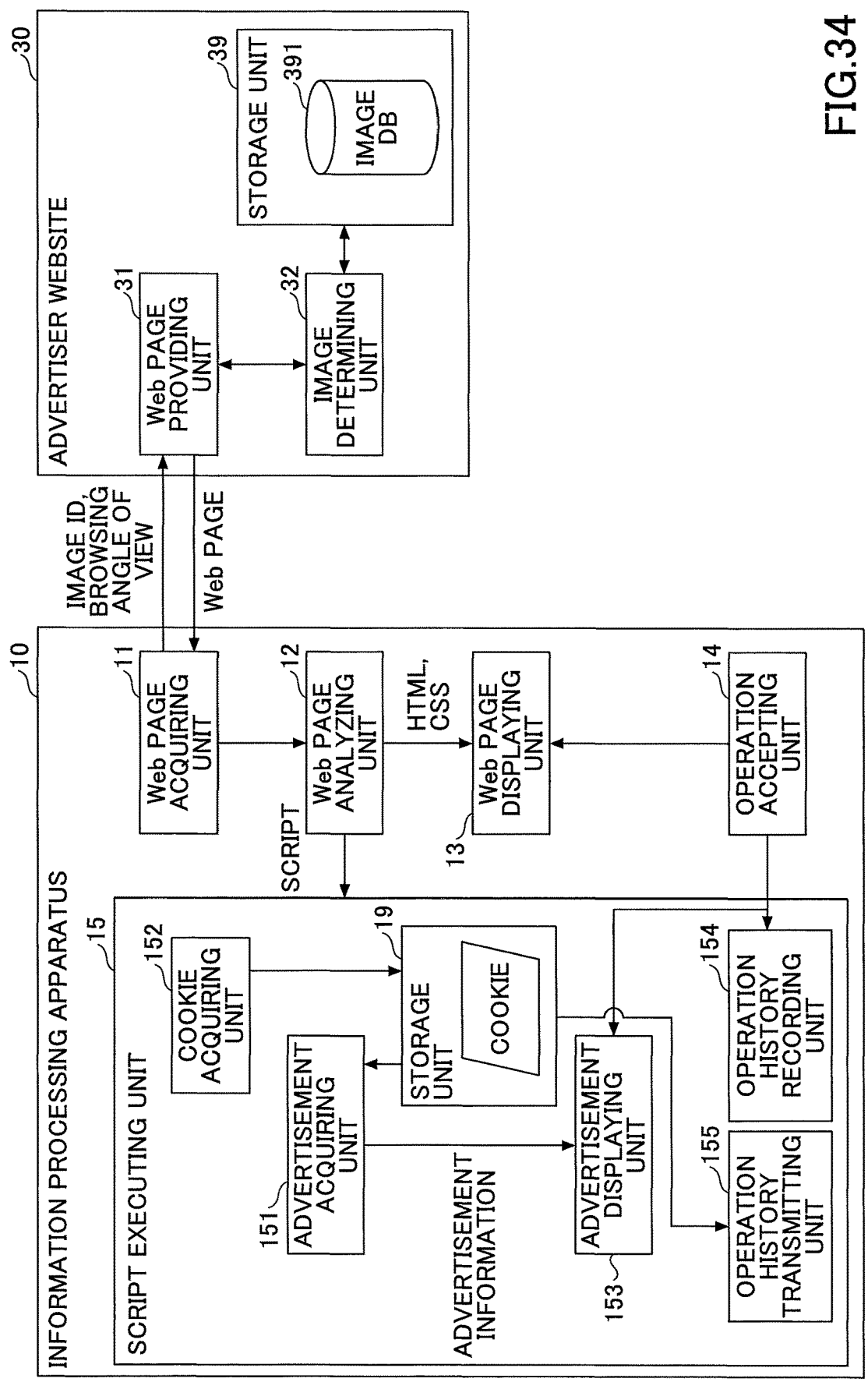
FIG. 34 is an example of a functional block diagram of the information processing apparatus and the advertiser website according to the fourth embodiment of the present invention.

FIG. 34 is an example of a functional block diagram of the information processing apparatus 10 and the advertiser website 30. The functions of the information processing apparatus 10 may be the same as those in FIG. 10. On the other hand, the advertiser website 30 includes an image determining unit 32 in addition to the web page providing unit 31.

The image determining unit 32 searches the image DB 391 according to the image ID transmitted from the information processing apparatus 10 and reads out the entire celestial sphere image associated with the image ID. Furthermore, the image determining unit 32 determines the browsing angle of view transmitted from the information processing apparatus 10 directly as the display area. The image determining unit 32 is implemented by the CPU 201 illustrated in FIG. 5 executing the program 209p, etc.

Furthermore, the advertiser website 30 includes a storage unit 39. The storage unit 39 is implemented by the HDD 209 or the memory 202 illustrated in FIG. 5. The image DB 391 is constructed in the storage unit 39.

TABLE 8

| IMAGE ID | IMAGE | IMAGE CONTENT | RELATED IMAGE |
|---|---|---|---|
| 0001-1 | 0001-1.jpg | INDOORS | 0001-2, 0001-3 |
| 0001-2 | 0001-2.jpg | OUTDOORS | 0001-1, 0001-3 |
| . . . | . . . | . . . | . . . |

Table 8 schematically indicates the information stored in the image DB 391. The image DB 391 includes the items of an image ID, an image, an image content, and a related image. The image ID, the image, and the image content are the same as those in Table 3. The related image is an image ID of another image (entire celestial sphere image) related to the image (entire celestial sphere image) associated with the image ID. For example, when the advertiser website 30 provides a web page introducing real estate, another related image is an entire celestial sphere image, etc., of another room of the same property.

Operation Procedure—Fourth Embodiment

Figure 35:
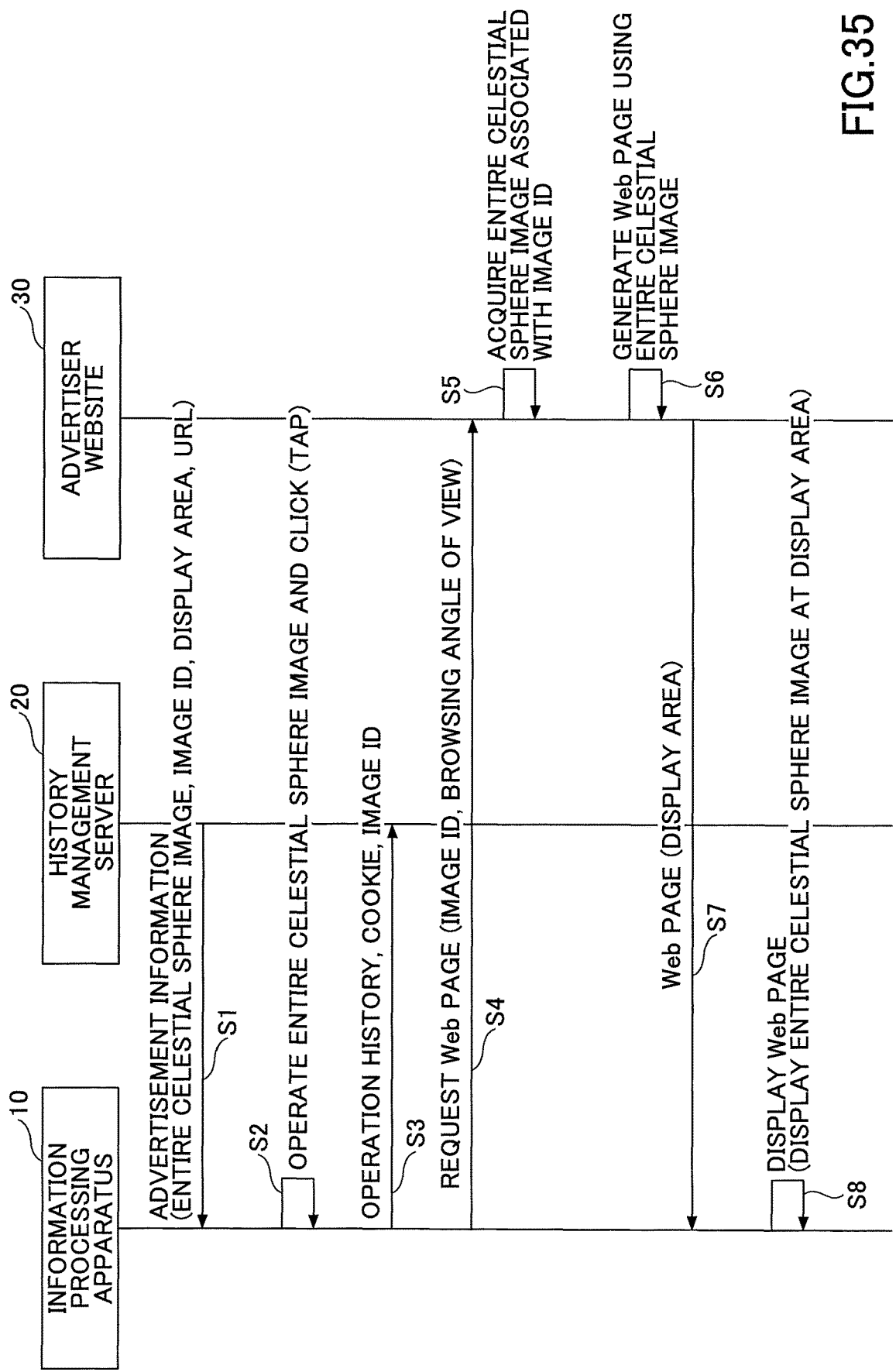
FIG. 35 is an example of a sequence diagram illustrating a procedure in which the information processing apparatus displays the web page of the advertiser website according to the fourth embodiment of the present invention.

FIG. 35 is an example of a sequence diagram illustrating a procedure in which the information processing apparatus 10 displays the web page of the advertiser website 30.

Step S1: As described in the first to third embodiments, the advertisement acquiring unit 151 of the information processing apparatus 10 acquires advertisement information from the history management server 20. The advertisement information includes an entire celestial sphere image, an image ID of the entire celestial sphere image, a display area, and a URL. The information processing apparatus 10 can display an entire celestial sphere image at a display area having a high click rate, in the advertisement space 402.

Step S2: The viewer clicks (or taps) the entire celestial sphere image in the advertisement space 402 after rotating, enlarging or reducing, etc., the entire celestial sphere image. Note that the viewer may click the entire celestial sphere image without rotating the entire celestial sphere image at all. The operation accepting unit 14 accepts an operation of the viewer.

Step S3: The operation history transmitting unit 155 transmits the operation history, the cookie, and the image ID to the history management server 20. Accordingly, the history management server 20 can accumulate the operation history even while the entire celestial sphere image is being browsed as an advertisement.

Step S4: When the operation accepting unit 14 accepts a click (or tap), the web page acquiring unit 11 makes a request for a web page to the URL included in the advertisement information. The request for the web page includes the image ID and the browsing angle of view at the time of the clicking.

Step S5: The web page providing unit 31 of the advertiser website 30 receives the request for the web page, and the image determining unit 32 acquires the entire celestial sphere image associated with the image ID, from the image DB 391. The image determining unit 32 also acquires a related image related with the image ID, according to need. Furthermore, the image determining unit 32 specifies the browsing angle of view received from the information processing apparatus 10 as an initial display area.

Step S6: The web page providing unit 31 of the advertiser website 30 generates a web page using one or more entire celestial sphere images.

Step S7: The web page providing unit 31 of the advertiser website 30 transmits, to the information processing apparatus 10, the web page in which the display area of the entire celestial sphere image is specified.

Step S8: The web page acquiring unit 11 of the information processing apparatus 10 receives the web page. The web page analyzing unit 12 extracts the script, and the advertisement displaying unit 153, which is implemented by executing the script, performs perspective projection transformation on the entire celestial sphere image in the display area, and displays the entire celestial sphere image in the advertisement space 402.

When Image ID is not Used—Fourth Embodiment

In FIG. 35, as a matter of convenience of description, the information processing apparatus 10 transmits the image ID to the advertiser website 30. However, when the advertiser website 30 causes the information processing apparatus 10 to provide a particular entire celestial sphere image, the image ID is not required. The particular entire celestial sphere image is, for example, an entire celestial sphere image included in a web page provided by the advertiser website 30 as a portal site. In this case, the same entire celestial sphere image is displayed at the plurality of information processing apparatuses 10. It is assumed that the entire celestial sphere image displayed in the advertisement space 402 of the partner site 50 and the entire celestial sphere image of the web page of the advertiser website 30 are the same.

Furthermore, since the web page of the advertiser website 30 is identified by the URL included in the advertisement information, even if the image ID is not transmitted from the information processing apparatus 10, the advertiser website 30 can determine the entire celestial sphere image of the web page to be provided by the URL.

Figure 36:
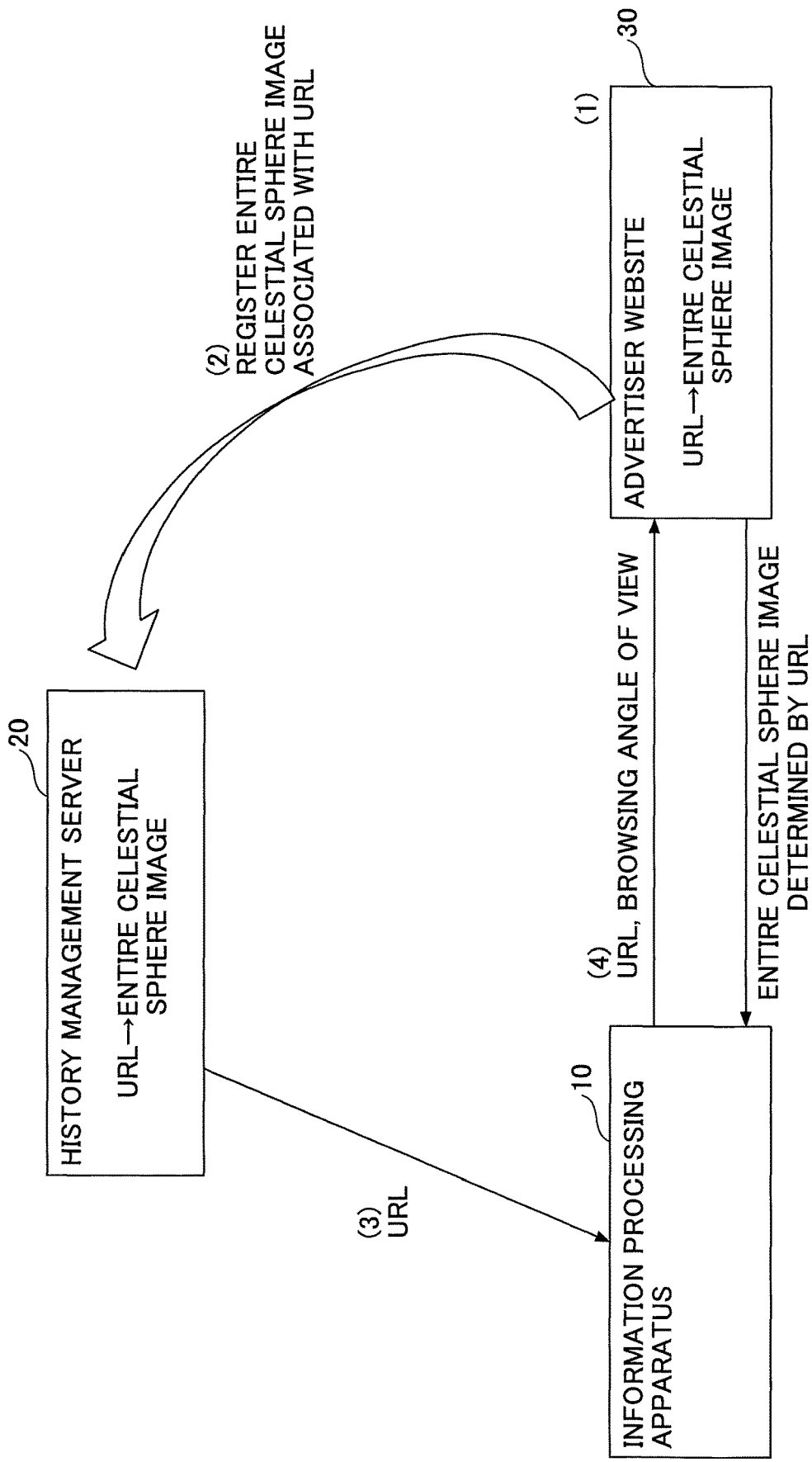
FIG. 36 is an example of a diagram for schematically describing the entire celestial sphere image of the advertiser website determined by the URL according to the fourth embodiment of the present invention.

FIG. 36 is an example of a diagram for schematically describing the entire celestial sphere image of the advertiser website 30 determined by the URL.

(1) First, on the advertiser website 30, the entire celestial sphere image is previously associated with the URL of the advertiser website 30 or a URL managed by the advertiser website 30.

(2) The advertiser registers the URL and the entire celestial sphere image associated with each other at the advertiser website 30, also in the history management server 20 in association with each other.

(3) The information processing apparatus 10 acquires the URL of the advertiser website 30 together with the advertisement information, from the history management server 20.

(4) When the entire celestial sphere image is clicked (or tapped), the information processing apparatus 10 transmits the browsing angle of view to the advertiser website 30 based on the URL. The advertiser website 30 transmits the entire celestial sphere image associated with the URL to the information processing apparatus 10, with the browsing angle of view set as the display area.

AS described above, the entire celestial sphere image is identified by the URL, and the same entire celestial sphere image as the entire celestial sphere image displayed in the advertisement space 402 of the partner site 50, can be displayed on the web page of the advertiser website 30. If the advertiser sets the association between the URL and the entire celestial sphere image on the advertiser website 30 to be different from the association between the URL and the entire celestial sphere image in the history management server 20, the advertiser website 30 can cause the information processing apparatus 10 to display an entire celestial sphere image that is different from the entire celestial sphere image on the partner site 50.

Provide Different Entire Celestial Sphere Images Between Partner Site and Advertiser Website—Fourth Embodiment In the above description, the entire celestial sphere images of the partner site 50 and the advertiser website 30 are the same. However, as described in FIG. 18 and Table 5B, when the angle of view of the object appearing in the entire celestial sphere image is held for every entire celestial sphere image, the partner site 50 and the advertiser website 30 can provide different entire celestial sphere images.

When the information processing apparatus 10 transmits the image ID and the browsing angle of view to the advertiser website 30, the advertiser website 30 determines the object associated with the browsing angle of view (the object appearing at the browsing angle of view) of the entire celestial sphere image identified by the image ID, by referring to the image DB 391. That is, the advertiser website 30 identifies the entire celestial sphere image displayed on the web page of the partner site 50 by the image ID, and identifies the object appearing at the browsing angle of view. The advertiser website 30 provides the information processing apparatus 10 with another entire celestial sphere image in which the object appears, at the display area including the object.

Therefore, the browsing system 100 according to the present embodiment can provide different entire celestial sphere images between the partner site and the advertiser website.

The functional block diagram may be the same as in FIG. 34, and the "object and object angle of view" is associated with the image ID in the image DB 391, similarly to Table 5B. Furthermore, as the related images in the image DB 391, for example, in the case of real estate, an entire celestial sphere image of a similar property is registered. That is, other entire celestial sphere images that are intended to be browsed by a viewer who has clicked the entire celestial sphere image at the partner site 50, are registered as related images. In the case of products that are not real estate, similar products are in the related images. Alternatively, a product, which is required to form a pair with the product displayed in the entire celestial sphere image of the partner site 50, is in a related image.

Alternatively, in the entire celestial sphere image of a tourist spot, the related images include similar tourist spots, etc.

Figure 37:
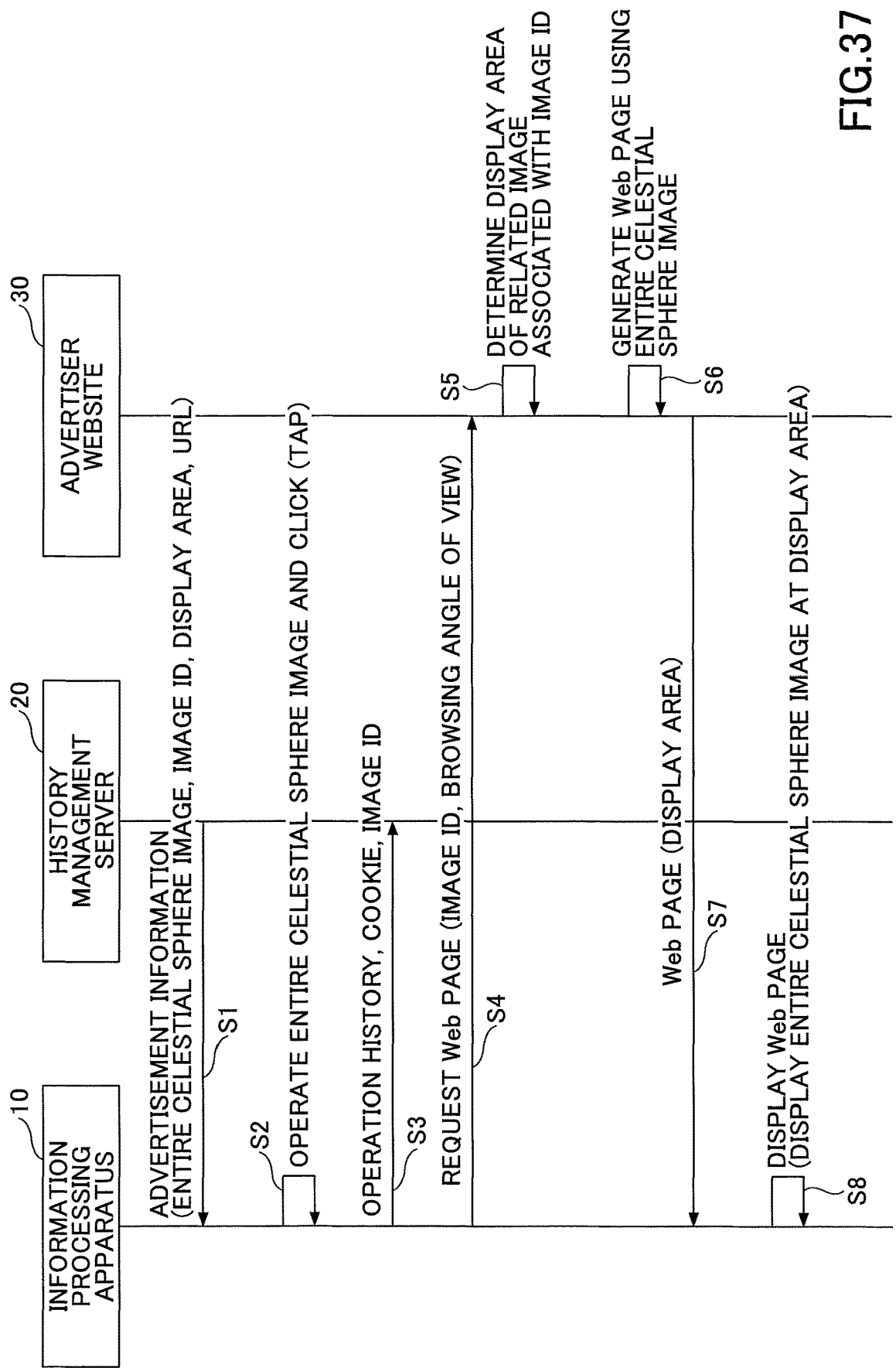
FIG. 37 is an example of a sequence diagram illustrating a procedure in which the information processing apparatus displays the web page of the advertiser website according to the fourth embodiment of the present invention.

FIG. 37 is an example of a sequence diagram illustrating a procedure in which the information processing apparatus 10 displays the web page of the advertiser website 30. With reference to FIG. 37, the differences from FIG. 35 are mainly described. The processes of steps S1 to S4 may be the same as in FIG. 35.

Step S5: The web page providing unit 31 of the advertiser website 30 receives the request for the web page. The image determining unit 32 identifies the entire celestial sphere image associated with the image ID, from the image DB 391. Next, the object appearing in the browsing angle of view of this entire celestial sphere image is identified by the object and the object angle of view in the image DB 391. Next, the related image associated with the image ID is identified from the image DB 391. For the related image, the object angle of view at which the object, which is the same as the object in the entire celestial sphere image associated with the image ID, is appearing, is identified from the object and the object angle of view in the image DB 391. Therefore, it is possible to determine the display area of the entire celestial sphere image different from the entire celestial sphere image of the web page of the partner site 50. The same entire celestial sphere image as the entire celestial sphere image of the web page of the partner site 50, may be provided together with the related image.

Note that instead of acquiring the related image from the image DB 391, the image determining unit 32 may determine the attribute of the viewer with a cookie, and may select an entire celestial sphere image browsed by viewers having the same attribute. In this case, the entire celestial sphere image having a high tendency of being browsed for each attribute is held in the storage unit 39. The method of determining the display area in this case may be the same. As described above, when "object and object angle of view" is registered in the image DB 391, there is a high degree of freedom in the method for determining the entire celestial sphere image provided by the advertiser website 30.

Step S6: The web page providing unit 31 of the advertiser website 30 generates a web page by using one or more entire celestial sphere images. The subsequent processes may be the same as in FIG. 35.

Figure 38:
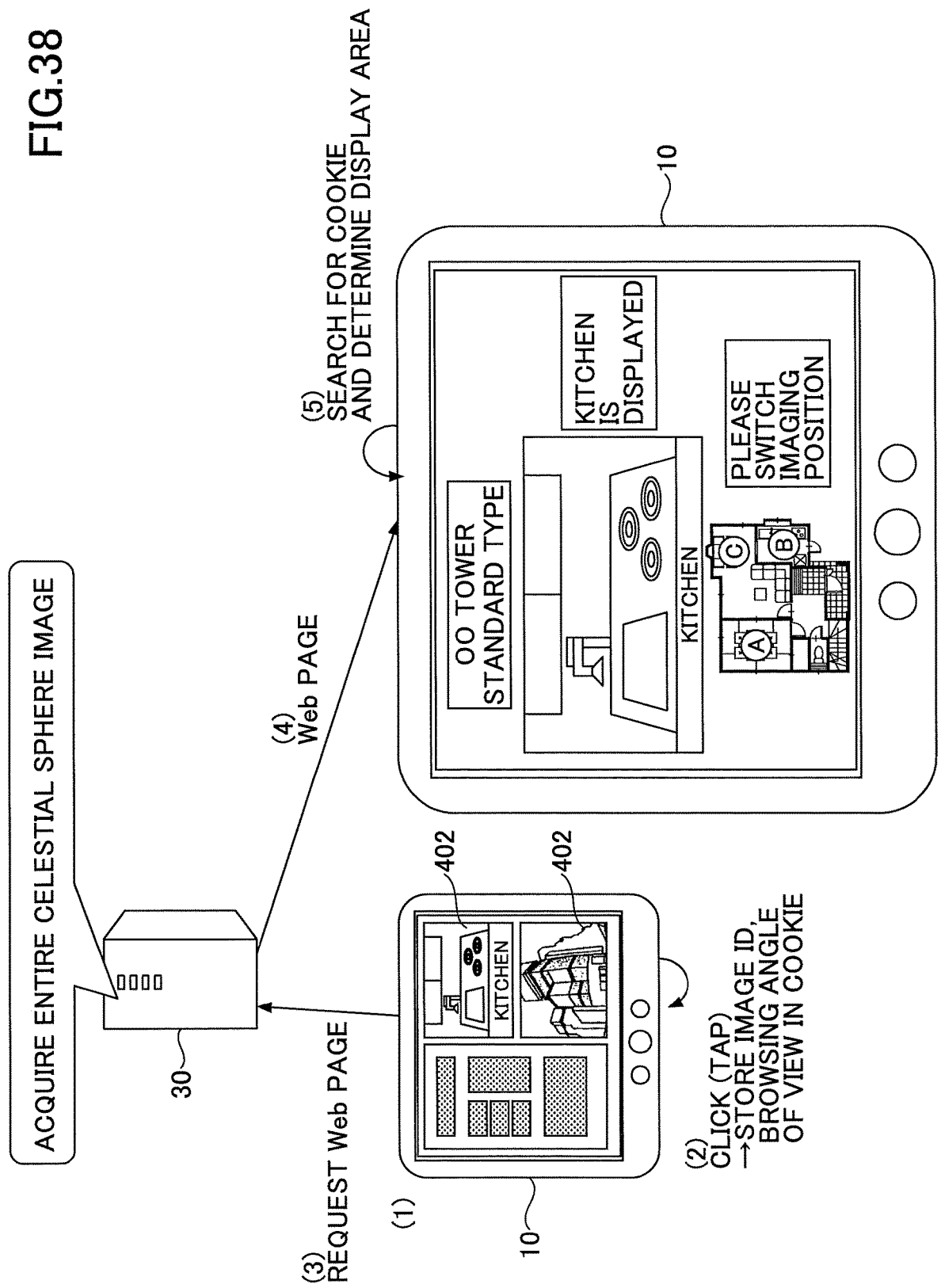
FIG. 38 is an example of a diagram for describing a schematic operation of the browsing system according to the fourth embodiment of the present invention.

Case where Information Processing Apparatus Records Image ID and Click Time Angle of View—Fourth Embodiment FIG. 38 is an example of a diagram for describing a schematic operation of the browsing system 100 according to the present embodiment.

(1) The information processing apparatus 10 operated by the viewer displays the web page provided by the partner site 50. As described in the first to third embodiments, in the advertisement space 402 of the web page, an advertisement that is an entire celestial sphere image is displayed at the display area determined by the history management server 20. The viewer can freely change the browsing angle of view by rotating or enlarging/reducing the entire celestial sphere image in the advertisement space 402.

(2) When the viewer clicks the advertisement space 402, the information processing apparatus 10 stores, in the cookie, the image ID of the entire celestial sphere image and the click time angle of view.

(3) On the other hand, the information processing apparatus 10 makes a request for a web page to the advertiser website 30, in response to the clicking. The URL of the advertiser website 30 is associated with the advertisement space 402. The request for the web page may not include the image ID.

(4) The advertiser website 30 transmits the web page to the information processing apparatus 10. In this web page, an entire celestial sphere image determined by the image ID is included when the information processing apparatus 10 has transmitted the image ID, and when the image ID has not been transmitted by the information processing apparatus 10, the entire celestial image determined by another method is included.

(5) Upon receiving the web page from the advertiser website 30, the information processing apparatus 10 searches the cookie for the image ID of the entire celestial sphere image included in the web page, and displays the web page including the entire celestial sphere image by setting, as the display area, the browsing angle of view associated with the image ID.

As described above, by storing the image ID and the browsing angle of view in the information processing apparatus 10, it is possible for the information processing apparatus 10 to display the entire celestial sphere image on the web page of the advertiser website 30, at the browsing angle of view in the advertisement space 402 browsed on the web page at the partner site 50 by the viewer.

Note that when the information processing apparatus 10 displays a web page with a browser, depending on the specifications of the cookie, the script of the advertiser website 30 may not be able to refer to the cookie of the partner site 50 in some cases. However, since both the script of the advertisement space 402 of the partner site 50 and the script of the web page provided from the advertiser website 30, are actually created by the history management server 20, the script included in the web page of the advertiser website 30 can read the cookie recorded by the script in the advertisement space 402 at the partner site 50. Alternatively, instead of a browser, the information processing apparatus 10 may execute a predetermined application.

Functions—Fourth Embodiment

With respect to the functional block diagram, the functional block diagram of FIG. 34 is applied, and the differences will be described as necessary. For example, in the present embodiment, the image ID and the click time angle of view are stored in the cookie in the storage unit 19.

TABLE 9

| COOKIE NAME | COOKIE VALUE | BROWSING TIME | EXPIRATION DATE | DOMAIN NAME | IMAGE ID | CLICK TIME ANGLE OF VIEW |
|---|---|---|---|---|---|---|
| COOCLE-001 | 1234 | 2017/01/10 12:20 | 2017/01/23 15:15 | www.fudousan.com | 0001-1 | (X41, Y41) (X42, Y42) |
| COOCLE-001 | 9876 | 2017/01/15 10:45 | 2017/01/23 19:28 | www.fudousan.com | 0003-1 | (X51, Y51) (X52, Y52) |
| ... | ... | ... | ... | ... | ... | ... |

Table 9 schematically indicates the cookie stored in the storage unit 19. Compared to the cookie in Table 1, the image ID and the click time angle of view are recorded. The click time angle of view is the browsing angle of view when the advertisement space 402 on the web page of the partner site 50 is clicked.

Operation Procedure—Fourth Embodiment

Figure 39:
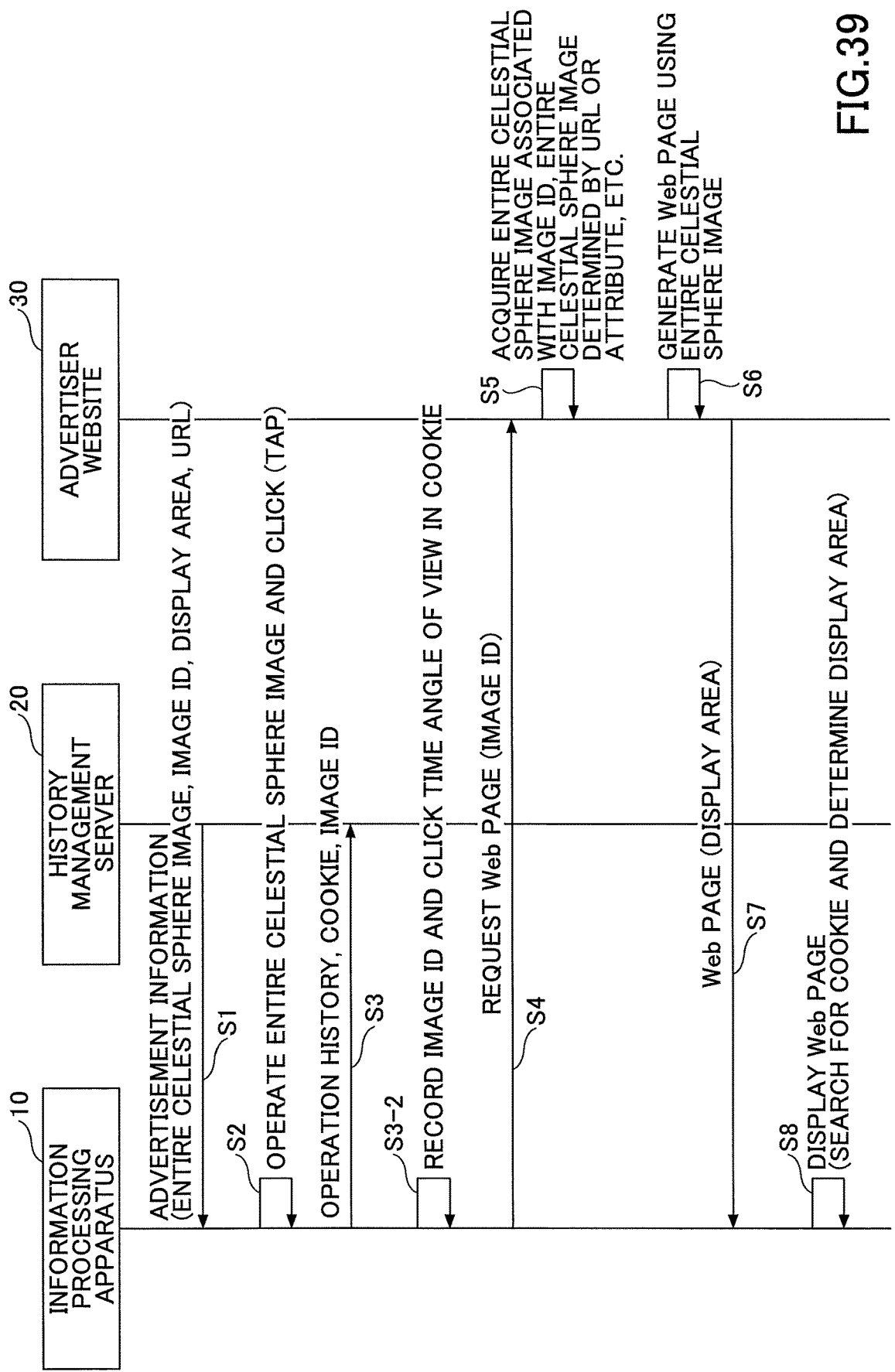
FIG. 39 is an example of a sequence diagram illustrating a procedure in which the information processing apparatus records the click time angle of view and displays the web page of the advertiser website according to the fourth embodiment of the present invention.

FIG. 39 is an example of a sequence diagram illustrating a procedure in which the information processing apparatus 10 records the click time angle of view and displays the web page of the advertiser website 30. With reference to FIG. 39, the differences from FIG. 35 are mainly described. The processes of steps S1 to S3 may be the same as in FIG. 35.

Step S3-2: The operation history recording unit 154 of the information processing apparatus 10 records the image ID and the click time angle of view in the cookie.

Step S4: When the operation accepting unit 14 accepts a click (or tap), the web page acquiring unit 11 requests for a web page to the URL included in the advertisement information. The request for the web page includes the image ID. However, since the information processing apparatus 10 records the image ID, the image ID may not be transmitted. If the image ID is necessary for the advertiser website 30 to determine the entire celestial sphere image to be displayed on the web page, the image ID is transmitted.

Step S5: The web page providing unit 31 of the advertiser website 30 receives the request for the web page. The image determining unit 32 identifies the entire celestial sphere image associated with the image ID, the entire celestial sphere image determined by the URL when the image ID is not transmitted, or the entire celestial sphere image determined by the attribute of the viewer determined by a cookie, etc.

Steps S6 and S7: The web page providing unit 31 of the advertiser website 30 generates a web page by using the entire celestial sphere image, but since the display area is not determined, the display area determined as the initial value is indicated. A web page (or at least a script of a web page) of the advertiser website 30 is created by the history management server 20 (or at least a server of a supplier affiliated with the history management server 20).

Step S8: The web page acquiring unit 11 of the information processing apparatus 10 receives the web page. The web page analyzing unit 12 extracts a script, and the advertisement displaying unit 153, which is implemented by executing the script, searches the cookie for the image ID of the entire celestial sphere image included in the web page. Since the cookie including the script recording the image ID of the entire celestial sphere image and the click time angle of view is recorded by, for example, the history management server 20 that has created the script of this web page, the script of the web page can read the image ID and the click time angle of view.

When the same image ID is recorded in the cookie, the entire celestial sphere image is perspective-projection-transformed, and displayed in the advertisement space 402, with the click time angle of view associated with the image ID of the cookie, as the display area. When the same image ID is not recorded in the cookie, the entire celestial sphere image may be displayed with the display area instructed by the advertiser website 30.

Therefore, by having the information processing apparatus 10 record the image ID and click time angle of view, when displaying an entire celestial sphere image that has been browsed and clicked in the past, it is possible to display the entire celestial sphere image at the display area at the time of clicking, without requiring an operation by the viewer.

Overview—Fourth Embodiment

As described above, in the browsing system 100 according to the present embodiment, the viewer can immediately recognize that the same entire celestial sphere image as the entire celestial sphere image of the partner site 50, is displayed on the advertiser website 30. Furthermore, it is possible to eliminate the need for an operation by the viewer to display the entire celestial sphere image at the browsing angle of view of the of the partner site 50.

OTHER APPLICATION EXAMPLES

Although the best modes for carrying out the present invention have been described above by way of examples, the present invention is not limited to these examples, and various modifications and substitution may be made without departing from the spirit of the present invention.

For example, in the present embodiment, the information processing apparatus 10 acquires the web page from the advertiser website 30 and the partner site 50, and displays the advertisement; however, the present embodiment is applicable to a case of displaying the entire celestial sphere image in general application software instead of the web page.

Furthermore, in the present embodiment, an example in which the entire celestial sphere image is used for an advertisement has been described; however, the entire celestial sphere image may not be necessarily used for an advertisement.

Furthermore, in the present embodiment, an example in which the entire celestial sphere image is used for browsing the inside of real estate has been described; however, the type of contents appearing in the entire celestial sphere image and the type of advertisement for using the entire celestial sphere image, are not limited. For example, the entire celestial sphere image may be used in many fields such as promotion (PR) of a sightseeing spot, a department store, a hotel, explanations of car interior, road directions, explanation of a machine structure, and a place where people cannot enter, etc.

Furthermore, in the present embodiment, although the entire celestial sphere image displayed in the advertiser website is a still image, the entire celestial sphere image may be a moving image. The information processing apparatus 10 records the browsing history of the moving image to be played, with the playback time. When the partner site 50 displays the entire celestial sphere image, the display area is determined for each reproduction time. Accordingly, the information processing apparatus 10 can replay the angle of view that the viewer has been watching at the time of the advertisement.

Furthermore, in the present embodiment, the description has been made assuming that an entire celestial sphere image, which is obtained by imaging 360 degrees around an entire celestial sphere camera, is arranged on the web page; however, it is sufficient if the image data of the web page is a wide-angle image. The wide-angle image according to the present embodiment is an image having a portion that cannot be displayed in the advertisement space 402. For example, a panoramic image having an angle of view of only about 180 degrees in the horizontal direction may be used.

Furthermore, the entire celestial sphere image is not limited to the case where the entire celestial sphere image is created by a method in which two images are combined with each other, and the entire celestial sphere image may be created by layering overlapping portions of image data captured while gradually moving in the imaging direction. In other words, the method of creating the entire celestial sphere image is not limited.

Furthermore, the configuration example of FIGS. 10 and 34, etc., indicated in the above embodiments is divided according to the main functions to facilitate the understanding of processes by the information processing apparatus 10, the advertiser website 30, the partner site 50, the advertisement distribution server 40, and the history management server 20. The present invention is not limited by how the process units are divided or the names of the process units. The processes of the information processing apparatus 10, the advertiser website 30, the partner site 50, the advertisement distribution server 40, and the history management server 20 may be further divided into many process units according to the process contents. Furthermore, the process units may be divided such that a single process unit further includes many processes.

Furthermore, the advertisement distribution server 40 and the history management server 20 may exist as separate servers, or the functions may be integrated as a single server. Furthermore, the functions of the advertisement distribution server 40 may be distributed among a plurality of servers, or the functions of the history management server 20 may be distributed among a plurality of servers. Furthermore, since the history management server 20 transmits an entire celestial sphere image (wide-angle image) to the information processing apparatus 10, the history management server 20 may be a server that distributes images (advertisements).

Furthermore, the history management server 20 may be referred to as a Demand-Side Platform (DSP) in some cases. The DSP is a designation of the platform of advertisement on the advertiser side, and determines the bid price in consideration of the attributes of the viewer, the type of medium, and the time zone, etc., and bids the Supply-Side Platform (SSP). In response to a notification that the advertisement space is displayed from the information processing apparatus 10, the SSP notifies the DSP of the attribute of the viewer, and the type of the medium, etc. The DSP and the SSP operate in a pair to decide the entire celestial sphere image (the highest bidder) to be displayed in the advertisement space.

The partner site 50 is an example of a screen information providing device, and the history management server 20 is an example of an image distribution apparatus. The operation accepting unit 14 is an example of an operation accepting unit, the operation history transmitting unit 155 is an example of an operation history transmitting unit, the advertisement acquiring unit 151 is an example of a wide-angle image acquiring unit, the transmitting/receiving unit 151a is an example of a transmitting unit, the advertisement displaying unit 153 is an example of a displaying unit, the operation history DB 291 is an example of an operation history storage unit, the advertisement image DB 292 is an example of a wide-angle image storage unit, the attribute DB 294 is an example of an attribute storage unit, the display area determining unit 22 is an example of a display area determining unit, the advertisement image communicating unit 21 is an example of an image transmitting unit, and the cookie acquiring unit 152 is an example of an identification information acquiring unit. The advertisement request tag is an example of image request information, and the advertisement distribution server 40 is an example of an external device. The web page providing unit 31 of the partner site 50 is an example of a transmitting unit, the advertisement image communicating unit 21 is an example of the receiving unit, and the transmitting/receiving unit 21a is an example of an image transmitting unit.

The web page acquiring unit 11 is an example of a screen information acquiring unit, the web page providing unit 31 is an example of a screen information transmitting unit, the image determining unit 32 is an example of an image reading unit, and the operation history recording unit 154 is an example of a recording unit, the advertiser website 30 is an example of a second information processing apparatus, and the image DB 391 is an example of an image storage unit.

According to one embodiment of the present invention, a browsing system capable of displaying images that are expected to attract the interest of viewers, can be provided.

The browsing system, the browsing method, and the information processing apparatus are not limited to the specific embodiments described in the detailed description, and variations and modifications may be made without departing from the spirit and scope of the present invention.

What is claimed is:

1. A browsing system comprising:
an information processing apparatus of a viewer; and
an image distribution apparatus configured to provide a wide-angle image to the information processing apparatus, the wide-angle image being an image including a portion that cannot be displayed within a display space in which the wide-angle image is to be displayed
the information processing apparatus including a first processor, in communication with a first memory, executing a first process including:
acquiring screen information from a screen information providing server, the screen information including first display space size information indicating a first size of the display space;
transmitting first identification information that identifies the information processing apparatus and the first display space size information to the image distribution apparatus upon acquiring the screen information;
acquiring the wide-angle image, the wide-angle image to be acquired being determined based on the first identification information of the information processing apparatus,
acquiring display state information indicating a display state that specifies how the wide-angle image is to be displayed in the display space, the display state information including
angle of view information indicating a portion of the wide-angle image to be displayed in the display space, and
second display size information indicating a second size at which the portion in the wide-angle image is to be displayed;
displaying, on a display device of the viewer, the acquired wide-angle image in the display state specified in the acquired display state information; and
accepting user operations to the wide-angle image in the displayed wide-angle image, and
the image distribution apparatus including a second processor, in communication with a second memory, executing a second process including:
storing, in a first storage, the first identification information transmitted from the information processing apparatus, second identification information that identifies the wide-angle image, an operation history that includes a record of the user operations, and the display state information of the wide-angle image, the operation history further being stored in association with the second identification information;
storing, in a second storage, attribute information indicating one or more of at least an age range, gender, occupation, family composition, annual income, or location of a viewer for each piece of the first identification information;
associating the stored display state information with the stored operation history of the wide-angle image determined based on the first identification information and assigning point values to user operations included in the stored operation history;
retrieving the attribute information of the viewer based on the first identification information acquired form the information processing apparatus;
determining the portion of the determined wide-angle image to be transmitted to the information processing apparatus based on (i) the retrieved attribute information of the viewer, (ii) portions of the wide-angle image associated with the operation history for which a total of the assigned point values is greater than or equal to a predetermined point value threshold; and (iii) display states in which the second display size information matches the first display size information, wherein the determined portion of the determined wide-angle image is the portion of the determined wide-angle image for which the total of the assigned point values is highest from among the display states in which the second display size information matches the first display size information; and
transmitting the determined wide-angle image and information indicating the determined portion of the wide-angle image to the information processing apparatus.

2. The browsing system according to claim 1, wherein the operation history includes click result information of the wide-angle image that indicates whether the wide-angle image has been clicked, and the second process further includes
assigning more points to the user operations in the operation history in which the wide-angle image has been clicked than to the user operations in the operation history in which the wide-angle image has not been clicked.

3. The browsing system according to claim 1, wherein
upon determining that the second size indicated by the second display size information associated with the operation history for which the total of the assigned point values is greater than or equal to the threshold does not match the first size indicated by the first display size information transmitted from the information processing apparatus,
the second process further includes:
enlarging or reducing the portion of the wide-angle image associated with the operation history for which the total of the assigned point values is highest, according to a ratio of the second size indicated by the second display size information and the first size indicated by the first display size information, and
determining, as the display area of the wide-angle image to be transmitted to the information processing apparatus, the range portion of the wide-angle image that has been enlarged or reduced.

4. The browsing system according to claim 1, wherein
upon determining that the second size indicated by the second display size information associated with the operation history for which the total of the assigned point values is greater than or equal to the threshold does not match the first size indicated by the first display size information transmitted from the information processing apparatus,
the second process further includes:
cutting out the wide-angle image to the first size indicated by the first display size information, centering around the portion of the wide-angle image associated with the operation history for which the total of the assigned point values is highest, and
determining, as the display area of the wide-angle image to be transmitted to the information processing apparatus, the wide-angle image that has been cut out.

5. The browsing system according to claim 1, wherein
the display state of the wide-angle image in the first storage further includes a click time angle of view that is information that indicates the angle of view displayed when the viewer clicked the wide-angle image, and
the second process further includes
determining the display area of the wide-angle image to be transmitted to the information processing apparatus based on the click time angle of view information associated with the portion of the wide-angle image associated with the operation history for which the total of the assigned point values is highest.

6. The browsing system according to claim 5, wherein
upon determining that the second size indicated by the second display size information associated with the operation history for which the points arc total of the assigned point values is greater than or equal to the threshold does not match the first size indicated by the first display size information transmitted from the information processing apparatus,
the second process further includes:
enlarging or reducing the portion of the wide-angle image associated with the operation history for which the total of the assigned point values is the highest based on the click time angle of view information, according to a ratio of the second size indicated by the second display size information associated with the operation history for which the total of the assigned point values is highest and the second size indicated by the first display size information transmitted from the information processing apparatus, and
determining the display area of the wide-angle image to be transmitted to the information processing apparatus based on the click time angle of view information associated with the portion of the wide-angle image that has been enlarged or reduced.

7. The browsing system according to claim 5, wherein
upon determining that the second size indicated by the second display size information associated with the operation history for which the total of the assigned point values is greater than or equal to the threshold does not match the first size indicated by the first display size information transmitted from the information processing apparatus,
the second process further includes:
cutting out the wide-angle image to the first size indicated by the first display size information, centering around the portion of the wide-angle image associated with the click time angle of view information for which the total of the assigned point values indicated by the operation history is highest, and
determining, as the display area of the wide-angle image to be transmitted to the information processing apparatus, the wide-angle image that has been cut out.

8. The browsing system according to claim 2, wherein the second process further includes
determining the wide-angle image to be transmitted to the information processing apparatus based on the attribute information of the viewer retrieved based on the first identification information of the information processing apparatus acquired from the information processing apparatus.

9. The browsing system according to claim 2, wherein the second process further includes:
acquiring, from the first storage, the second identification information of the wide-angle image associated with the first identification information of the information processing apparatus acquired from the information processing apparatus, and
determining, as the wide-angle image to be transmitted to the information processing apparatus, the wide-angle image corresponding to the acquired second identification information of the wide-angle image.

10. The browsing system according to claim 2, wherein the second process further includes:
acquiring, from the first storage, the second identification information of the wide-angle image associated with the first identification information of the information processing apparatus acquired from the information processing apparatus, and
determining, as the wide-angle image to be transmitted to the information processing apparatus, the wide-angle image similar to the wide-angle image corresponding to the acquired second identification information of the wide-angle image.

11. The browsing system according to claim 2, wherein the second process further includes:
 calculating a click rate from the click result information, and
 excluding the wide-angle image for which the click rate is less than a threshold, from one or more of the wide-angle images to be transmitted to the information processing apparatus.

12. The browsing system according to claim 1, wherein the image distribution apparatus includes a wide-angle image storage configured to record the wide-angle image and an angle of view in which a particular object appears in the wide-angle image, in association with the second identification information of the wide-angle image, and
 the second process further includes:
 referring to the second storage in which the particular object is associated with the attribute information of the viewer or another viewer whose attribute information indicates that the another viewer shares an attribute similar to the attribute of the viewer, and reading out the particular object associated with the viewer or the other viewer, and
 determining, as the display area of the wide-angle image to be transmitted to the information processing apparatus, the portion of the wide-angle image including the particular object, that has been read out from the wide-angle image storage.

13. The browsing system according to claim 1, wherein the first process further includes:
 transmitting, to a second information processing apparatus associated with the wide-angle image, click time angle of view information that indicates an angle of view displayed when the viewer clicked the wide-angle image, in response to the wide-angle image being clicked, and
 acquiring the screen information including any wide-angle image from the second information processing apparatus, and
 the second information processing apparatus includes a third processor, in communication with a third memory, that executes a third process including:
 transmitting, to the information processing apparatus, the screen information specifying the angle of view indicated by the click time angle of view information as a display area of the any wide-angle image.

14. The browsing system according to claim 13, wherein the transmitting of the click time angle of view information includes transmitting, to the second information processing apparatus, the second identification information of the wide-angle image that has been clicked,
 the third process further includes reading out, from an image storage, the wide-angle image that has been clicked and associated with the second identification information of the wide-angle image, and
 the transmitting of the screen information includes transmitting, to the information processing apparatus, the screen information specifying the click time angle of view information as the display area of the wide-angle image that has been clicked.

15. The browsing system according to claim 13, wherein the transmitting of the click time angle of view includes communicating with the second information processing apparatus based on a Uniform Resource Locater (URL) associated with the wide-angle image, and
 the transmitting of the screen information includes transmitting, to the information processing apparatus, the screen information including a same wide-angle image indicated by the angle of view information as the clicked wide-angle image associated with the URL.

16. A browsing method executed by a computer in an information processing apparatus of a viewer, the browsing method comprising:
 acquiring screen information from a screen information providing server, the screen information including first display space size information indicating a first size of the display space;
 transmitting first identification information that identifies the information processing apparatus to an image distribution apparatus and the first display space size information, upon acquiring the screen information, to the image distribution processing apparatus;
 acquiring a wide-angle image, the wide-angle image being an image including a portion that cannot be displayed within a display space in which the wide-angle image is to be displayed and the wide-angle image to be acquired being determined based on the transmitted first identification information of the information processing apparatus;
 acquiring display state information indicating a display state that specifies how the wide-angle image is to be displayed in the display space, the display state information including
 angle of view information indicating a portion of the wide-angle image to be displayed in the display space, and
 second display size information indicating a second size at which the portion in the wide-angle image is to be displayed;
 displaying, on a display device of the viewer, the acquired wide-angle image in the display state specified in the acquired display state information; and
 accepting user operation to the wide-angle image in the displayed wide-angle image,
 storing, at first storage, the first identification information transmitted from the information processing apparatus, second identification information that identifies the wide-angle image, an operation history that includes a record of the user operations, and the display state information of the wide-angle image, the operation history being stored in association with the second identification information,
 storing, at a second storage, attribute information indicating one or more of at least an age range, gender, occupation, family composition, annual income, or location of a viewer for each piece of the first identification information,
 associating the stored display state information with the stored operation history of the wide-angle image determined based on the first identification information and assigning point values to user operations included in the stored operation history of the determined wide-angle image,
 retrieving the attribute information of the viewer based on the first identification information,
 determining the portion of the wide-angle image to be transmitted to the information processing apparatus based on (i) the retrieved attribute information of the viewer determined based on the acquired first identification information of the information processing apparatus, and, (ii) portions of the wide-angle image associated with the operation history for which a total of the assigned point values is greater than or equal to a predetermined point value threshold, and (iii) display states in which the second display size information matches the first display size information, wherein the determined portion of the determined wide-angle image is the portion of the determine wide-angle image for which the total of the assigned point values is highest from among the display states in which the second display size information matches the first display size information, and transmitting the determined wide-angle image and the determined portion of the wide-angle image to the information processing apparatus.

17. An information processing apparatus of a viewer comprising a processor, in communication with a memory, executing a process including:

acquiring screen information from a screen information providing server, the screen information including first display space size information indicating a first size of the display space;

transmitting first identification information that identifies the information processing apparatus to an image distribution apparatus and the first display space size information, upon acquiring the screen information, to the image distribution apparatus;

acquiring a wide-angle image, the wide-angled image being an image including a portion that cannot be displayed within a display space in which the wide-angle image is to be displayed and the wide-angle image to be acquired being determined based on the transmitted first identification information of the information processing apparatus;

acquiring display state information indicating a display state that specifies how the wide-angle image is to be displayed in the display space, the display state information including angle of view information indicating a portion of the wide-angle image to be displayed in the display space, and second display size information indicating a second size at which the portion of the wide-angle image is to be displayed;

displaying, on a display device of the viewer, the acquired wide-angle image in the display state specified in the acquired display state information; and accepting user operation to the wide-angle image in the displayed wide-angle image, storing, at a first storage, the first identification information transmitted from the information processing apparatus, second identification information that identifies the wide-angle image, an operation history that includes a record of the user operations, and the display state information of the wide-angle image, the operation history being stored in association with the second identification information, storing, at a second storage, attribute information indicating one or more of at least an age range, gender, occupation, family composition, annual income, or location of a viewer for each piece of the first identification information, associating the stored display state information with the stored operation history of the wide-angle image determined based on the first identification information and assigning point values to user operations included in the stored operation history of the determined wide-angle image, retrieving the attribute information of the viewer based on the first identification information, determining the portion of the wide-angle image to be transmitted to the information processing apparatus based on (i) the retrieved attribute information of the viewer portions of the wide-angle image associated with the operation history for which a total of the assigned point values is greater than or equal to a predetermined point value threshold, and (iii) display states in which the second display size information matches the first display size information, wherein the determined portion of the determined wide-angle image is the portion of the determine wide-angle image for which the total of the assigned point values is highest from among the display states in which the second display size information matches the first display size information, and transmitting the determined wide-angle image and the determined portion of the wide-angle image to the information processing apparatus.

* * * * *